US006429895B1

(12) United States Patent
Onuki

(10) Patent No.: US 6,429,895 B1
(45) Date of Patent: Aug. 6, 2002

(54) IMAGE SENSING APPARATUS AND METHOD CAPABLE OF MERGING FUNCTION FOR OBTAINING HIGH-PRECISION IMAGE BY SYNTHESIZING IMAGES AND IMAGE STABILIZATION FUNCTION

(75) Inventor: Ichiro Onuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/996,287

(22) Filed: Dec. 22, 1997

(30) Foreign Application Priority Data

Dec. 27, 1996 (JP) .............................................. 8-349310
Dec. 27, 1996 (JP) .............................................. 8-349311

(51) Int. Cl.⁷ ............................................... H04N 5/228
(52) U.S. Cl. ........................................ 348/208; 348/358
(58) Field of Search ................................ 348/207, 218, 348/219, 200, 222, 208, 358, 335; 382/284, 299, 312; 396/54, 55

(56) References Cited

U.S. PATENT DOCUMENTS

| | | | | |
|---|---|---|---|---|
| 5,754,226 A | * | 5/1998 | Yamada et al. ............. 348/208 |
| 5,889,553 A | | 3/1999 | Kino et al. |
| 5,930,405 A | * | 7/1999 | Chida ......................... 348/218 |
| 6,018,363 A | * | 1/2000 | Horii ........................... 348/219 |
| 6,130,709 A | * | 10/2000 | Sekine et al. ............... 348/208 |

\* cited by examiner

Primary Examiner—Tuan Ho
(74) Attorney, Agent, or Firm—Morgan & Finnegan, LLP

(57) ABSTRACT

An image sensing apparatus, which performs pixel shifting operation for shifting an image formation position of an image on an image sensing device using a lens capable shifting a light path and senses images at respective image formation positions, has a vibration sensor for detecting vibration. The lens is moved so as to cancel the vibration detected by the vibration sensor when performing pixel shifting operation. Since the shifting characteristics of the lens slightly changes depending upon states of zooming and focusing lenses, the lens is moved by a shift amount which is adjusted in accordance with the states of the zooming and focusing lens.

47 Claims, 50 Drawing Sheets

F I G. 22
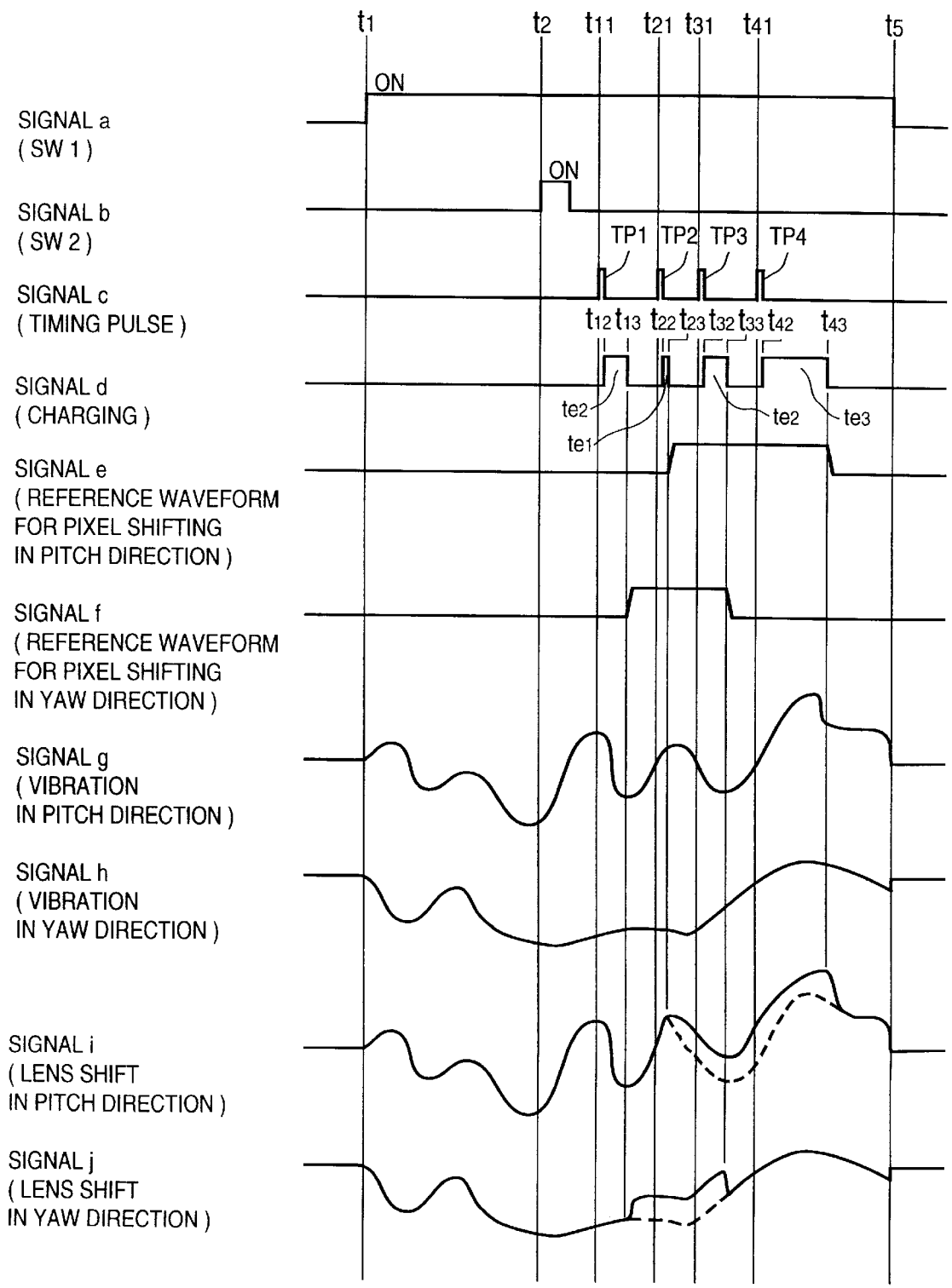

FIG. 37
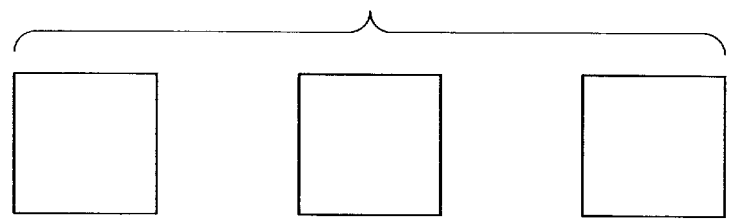
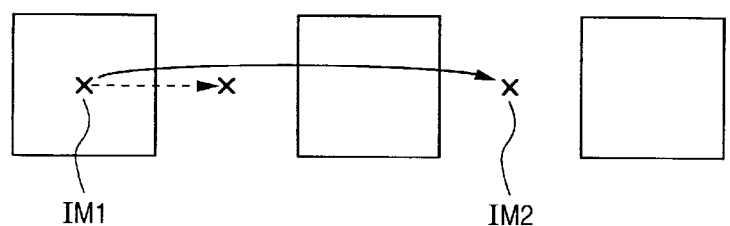
FIG. 38
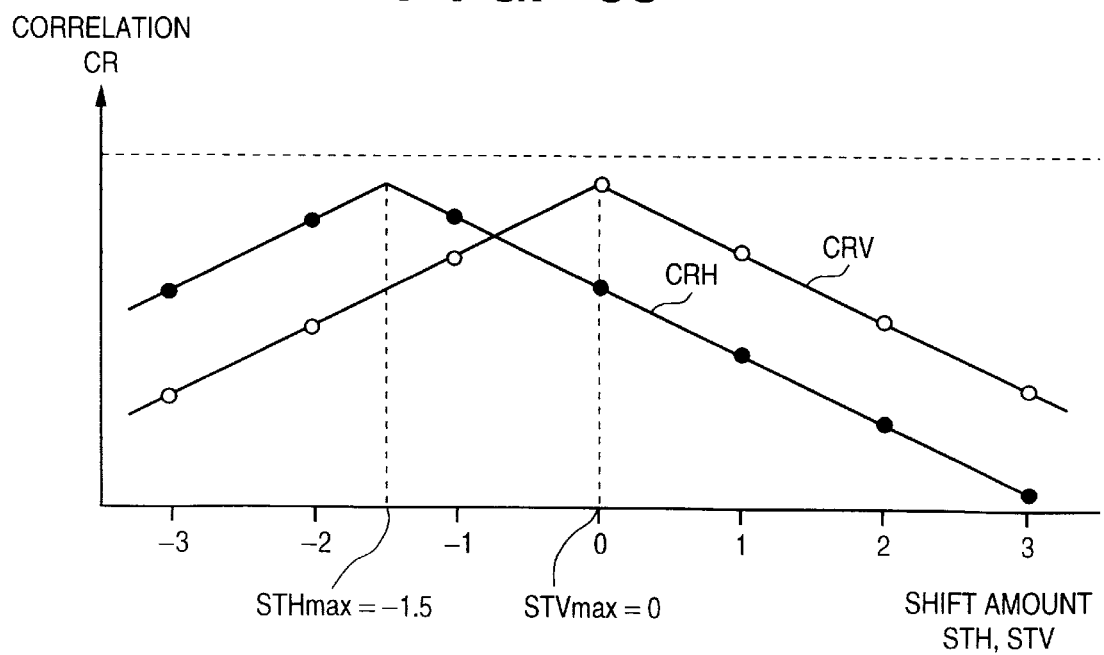

ARMV

ARMV

IMAGE SENSING APPARATUS AND METHOD CAPABLE OF MERGING FUNCTION FOR OBTAINING HIGH-PRECISION IMAGE BY SYNTHESIZING IMAGES AND IMAGE STABILIZATION FUNCTION

BACKGROUND OF THE INVENTION

The present invention relates to an image sensing apparatus, having an image stabilization function, capable of obtaining a high-resolution image by slightly shifting an image formation position by an optical system, on an image sensing device for performing photo-electric conversion on the image, and an image synthesis apparatus for synthesizing images obtained by the image sensing apparatuses.

An electronic still camera which uses a solid-state image sensing device, such as a charge coupled device (CCD), instead of a silver-halide film has been commercialized. An electronic still camera is superior to a camera using the silver-halide film in instantaneity, however, inferior in resolution and dynamic range.

In order to improve the resolution, which is one of the above defects of an electronic still camera, an image sensing apparatus adopting pixel shifting method has been proposed. In the pixel shifting method, a plurality of images are sensed while slightly shifting the image formation position of an image, incoming through an optical system, on an image sensing device for performing photo-electric conversion on the image, and the plurality of sensed images are synthesized using a predetermined method to obtain a single high-resolution image. As the prior arts of the pixel shifting method, there are following Japanese Patent Application Laid-Opens, for example.

In the Japanese Patent Application Laid-Open No. 60-27278, a wedge-shaped prism provided in front of the lens systems is rotated about the optical axis, thereby the light path of an optical image formed on an image sensing device is shifted in parallel to the optical axis of the lens system. Then, output images are synthesized to obtain a single high-resolution image.

In the Japanese Patent Application Laid-Open No. 60-91774, in an optical system configured with a magnification optical sub-system and a master optical system, a part of the lens of the master optical system is shifted in the vertical direction with respect to the optical axis, thereby the light path of the optical image formed on an image sensing device is shifted in parallel to an optical axis of the optical system. Then the obtained output images are synthesized to obtain a single high-resolution image.

Further, in the Japanese Patent Application Laid-Open No. 61-236282, a transparent plane parallel plate provided in front of an image sensing device is rotated about an axis which is perpendicular to the optical axis of the image sensing device, thereby the light path of the optical image formed on the image sensing device is shifted in parallel to the optical axis. Then the output images are synthesized to obtain a single high-resolution image.

In the Japanese Patent Application Laid-Open No. 7-287268 (U.S. patent application Ser. No. 08/339,407), a variable apical angle prism provided in front of an optical system is operated on the basis of a vibration signal and a pixel shifting signal, thereby shifting the light path of the optical image formed on an image sensing device in parallel to the optical axis. Accordingly, compensation of vibration caused by a user as well as improvement of resolution of an image are achieved simultaneously.

Note, in this specification, any unintentional undesired movement of camera is expressed as "vibration", and the movement is not limited to periodic motion.

However, in the aforesaid pixel shifting methods, it takes a long time from the first image signal until the last image signal are obtained, similarly to the case of performing multiple exposure in a still camera. Thus, when the electric still camera is vibrated, the quality of an image decreases, namely, a high-resolution image may not be obtained by performing pixel shifting. Thus, in order to overcome this problem, there are following Japanese Patent Application Laid-Opens, for example.

In the Japanese Patent Application Laid-Open No. 7-240932 (U.S. patent application Ser. No. 08/391,388), using a variable apical angle prism provided in front of the optical system or a moving lens system provided behind the optical system, both compensation of vibration and improvement of resolution of the image are achieved at the same time.

Further, according to the Japanese Patent Application Laid-Open No. 7-287268 (U.S. patent application Ser. No. 08/339,407), because resolution in pixel shifting operation decreases when the focal length of the optical system is larger than a predetermined value, pixel shifting is disabled in such a case.

Further, in order to widens dynamic range, which is the other defect of the electronic still camera, there are the following Japanese Patent Application Laid-Opens.

In the Japanese Patent Application Laid-Open No. 1-319370, an image sensing device is exposed a plurality of times with different luminous exposures, and a plurality of images obtained under this operation are synthesized to form a signal image of wide dynamic range.

In the Japanese Patent Application Laid-Open No. 7-264488, a plurality of image sensing devices having different sensibilities are used, and a plurality of images obtained by these image sensing devices are synthesized to form a single image of wide dynamic range.

Furthermore, as a technique for overcoming the aforesaid two problems at the same time, the Japanese Patent Application Laid-Open No. 8-37628 (U.S. patent application Ser. No. 08/505,608) discloses that at least one of a plurality of images obtained while performing pixel shifting is sensed in different luminous exposure from luminous exposure used for sensing other images, thereby obtaining an image of high resolution and wide dynamic range.

Further, in an image sensing apparatus having an image sensing device, it is possible to determine vibration of an image in advance to actually sensing the image by obtaining a movement vector of the image from time-sequential outputs from the image sensing device. Accordingly, in the Japanese Patent Application Laid-Open No. 2-57078 as a prior art in this field, a movement vector of an image is detected continuously, and, when the movement vector becomes the smallest, the image sensed at that time is decided as an image to be recorded, thereby reducing the effect of the vibration of an image sensing apparatus during exposure.

Furthermore, in the Japanese Patent Application Laid-Open No. 8-172568, movement vectors between a plurality of images sensed while performing pixel shifting are obtained, and component of vibration due to vibration of an image sensing apparatus or of an object are removed by performing interpolation, thereafter, the images are synthesized to form a single image of high resolution.

However, in the aforesaid conventional examples disclosed in the Japanese Patent Application Laid-Opens, there are following defeats.

In the methods disclosed in the Japanese Patent Application Laid-Open Nos. 60-27278, 60-91774, and 61-236282, no vibration correction mechanism is provided. Therefore, it is not possible to obtain a high-resolution image when blurring of an image caused by vibration of an image sensing apparatus is large. This is because the operation for obtaining a plurality of images in the pixel shifting method is the same as that of multiple exposure, as described above, and the time required in these operations, namely the time when the first image is sensed until the last image is sensed, is longer than the time required for performing a normal image sensing operation. As a result, effects of vibration on an image is greater when performing pixel shifting operation than when performing the normal image sensing operation vibration.

Further, according to the Japanese Patent Application Laid-Open No. 7-287268 (U.S. patent application Ser. No. 08/339,407), the variable apical angle prism, which is the light path shifting means used for vibration compensation and pixel shifting operation, is provided in front of the optical system, therefore, the coefficient (vibration compensation coefficient) for converting a vibration signal into a value for operating the variable apical angle prism does not change in response to zooming operation. Accordingly, when performing zooming operation, only the coefficient (pixel shifting coefficient) for converting a pixel shifting signal into a value for operating the variable apical angle prism needs to be changed. However, when the light path shifting means is provided in the middle of the optical system in order to down-sizing the optical system, it is necessary to convert both the vibration signal and the pixel shifting signal into values using specific coefficients when performing zooming operation, and operate the light path shifting means in accordance with the values, but there is no disclosure on such the conversion and operation in the Japanese Patent Application Laid-Open No. 7-287268 (U.S. patent application Ser. No. 08/339,407).

Furthermore, in the Japanese Patent Application Laid-Open No. 7-287268 (U.S. patent application Ser. No. 08/339,407), a pixel shifting mechanism is applied to a video camera (camcorder) for recording a moving image, therefore, the interval for taking images is fixed to the field frequency of a moving image. However, when the pixel shifting mechanism is applied to a so-called electronic still camera for recording a still image, it is advantageous to use an image sensing device whose image-taking interval can be changed on the basis of the charging period of the image sensing device (i.e., luminance of an object), since the camera can sense an object in a wide luminance range. In this case, as the image-taking interval becomes longer, effects of vibration on the image becomes stronger, therefore, delicate control of the pixel shifting operation in accordance with image sensing conditions is required. However, in the Japanese Patent Application Laid-Open No. 7-287268 (U.S. patent application Ser. No. 08/339,407), only change in pixel shifting operation in accordance with a focal length of the optical system is disclosed. In addition, there is no teaching on dynamic range expansion.

In the Japanese Patent Application Laid-Open No. 7-240932 (U.S. patent application Ser. No. 08/391,388), pixel shifting is performed even when the resolution of vibration compensation is not good or vibration compensation has failed. As a result, a high-resolution image is not obtained; on the contrary, the quality of the image obtained by performing pixel shifting operation would be lower than an image obtained without performing pixel shifting operation.

According to the Japanese Patent Application Laid-Open No. 7-287268 (U.S. patent application Ser. No. 08/339,407), under conditions in which it is predicted that resolution higher than a predetermined level can not be obtained by performing pixel shifting operation, the pixel shifting operation is disabled. However, the prediction is not performed on the basis of an actual effect of vibration on an image. Therefore, similarly to the cases of other references as explained above, when an image sensing apparatus vibrates by a large displacement amount, the obtained image would have a lower quality than an image obtained without performing pixel shifting operation.

Further, according to the Japanese Patent Application Laid-Open No. 60-91774, resolution of an image is increased, however, there is no teaching on dynamic range expansion.

On the contrary, in the Japanese Patent Application Laid-Open Nos. 1-319370 and 7-264488, dynamic range expansion is explained, however, how to increase resolution of an image is not discussed.

Whereas, in the Japanese Patent Application Laid-Open No. 8-37628 (U.S. patent application Ser. No. 08/505,608), methods for increasing resolution of an image and widening dynamic range are disclosed, however, there is no detailed description on method for determining luminous exposures to be used for sensing a plurality of images for dynamic range expansion. Therefore, the disclosed method is not possible to delicately cope with various scenes which have various luminous distributions. Further, pixel shifting operation requires longer time for performing exposing operation, similarly to a case of performing multiple exposure operation, as described above, therefore, it is necessary to cope with vibration problem. However, there is no teaching on any technique for overcoming the vibration problem.

Further, in the Japanese Patent Application Laid-Open No. 2-57078, there is no teaching on pixel shifting operation, therefore, only reduction of effect of vibration on an image sensed in a normal image sensing operation is achieved. Thus, improvement in resolution of an image is not expected. Furthermore, blurring due to a movement of an object can not be reduced.

Further, in a case of performing pixel shifting operation to increase resolution of an image, it is necessary to control the shift amount to be a predetermined amount based on the interval between pixels. However, there is no teaching on optical vibration compensation means using, e.g., a variable apical angle prism in the Japanese Patent Application Laid-Open No. 8-172568, therefore, blurring of an image while performing pixel shifting operation is large and occurs at random. Therefore, there is no guarantee that pixel shifting by the predetermined shift amount is always performed. In addition, even though blurring of an object is corrected by performing interpolation, possibility of obtaining a high resolution image is low. Furthermore, there is no teaching on warning a user of an image not being obtained in desired resolution, nor about an alternative suggestion to be followed for improving resolution of the image.

SUMMARY OF THE INVENTION

The present invention has been made in consideration of the above situation, and has as its object to provide an image sensing apparatus and method capable of performing image stabilization and pixel shifting simultaneously and at high resolution regardless of the configuration of the optical system and the configuration of image stabilization function.

According to the present invention, the foregoing object is attained by providing an image sensing apparatus comprising: image sensing means for converting an optical image into electric signals and outputting the electric signals as image signals; shifting means for shifting an image formation position of the optical image formed on the image sensing means to a plurality of different positions; first vibration detection means for detecting vibration of the image sensing apparatus and outputting vibration information; control means for controlling the shifting means on the basis of the vibration information outputted by the first vibration detection means; and image signal synthesis means for synthesizing image signals of a plurality of images outputted by the image sensing means to generate a single image, wherein the image sensing means converts the optical image into electric signals at each of the plurality of different image formation positions shifted by the shifting means.

It is another object of the present invention to provide an image sensing apparatus capable of reducing the effect of movement of an object while performing pixel shifting so as to obtain an image of high resolution.

According to the present invention, the foregoing object is attained by providing an image sensing apparatus comprising: image sensing means for converting an optical image into electric signals and outputting the electric signals as image signals; image sensing control means for controlling the image sensing means to sense a plurality of images within a predetermined period of time; image signal synthesis means for synthesizing image signals of the plurality of images outputted by the image sensing means to generate a single image; division means for dividing an image into a plurality of small areas; relationship determination means for determining relationship between the plurality of images by each of the plurality of small areas; and image synthesis control means for controlling image synthesis operation by the image signal synthesis means on the basis of the relationship between the plurality of images determined by the relationship determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is a timing chart of the control processing according to the fifth embodiments of the present invention;

FIG. 37 is an explanatory view showing a track of a given point of an image on an image sensing device according to a tenth embodiment of the present invention;

FIG. 38 is a graph showing correlation between first and second image signals;

DETAILED DESCRIPTION OF THE PREFERRED EMBODIMENTS

Preferred embodiments of the present invention will be described in detail in accordance with the accompanying drawings.

As embodiments of the present invention, first to fourteenth embodiments are explained below. First, a configuration of a camera commonly used in the first to fourteenth embodiments is explained below.

<Configuration of Camera>

FIGS. 1 to 5 are common for the first to fourteenth embodiments.

Figure 1:
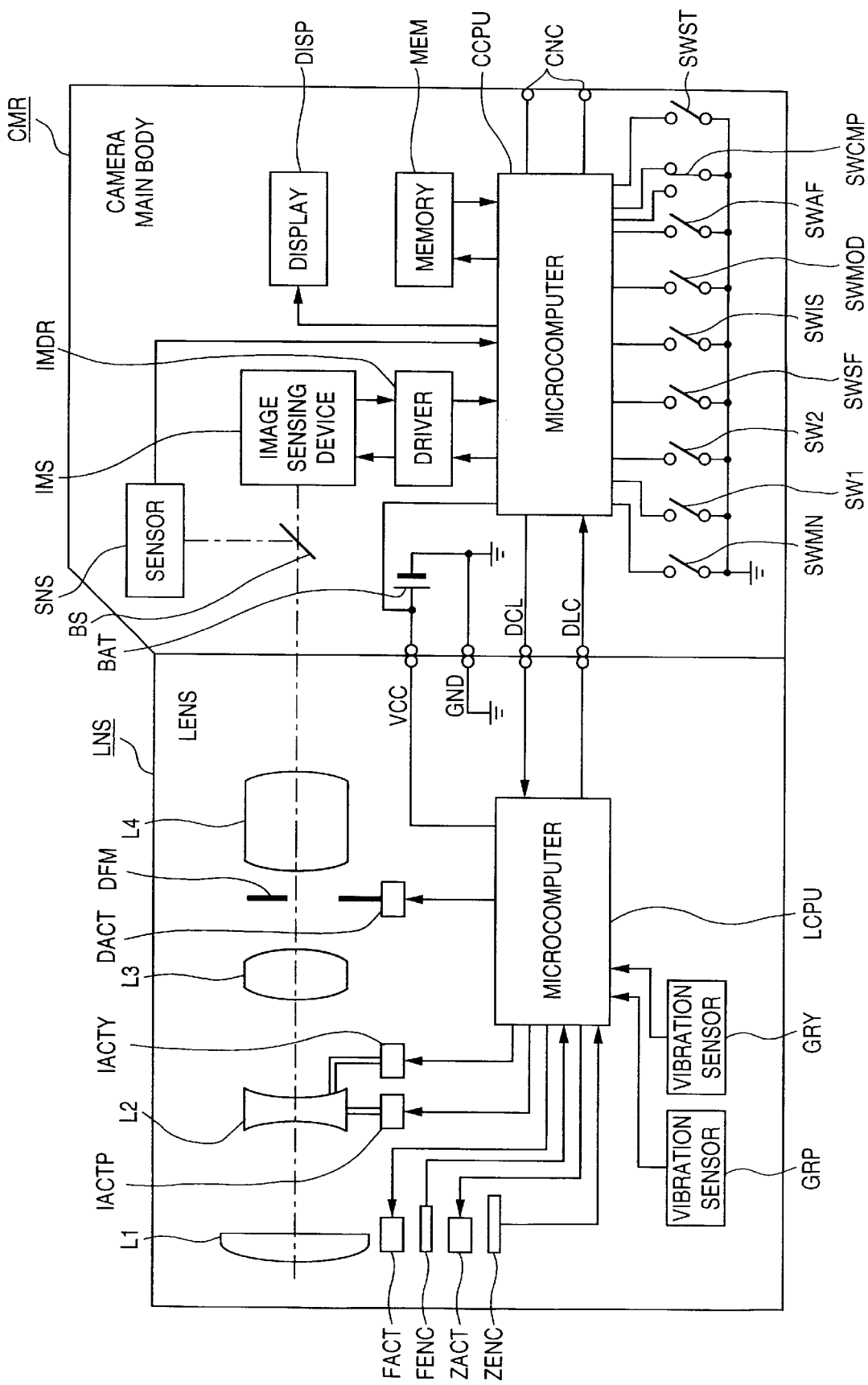
FIG. 1 is a block diagram illustrating a configuration of an image sensing apparatus according to an embodiment of the present invention.

FIG. 1 is a block diagram illustrating a configuration of an image sensing apparatus according to an embodiment of the present invention. The detail will be explained later.

Figure 2A:
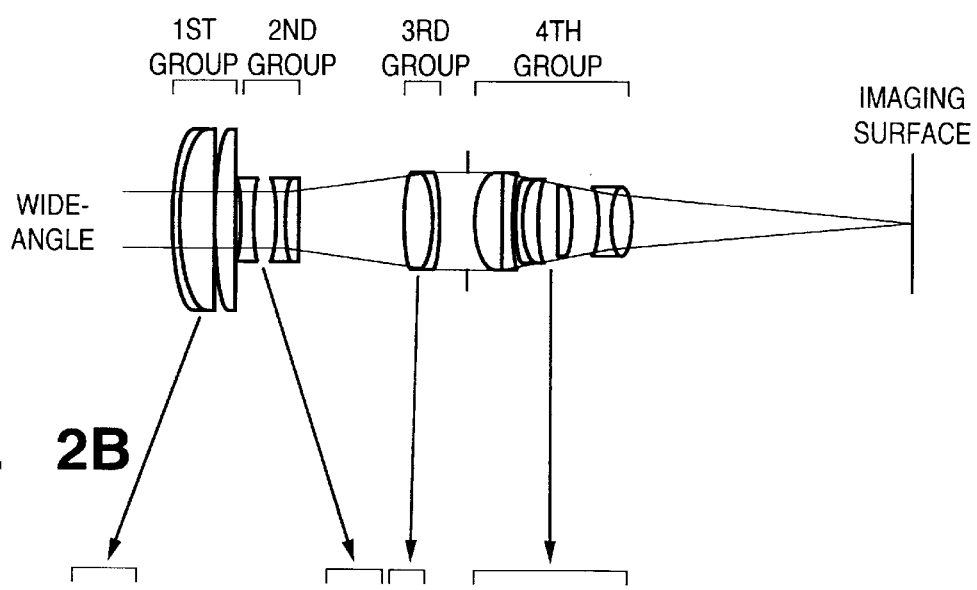
FIGS. 2A and 2B are diagrams illustrating an example of an arrangement of lenses in a lens system according to the embodiment of the present invention.
Figure 2B:
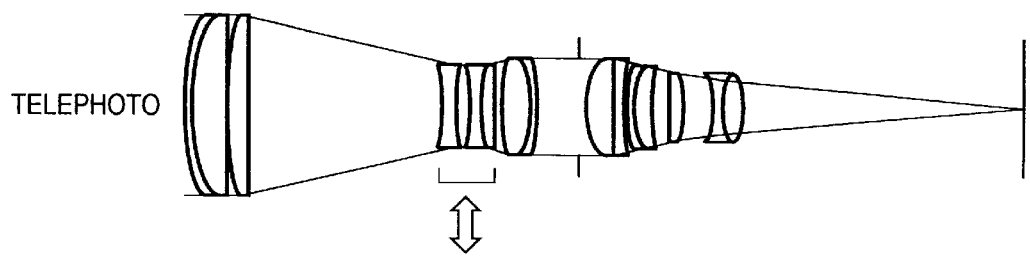

FIGS. 2A and 2B are diagrams illustrating an example of an arrangement of lenses in a lens system. The lens system is a zoom lens system, and its focal length ranges between 10 mm to 30 mm, namely, third-power lens system. Especially, FIG. 2A shows the lenses in the wide-angle position (focal length=10 mm), and FIG. 2B shows the lenses in the telephoto position (focal length=30 mm).

This lens system is basically configured with four groups of lenses: when changing magnification, the fourth lens group is stationary, and the first, second and third lens groups move; further, when focusing, the second, third and fourth lens groups are stationary, and the first lens group moves. Pixel shifting and vibration compensation are performed by shifting the image formation position of an image on the imaging surface by shifting the second lens group in the vertical direction with respect to the optical axis of the lens system.

Figure 3A:
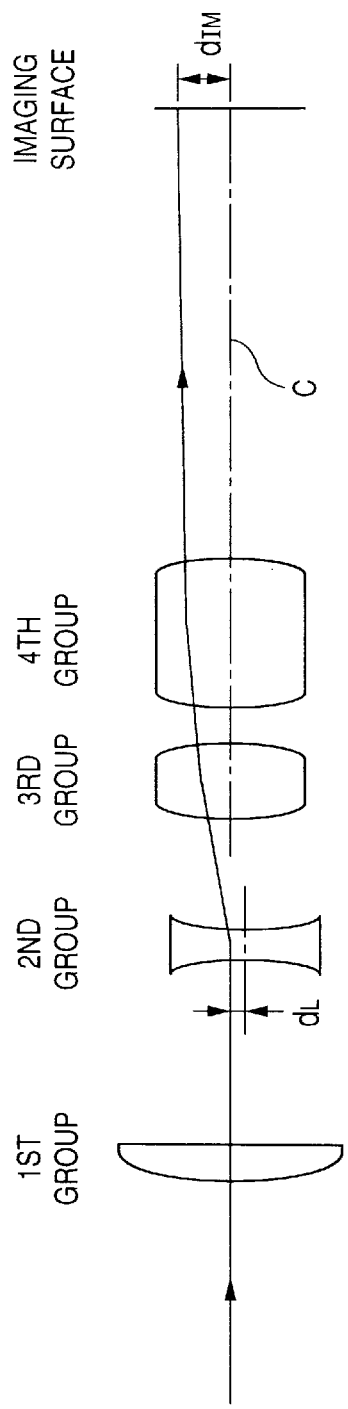
FIGS. 3A and 3B are diagrams for explaining shifts of light paths by the lens system according to the embodiment of the present invention.
Figure 3B:
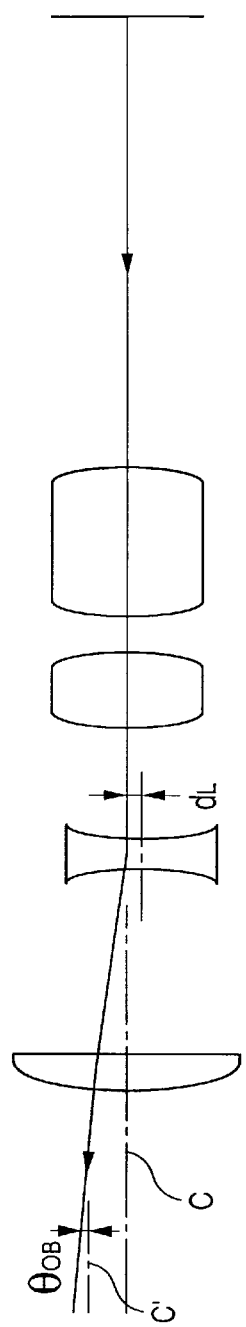

Next, an effect of the second lens group on shifting a light path is explained with reference to FIGS. 3A and 3B. FIGS. 3A and 3B are diagrams conceptually showing the four lens groups shown in FIGS. 2A and 2B. FIG. 3A shows a shift of the light path in the lens groups in the image space when the second lens group is shifted downward by a distance dL, and FIG. 3B shows the shift of the light path in the object space when the second lens group is shifted downward by the distance of dL.

First, FIG. 3A is explained. A light path of a ray incoming from the object space and traveling on the optical axis of the first lens group is shifted upward by the second lens group which is shifted downward, passes through the third and fourth lens groups and incidents on the imaging surface at a position which is above the optical axis of the first, third and fourth lens groups by the distance of $d_{IM}$. If a ratio of the shifted distance of the second lens group, $d_L$, to the maximum shifted distance on the imaging surface, $d_{IM}$, is defined as decentering sensitivity, $S_d$, then these three values have relationship expresses as, $$d_{IM} = S_d \times d_L. \tag{1}$$

The decentering sensitivity $S_d$ changes in accordance with the arrangement of the second to fourth lens groups, which means the decentering sensitivity Sd changes in accordance with zooming operation according to the embodiment of the present invention. Further, since a front focusing using the first lens group is adopted in the embodiment of the present invention, the decentering sensitivity $S_d$ does not change in response to focusing operation. However, when a rear focusing using the fourth lens group is adopted, the decentering sensitivity $S_d$ changes in response to focusing operation. Therefore, the decentering sensitivity $S_d$ is generally expressed as a function of the focal length f and a distance to an object R, namely, $S_d(f, R)$, thus, the equation (1) may be modified to, $$d_{IM}=S_d(f, R) \times d_L. \tag{2}$$

Figure 4:
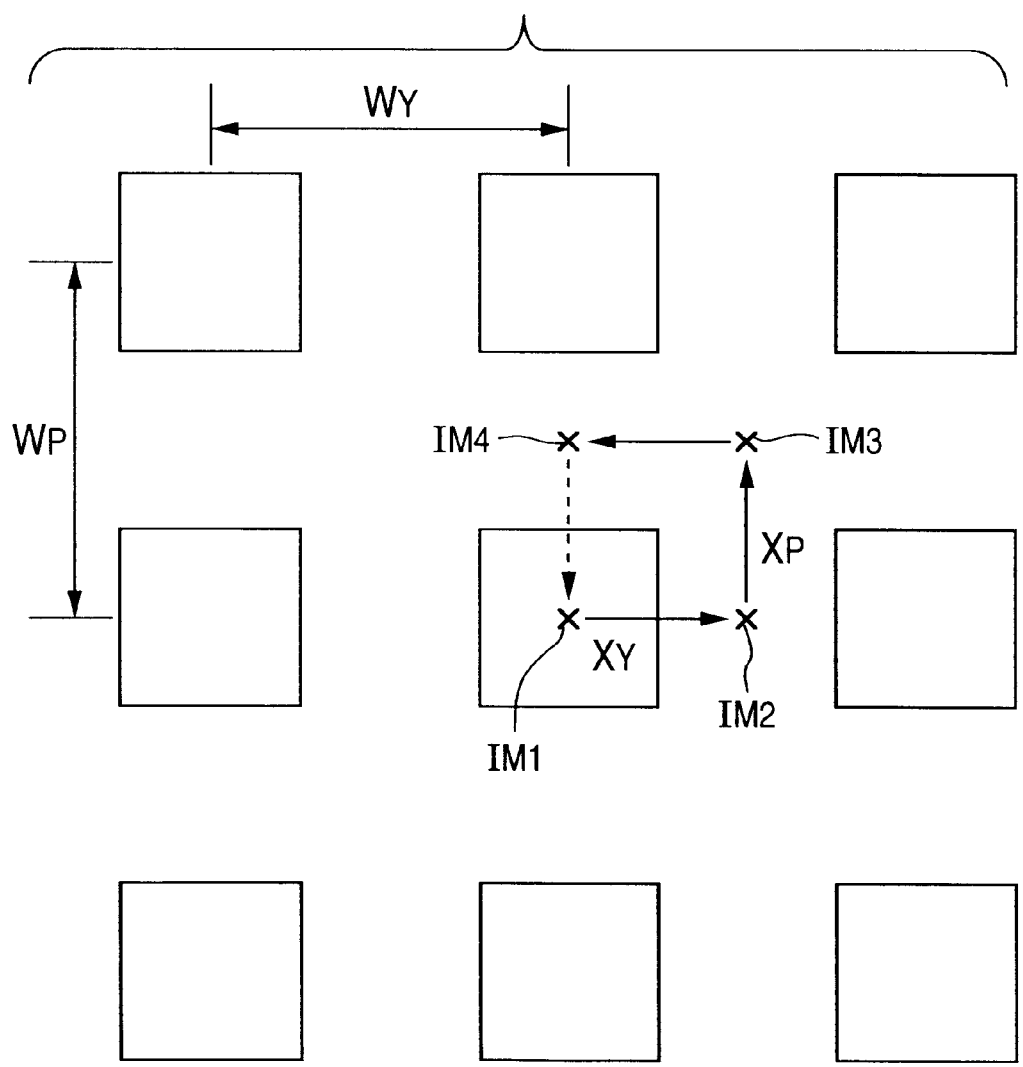
FIG. 4 is an explanatory view of a principle of pixel shifting.

Next, a shift amount of the second lens group when performing pixel shifting operation is explained. FIG. 4 is an explanatory view of a principle of pixel shifting and shows a magnified view of a photo-sensing surface of the image sensing device. Referring to FIG. 4, photo-sensing elements having a square shape, namely, pixels, are regularly arranged on the photo-sensing surface at intervals of $W_Y$ in the horizontal direction and $W_P$ in the vertical direction. The resolution of an image formed on the photo-sensing surface is determined by the intervals $W_Y$ and $W_P$ between the pixels. However, it is possible to increase the resolution of the image by taking a plurality of images while shifting relative positions between the pixels and the image, and synthesizing the images by following a predetermined rule to make a single image. For example, when a given object point of an image is formed at the center of the photo-sensing element, IM1, image signals of the image (entire image signals obtained from the area sensor) are read and stored as a first set of image signals. Next, the image is shifted so that the same object point of the image is shifted to a position IM2 on the photo-sensing surface, namely shifted to right by $X_Y=W_Y/2$, and there, a second set of image signals are read and stored. Similarly, while shifting the object point of the image to positions IM3 and IM4 on the photo-sensing surface, third and fourth sets of image signals are taken. Thereafter, the four sets of image signals, which provide four times more information on the image, are synthesized. Accordingly, spatial resolution of the image is doubled both in the horizontal and vertical directions.

In order to shift the image by $X_Y$ (=$W_Y/2$) and/or $X_P$ (=$W_P/2$) in the pixel shifting operation, the effect of the second lens group on shifting the light path shown in FIG. 3A is utilized. More specifically, in order to shift the image upward by $X_P$, the second lens group is to be shifted downward by a distance of $d_L$ which is determined by, $$d_L = X_P/S_d(f, R) \tag{3}$$

in accordance with the equation (2). The shift amount $X_P$ of the image in the pixel shifting operation is fixed, however, the decentering sensitivity Sd(f, R) changes in accordance with zooming and focusing operations. Accordingly, the shift amount of the second lens group $d_L$ needs to be changed in accordance with the state of the lens system. In the present invention as described above, data on the decentering sensitivity Sd(f, R) corresponding to states of the lens system, such as zooming and focusing, is stored as a first coefficient in ROM of a microprocessor (CPU).

Next, FIG. 3B is explained. A ray traveling from the center of an image along an optical axis C of the lens system to the left in FIG. 3B passes through the fourth and third lens groups, then shifted upward by the second lens group which is shifted downward. Then, the ray which has passed through the first lens group is projected on the object tilted by an angle of $\theta_{OB}$ with respect to an axis C' which is parallel to the optical axis C. If the ratio of the shifted amount of the second lens group $d_L$ to the tilted angle $\theta_{OB}$ with respect to the optical axis is defined as the angle sensitivity, $S_\theta$, then these three values have relationship expressed as, $$\theta_{OB}=S_\theta \times d_L \tag{4}$$

The angle sensitivity $S_\theta$ changes depending upon an arrangement of lenses in the upstream of the second lens group. Namely, in the embodiments of the present invention, the angle sensitivity $S_\theta$ changes in response to zooming and focusing operations. Since the angle sensitivity $S_\theta$ is expressed as a function of the focal length f and the distance to an object R, namely, $S_\theta(f, R)$, similarly to the decentering sensitivity $S_d$, the equation (4) may be modified to, $$\theta_{OB}=S_\theta(f, R) \times d_L. \tag{5}$$

Next, a shift amount of the second lens group for compensating vibration is explained. Assuming that a camera having the lens system and the image sensing device vibrates in the angular direction so that the optical axis of the lens system turns downward by an angle of $\theta_{CAMERA}$, blurring of the image due to the angular vibration this time corresponds to a case where an object is shifted upward with respect to the camera by an angle of $\theta_{OB}$ (=$\theta_{CAMERA}$). Referring to FIG. 3B, it is possible to compensate the shift of the object by shifting the second lens group by the direction of $d_L$ when the object is shifted upward by the angle of $\theta_{OB}$. Therefore, the blurring of the image due to the angular vibration can be compensated by shifting the second lens group downward by the distance $d_L$ calculated on the basis of the following equation (6) on the basis of the shifted angle, $\theta_{CAMERA}$, detected by a vibration sensor, and the equation (5), $$d_L=\theta_{CAMERA}/S_\theta(f, R) \tag{6}$$

Since the vibration angle $\theta_{CAMERA}$ changes with respect to time and the angle sensitivity $S_\theta(f, R)$ also changes in response to zooming and focus operations, the shift amount of the second lens group needs to be changed in accordance with the state of the lens system. Therefore, in the present invention, the angle sensitivity $S_\theta(f, R)$ which changes in response to zooming and focusing operations is also stored in connection with the states of the lens system in the ROM of the CPU as a second coefficient, similarly to the decentering sensitivity Sd(f, R).

FIG. 1 is the configuration of the image sensing apparatus according to the embodiment of the present invention. In FIG. 1, reference CMR denotes a camera main body; and LNS, a lens configured as an interchangeable lens, detachable from the camera main body CMR.

An explanation of the configuration of the camera main body CMR follows.

Reference CCPU denotes a one-chip microcomputer of the camera main body CMR, having ROM, RAM, and analog-digital and digital-analog conversion functions. The microcomputer CCPU performs a series of processes, such as automatic exposure (AE) control, automatic focusing (AF) control, and pixel shifting control, by executing a sequential program, for the camera, stored in the ROM. Thus, the microcomputer CCPU communicates with respective circuits of the camera main body CMR and the lens LNS in order to control the circuits and the lens LNS.

On a mount unit for connecting the camera main body CMR and the lens LNS, four pairs of connection terminals are provided. An internal battery BAT in the camera main body CMR provides electric power to the respective circuits in the camera main body CMR and to an actuator, as well as to the lens LNS via a line VCC.

Reference DCL denotes a signal line for transmitting a signal from the microcomputer CCPU of the camera main body CMR to a microcomputer LCPU (will be explained later) of the lens LNS, and DLC denotes a signal line for transmitting a signal from the microcomputer LCPU of the lens LNS to the microcomputer CCPU of the camera main body CMR. Further, the camera main body CMR and the lens LNS are both grounded via a line GND.

Reference IMS denotes an image sensing device, such as CCD, and reference IMDR denotes a driver for controlling charging of the image sensing device IMS and transference of the stored charges in the image sensing device IMS.

Further, reference MEM denotes a memory for recording/storing image data of a sensed image, and realized by a semi-conductor memory, a magnetic disk, and an optical disk, for instance; DISP, a display, such as a liquid crystal display, for displaying an image obtained by the image sensing device IMS as well as operation state of the camera; and BS, a beam splitter, configured with a half mirror, for leading a part of the luminous flux of an image to a sensor SNS. The sensor SNS has a focus state detection sensor for detecting the focus state of the lens system and a photometric sensor for detecting luminosity of the object.

Reference CNC denotes a connector for connecting to an external device, such as a desk-top computer, and the connector CNC is used for transmitting the contents of the memory MEM to the external device, and controlling the camera main body CMR from the external device using a signal from the external device.

Reference SWMN denotes a main switch, and when the main switch SWMN is turned on, then the microcomputer CCPU starts executing a predetermined program relating to image sensing operation.

SW1 and SW2 denote switches which operate in response to the operation of the release button, and SW1 is turned on when the release button is pressed halfway (half stroke) and the SW2 is turned on when full stroke is made.

SWSF denotes a pixel shifting mode selection switch which is used for selecting either permission or prohibition of pixel shifting operation, as well as selecting one of a plurality of predetermined pixel shifting modes.

SWIS denotes an image stabilization (IS) selection switch for selecting either permission or prohibition of image stabilization.

SWMOD denotes an image sensing mode selection switch, and when a user selects one of a predetermined image sensing modes, AE mode, AF mode, pixel shifting mode, and IS mode, corresponding to the selected image sensing mode, are automatically set.

Next, the configuration of the lens LNS is explained.

Reference LCPU denotes the microcomputer of the lens LNS, and configured as a one-chip microcomputer having ROM, RAM, and analog-digital and digital-analog conversion functions, similarly to the microcomputer CCPU of the camera main body CMR. The microcomputer LCPU controls a focusing actuator, a zooming actuator, a iris diaphragm actuator, and an IS actuator, all of which will be explained later, in accordance with instructions transmitted from the microcomputer CCPU via the signal line DCL. Further, the microcomputer LCPU transmits operation state of the lens LNS and parameters which are specific to the lens to the microcomputer CCPU via the signal line DLC.

Reference L1 to L4 denote lens groups corresponding to the first to fourth lens groups, respectively explained with reference to FIG. 2, which configure a zoom lens system, and an image of an object is formed on the image sensing device IMS via the zoom lens system.

FACT denotes the focusing actuator for moving the first lens group L1 in the back and forth directions along the optical axis to perform focus control. A focus encoder FENC detects the position of the first lens group L1, which corresponds to information on the distance to the object, then the obtained information is transmitted to the microcomputer LCPU.

Reference ZACT denotes the zooming actuator which performs zooming operation by moving the first to third lens groups L1 to L3 in the back and forth directions along the optical axis. A zoom encoder ZENC detects information on zooming operation, namely, the focal length of the zoom lens system, then transmits the information to the microcomputer LCPU.

DFM denotes an iris diaphragm, and DACT denotes an iris diaphragm actuator for driving the iris diaphragm DFM.

Further references GRP and GRY are vibration sensors, such as vibration-type gyroscopes, and two sensors of the same type are provided as the vibration sensors GRP and GRY for sensing the angular vibration in the vertical direction (pitch) and horizontal direction (yaw) of the camera. The detected results of vibration are sent to the microcomputer LCPU.

The second lens group L2 is provided so as to be movable individually in the plane perpendicular to the optical axis in the two-dimensional directions. The second lens group L2 is driven by a pitch actuator IACTP in the vertical direction with respect to the optical axis, i.e., in the direction for compensating pitch, and driven by a yaw actuator IACTY in the horizontal direction (in FIG. 1, the direction normal to the paper), namely, in the direction for compensating yaw. Note, the shift function is disclosed in the Japanese Patent Application Laid-Open 6-3727 by the same applicant.

Figure 5:
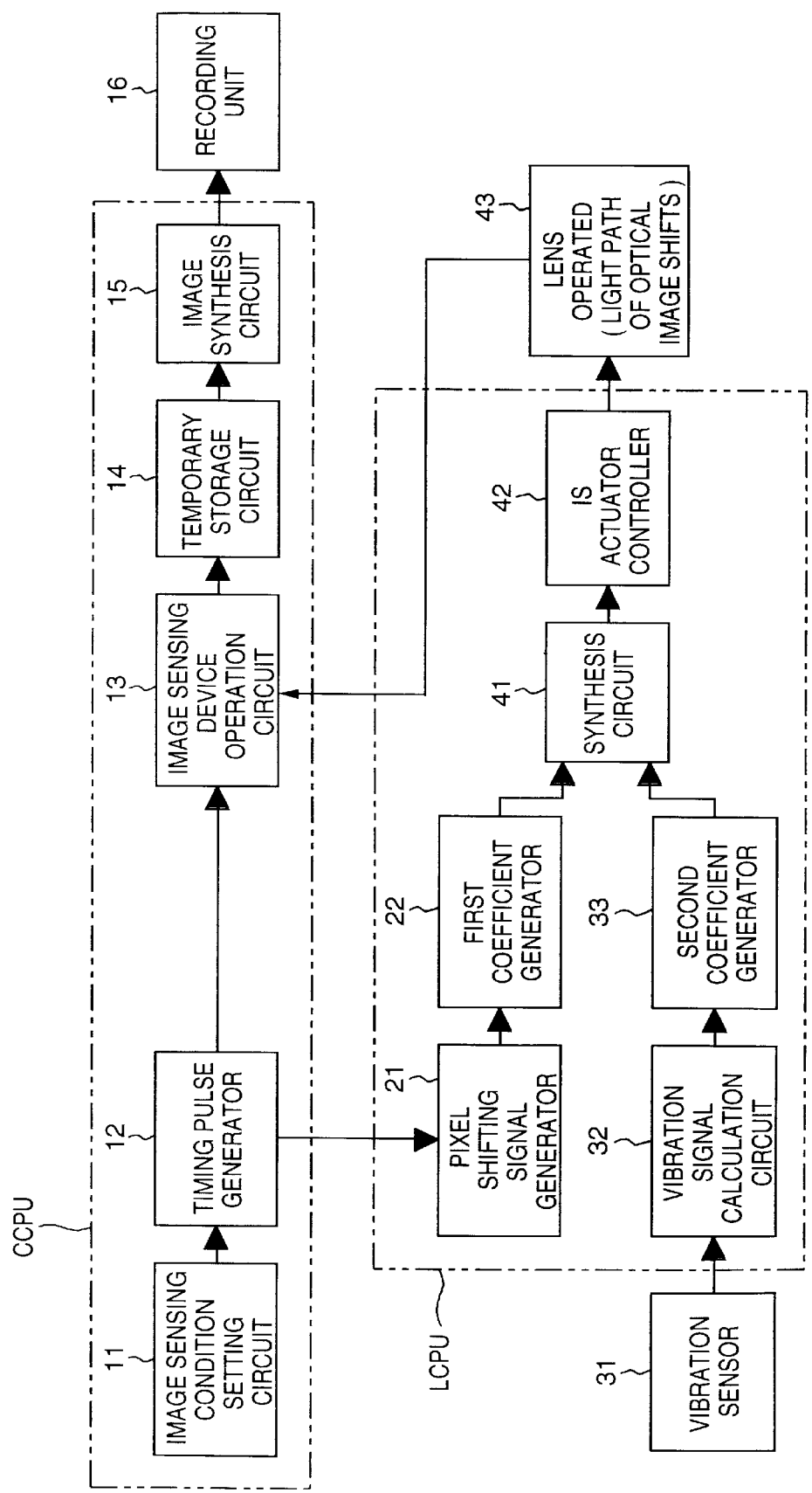
FIG. 5 is a block diagram illustrating a detailed configuration of microcomputers of a camera main body and a lens and their peripheral units according to the embodiment of the present invention.

FIG. 5 is a block diagram illustrating a detailed configuration of the microcomputers CCPU and LCPU of the camera main body CMR and the lens LNS and their peripheral units according to the embodiment of the present invention. Upper blocks enclosed by a two-dot-dash line are included in the microcomputer CCPU of the camera main body CMR, and lower blocks enclosed by another two-dot-dash line is included in the microcomputer LCPU of the lens LNS.

Reference numeral 11 denotes an image sensing condition setting circuit for setting operation modes, such as AE mode, AF mode, pixel shifting mode and IS mode; 12, a timing pulse generator for generating a trigger signal for controlling timing of operation of the lens system for pixel shifting operation and controlling timing for taking image signals from the image sensing device; 13, an image sensing device operation circuit for taking image signals at a predetermined timing under a predetermined charging condition in response to control signals generated by the image sensing condition setting circuit 11 and the timing pulse generator 12; 14, a temporary storage circuit for temporarily storing the obtained image signals until time for performing synthesis operation; 15, an image synthesis circuit for synthesizing plural sets of image signals obtained while performing pixel shifting operation to generate a single image of high resolution; and 16, a recording unit, corresponding to the memory MEM in FIG. 1, for recording the synthesized high-resolution image.

Figure 8:
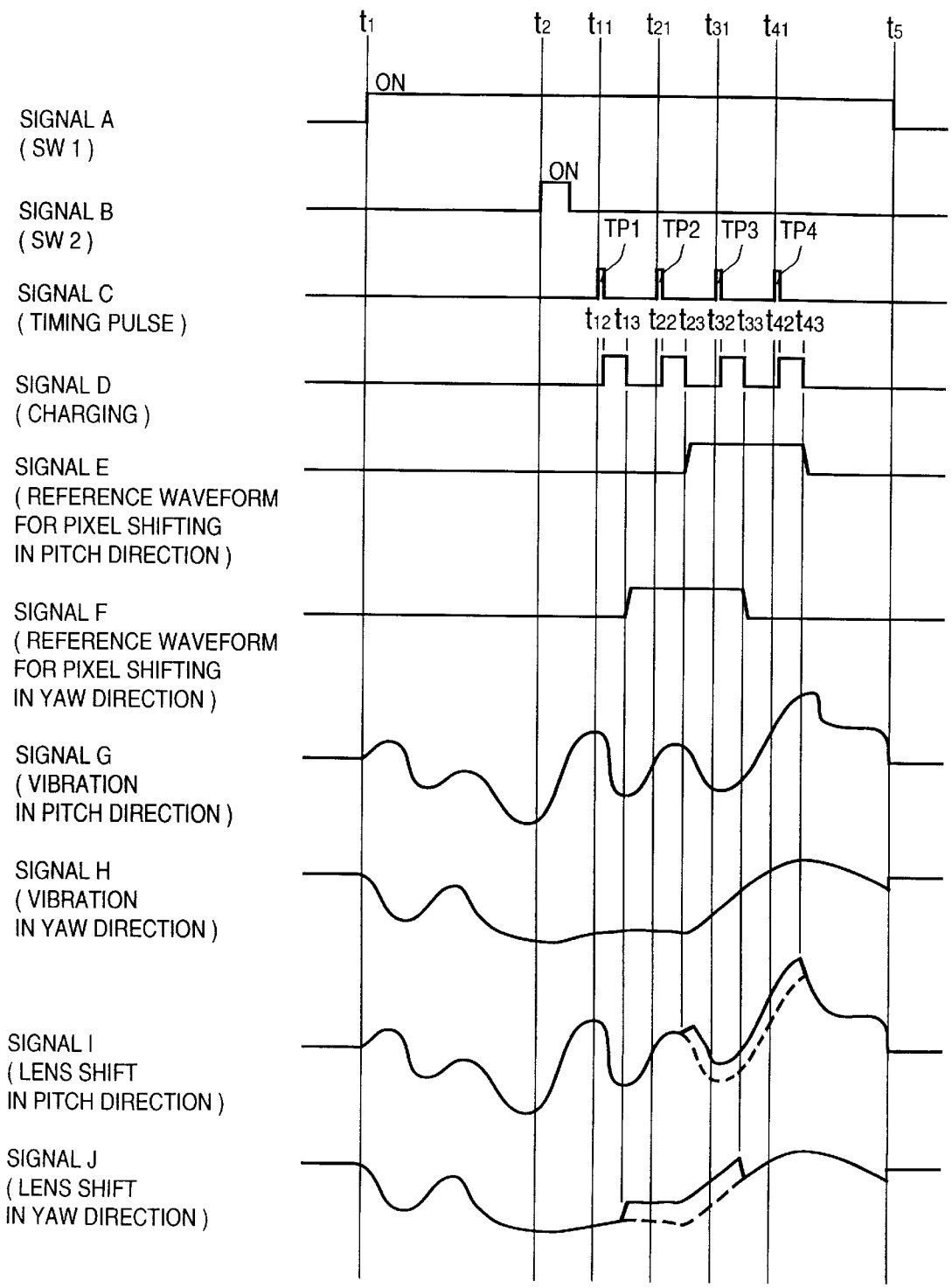
FIG. 8 is a timing chart of the control processing according to the first and eighth embodiments of the present invention.

Further, reference numeral 21 denotes a pixel shifting signal generator for generating instruction signals (signals having reference waveforms shown in FIG. 8. Will be described later in detail) for shifting an image formation position for pixel shifting; and 22, a first coefficient generator for reading data corresponding to the decentering sensitivity Sd(f, R), which is explained above, from the ROM of the microcomputer LCPU in accordance with the focus and zoom information of the lens system, and calculating shift amount instruction values for the second lens group L2, so that the amounts of shifts of the image formation position in the yaw and pitch directions become $X_Y$ and $X_P$, respectively. The shift amount instruction values can be obtained by multiplying the amplitude of the instruction signals generated by the pixel shifting signal generator 21 by the read data (decentering sensitivity Sd(f, R)).

Reference numeral 31 denotes a vibration sensor which corresponds to the vibration-type gyro GRP and GRY, explained above; 32, a vibration signal calculation circuit for performing filtering and accumulation on an angular velocity signal of the vibration detected by the vibration sensor 31, and calculating a vibration angle; and 33, a second coefficient generator for reading data corresponding to the angle sensitivity $S_\theta(f, R)$, explained above, from the ROM of the microcomputer LCPU in accordance with the focus and zoom information of the lens system, correcting the value of the vibration angle calculated by the vibration signal calculation circuit 32, and calculating shift amount instruction values (amplitudes of vibration compensation signals) for the second lens group L2 for image stabilization.

Further, reference numeral 41 denotes a synthesis circuit for adding the shift amount instruction value for the second lens group L2 for pixel shifting calculated by the first coefficient generator 22 and the shift amount instruction value for the second lens group L2 for image stabilization calculated by the second coefficient generator 33; 42, an image stabilization (IS) actuator controller for controlling the pitch actuator IACTP and the yaw actuator IACTY in FIG. 1, so that the second lens group L2 moves in accordance with the value obtained by the synthesis circuit 41; and 43, a block indicating that the second lens group L2 is shifted, in other words, the image formation position on the image sensing device 13 is shifted.

First Embodiment

Figure 6:
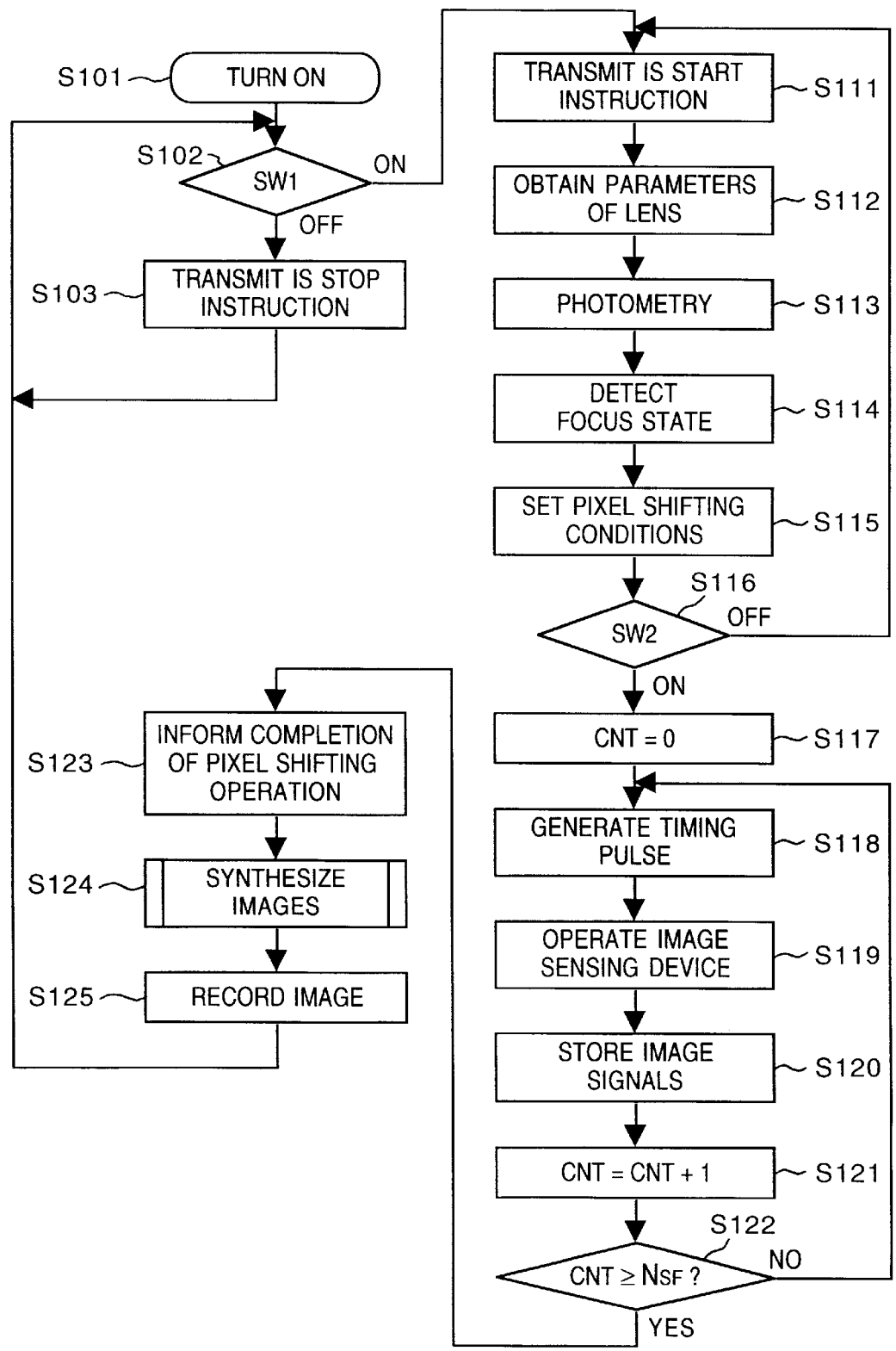
FIG. 6 is a flowchart of control processing in the camera main body according to first to third embodiments of the present invention.
Figure 7:
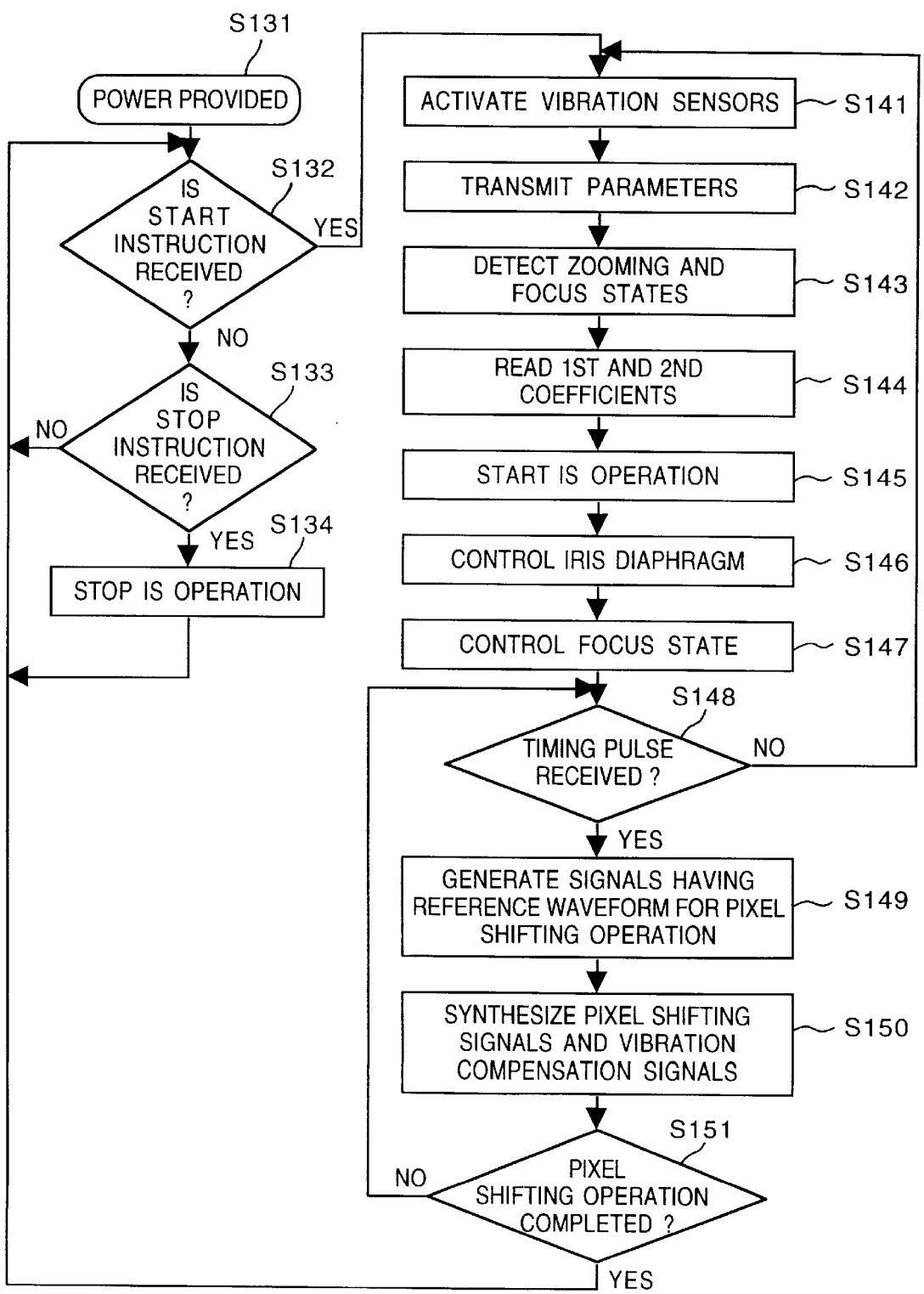
FIG. 7 is a flowchart of control processing in the lens according to the first, fifth, eighth and eleventh embodiments of the present invention.

FIGS. 6 and 7 are flowcharts of control processing by the microcomputer CCPU of the camera main body CMR and the microcomputer LCPU of the lens LNS, respectively, according to a first embodiment of the present invention.

First, a flow of the control processing by the microcomputer CCPU of the camera main body CMR is explained with reference to FIGS. 1 and 6.

When the main switch (power switch) SWMN of the camera main body CMR is turned on in step S101, electric power is supplied to the microcomputer CCPU, then the process proceeds to step S102 where operation of the camera starts.

In step S102, the state of the switch SW1, which is turned on in response to the half stroke of the release button, is detected. If the SW1 is off, then the process proceeds to step S103, where an instruction to stop image stabilization (IS) operation (IS stop instruction) is transmitted to the lens LNS.

The steps S102 and S103 are repeatedly performed until the switch SW1 is turned on or the main switch SWMN is turned off.

When the switch SW1 is turned on in step S102, the process proceeds to step S111. In step S111, the microcomputer CCPU transmits an instruction to start IS operation (IS start instruction) to the microcomputer LCPU via the signal line DCL.

Next in step S112, communication for obtaining parameters which are specific to the lens, such as F number and focal length of the lens, from the microcomputer LCPU is performed.

Then, in step S113, the luminance of the object is sensed by the sensor SNS, and the charging period of the image sensing device for obtaining image signals and the value for controlling the iris diaphragm are calculated in accordance with the predetermined exposure control program, and the microcomputer CCPU transmits the calculation results to the microcomputer LCPU.

The process proceeds to step S114 where the focus state is detected by the sensor SNS, and an instruction for operating the focus lens is transmitted to the microcomputer LCPU.

In step S115, the state of the pixel shifting mode selection switch SWSF is detected. Further, pixel shifting conditions, such as, whether or not the pixel shifting is to be performed and the number of image formation positions $N_{SF}$ on the image sensing device IMS in an image sensing operation (if it determined not to perform pixel shifting, $N_{SF}$ is set to 1, whereas if it is determined to perform pixel shifting, then $N_{SF}$ is set to at least 2), are set on the basis of the result of the photometry.

Thereafter, the process proceeds to step S116, where the state of the switch SW2 which is turned on in response to the full stroke of the release button is detected. If the switch SW2 is OFF, then the process returns to step S111, and steps S111 to S115 are repeated. Whereas, if it is detected that the switch SW2 is ON, then the process proceeds to step S117.

In step S117, a counter CNT for counting the number of image formation positions is initialized to 0.

Then, in step S118, a timing pulse which is a trigger signal for image sensing operation is generated, and transmitted to the microcomputer LCPU.

In step S119, the microcomputer CCPU controls the image sensing device IMS, via the driver IMDR, to charge, then transfer the charges in the image sensing device IMS.

In step S120, the image signals read at step S119 are temporarily stored in the RAM of the microcomputer CCPU.

In step S121, the counter CNT 1 is increased by 1.

In step S122, whether or not the counter CNT reaches the number of image formation positions $N_{SF}$ is determined. If it is not, then the process returns to step S118 and waits for the next timing pulse being generated, then pixel shifting operation is continued. If it is determined that the counter CNT has reached the number of image formation positions $N_{SF}$, then the process proceeds to step S123.

In step S123, completion of pixel shifting operation (or completion of the storing of required image signals) is informed to the microcomputer LCPU.

In step S124, if image signals of a plurality of images are stored in the RAM, then they are synthesized to generate a single high-resolution image, then outputted. Whereas, if image signals of a single image are stored in the RAM, it is not possible to perform synthesis, therefore, the image signals are outputted.

In step S125, the image outputted in step S124 is stored in the memory MEM.

Accordingly, an image sensing operation is completed and the process returns to step S102. If the switch SW1 becomes ON in step S102, then the processes in step S111 and the subsequent steps are repeated, whereas, if the switch SW1 is OFF, then an instruction to stop IS operation is transmitted to the microcomputer LCPU in step S103.

FIG. 7 is the flowchart of control processing by the microcomputer LCPU of the lens LNS.

Referring to FIG. 7, when electric power is provided to the exchange lens, in step S131, in response to the ON operation of the main switch SWMN of the camera main body CMR, then the process proceeds to step S132.

In step S132, whether or not the IS start instruction is received or not is determined, and if the IS start instruction is not received from the camera main body CMR, then the process proceeds to step S133.

In step S133, whether or not the IS stop instruction is received from the camera main body CMR is determined, and if not, the process returns to step S132. If it is determined that the IS stop operation is received, then the process proceeds to step S134 where the IS operation is stopped. More specifically, the pitch and yaw actuators IACTP and IACTY are deactivated.

If the IS start instruction is received from the microcomputer CCPU while performing processes in steps S132 to S134, then the process proceeds from step S132 to step S141.

In step S141, the vibration sensors GRP and GRY are activated, and vibration signals in the pitch and yaw directions are inputted.

Step S142 corresponds to step S112 in FIG. 6, and in response to requests from the microcomputer CCPU, the microcomputer LCPU of the lens LNS transmits the parameters which are specific to the lens LNS to the camera main body CMR.

In step S143, the zoom encoder ZENC and the focus encoder FENC are checked in order to detect zooming and focus states of the lens system.

In step S144, on the basis of the detection result in step S143, the first coefficient for pixel shifting and the second coefficient for IS operation are read from a table stored in the ROM of the microcomputer LCPU.

In step S145, the pitch and yaw actuators IACTP and IACTY are operated on the basis of the vibration signal obtained in step S141 and the second coefficient obtained in step S144 to reduce blurring of an image due to vibration.

In step S146, the microcomputer LCPU operates the iris diaphragm DFM via the iris diaphragm actuator DACT on the basis of the information on a photometry result transmitted from the microcomputer CCPU to control the luminous exposure.

In step S147, the focusing actuator FACT is operated on the basis of the information on the focus state detection obtained from the microcomputer CCPU to adjust focus.

Next, in step S148, whether or not a timing pulse for triggering the pixel shifting operation is received is determined. If no timing pulse is received, the process returns to step S141, and the IS operation, the iris diaphragm control, and the focus adjustment are repeatedly performed. When it is determined in step S148 that the timing pulse is received, the process proceeds to step S149.

In step S149, signals having reference waveforms for driving the second lens group L2 in the pitch and yaw directions for pixel shifting operation are generated by the pixel shifting signal generator 21. Note, the amplitudes of the signals correspond to the distances $X_P$ and $X_Y$, shown in FIG. 4, in the pitch and yaw directions, when it is assumed that there is no effect of the decentering sensitivity.

In step S150, the amplitudes of the signals having reference waveform, generated in step S149, are multiplied by the first coefficient read in step S144, thereby pixel shifting signals which compensates the effect of the decentering sensitivity of the second lens group L2 are generated. Thereafter, the generated pixel shifting signals are synthesized with signals for the IS operation (vibration compensation signals), generated by the second coefficient generator 33, in the synthesis circuit 41. By operating the pitch and yaw actuators IACTP and IACTY in accordance with the synthesized signals, the IS operation and the pixel shifting operation are performed simultaneously and precisely.

In step S151, whether or not a signal indicating completion of the pixel shifting operation is received from the microcomputer CCPU is determined, and if it is not, the process returns to step S148 because the pixel shifting has not been finished. Then, the process waits the next timing pulse. The processes in steps S148 to S150 are repeated for a predetermined number of times, and when the signal indicating completion of the pixel shifting operation is transmitted, the process returns from step S151 to step S132.

Then, if the IS start instruction is not received in step S132 and the IS stop instruction is detected in step S133, then the IS operation is stopped in step S134; more specifically, the pitch and yaw actuators IACTP and IACTY are deactivated, and a series of lens control operation relating to the image sensing operation is completed.

FIG. 8 is a timing chart for explaining operations of the camera main body CMR and the lens LNS shown in the flowcharts in FIGS. 6 and 7.

Signals A and B show states of the switches SW1 and SW2, respectively; a signal C is a timing signal for pixel shifting operation; a signal D is for charging in the image sensing device IMS; signals E and F have reference waveforms for pixel shifting operation (referred to as "pixel shifting reference signals" hereinafter) in the pitch direction and the yaw direction, respectively; and signals G and H are vibration signals, in the pitch and yaw directions, detected by the vibration sensors GRP and GRY, respectively. Here, vibration shift waveforms obtained by processing the detected signals by integration, for example, are shown. Further, signals I and J are operation signals for shifting the second lens group L2 in the pitch and yaw directions, respectively.

Next, overall operation shown in the flowcharts in FIGS. 6 and 7 is explained with reference to the timing chart shown in FIG. 8. When the switch SW1 is turned on at time $t_1$, the vibration signals G and H are outputted. In turn, the second lens group L2 is operated as shown in the waveforms of the signals I and J in accordance with the vibration signals multiplied by the second coefficient.

Then the switch SW2 is turned on at time $t_2$, and after a predetermined period of time elapses from the time $t_2$, a timing pulse TP1 is generated at time $t_{11}$. In turn, the photo-sensing elements of the image sensing device IMS are charged between time $t_{12}$ and time $t_{13}$ in accordance with a charging period calculated on the basis of the result of the photometry.

When the charging operation ends at the time $t_{13}$, the charges are transferred and read. At the same time, the pixel shifting reference signal F in the yaw direction is generated. Accordingly, the second lens group L2 is operated in the yaw direction on the basis of instruction values shown by the signal J, obtained by adding the pixel shifting reference signal F multiplied by the first coefficient and the vibration signal H multiplied by the second coefficient.

After a predetermined period of time has passed since time $t_{11}$, the second timing pulse TP2 is generated at time $t_{21}$. Then, similarly to above, the photo-sensing elements of the image sensing device IMS are charged between time $t_{22}$ and time $t_{23}$. When the charging operation ends at time $t_{23}$, the charges are transferred and read. At the same time, the pixel shifting reference signal E in the pitch direction is generated.

Accordingly, the second lens group L2 is operated in the pitch direction on the basis of instruction values shown by the signal I, obtained by adding the pixel shifting reference signal E multiplied by the first coefficient and the vibration signal G multiplied by the second coefficient.

After a predetermined period of time has passed since time $t_{21}$, the third timing pulse TP3 is generated at time $t_{31}$. Then, similarly to above, the photo-sensing elements of the image sensing device IMS are charged between time $t_{32}$ and time $t_{33}$. When the charging operation ends at time $t_{33}$, the charges are transferred and read. At the same time, the value of the pixel shifting reference signal F in the yaw direction is changed to the initial value. Accordingly, the second lens group L2 is operated in the yaw direction on the basis of instruction values shown by the signal J, corresponding to the vibration signal H multiplied by the second coefficient.

After a predetermined period of time has passed since time $t_{31}$, the last timing pulse TP4 is generated at time $t_{41}$. Then, similarly to above, the photo-sensing elements of the image sensing device IMS are charged between time $t_{42}$ and time $t_{43}$. When the charging operation ends at time $t_{43}$, the charges are transferred and read. At the same time, the value of the pixel shifting reference signal E in the pitch direction is changed to the initial value. Accordingly, the second lens group L2 is operated in the pitch direction on the basis of instruction values shown by the signal I, corresponding to the vibration signal G multiplied by the second coefficient.

After the switch SW1 is turned off at time $t_5$, the vibration detection and the operation of the second lens group L2 are stopped.

The given point of an image on the image sensing device IMS while performing the image stabilization and the pixel shifting operation at time $t_{11}$, $t_{21}$, $t_{31}$, $t_{41}$ and $t_5$ are at IM1, IM2, IM3, IM4 and IM1 in FIG. 4, respectively, thus image formation positions of the image are shifted by a half pixel distance from each other in the vertical and horizontal directions.

Note, the reason for the pixel shifting reference waveform being a trapezoid shape rather than a square shape is to mitigate shock of sudden movement of the second lens group L2.

Next, the principle for generating an image signal of a single high-resolution image by synthesizing a plurality of images obtained while performing pixel shifting operation is explained with reference to FIGS. 9A, 9B and 10A to 10E.

Figure 9A:
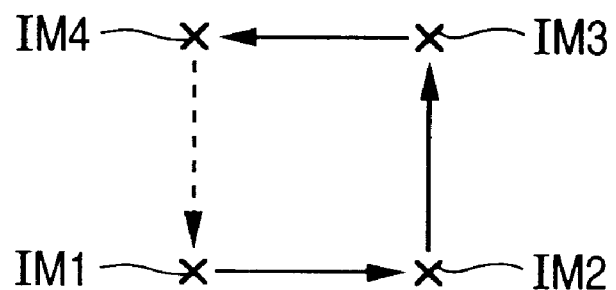
FIGS. 9A and 9B are drawings for explaining pixel shifting method according to the first, fifth and eighth embodiments of the present invention.
Figure 9B:
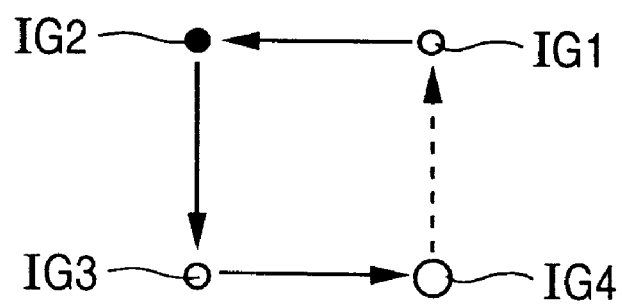
Figure 10B:
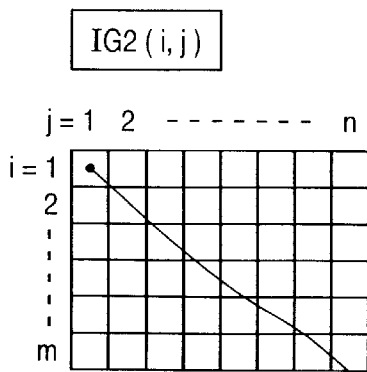
FIGS. 10A to 10E are drawings for explaining image synthesis method according to the first, fifth, eighth and eleventh embodiments of the present invention.
Figure 10A:
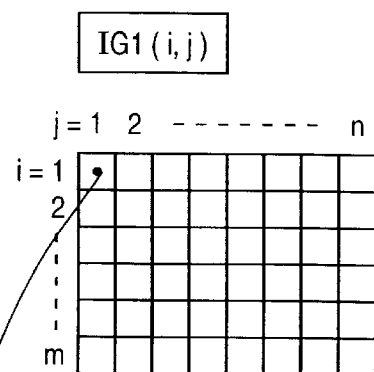
Figure 10C:
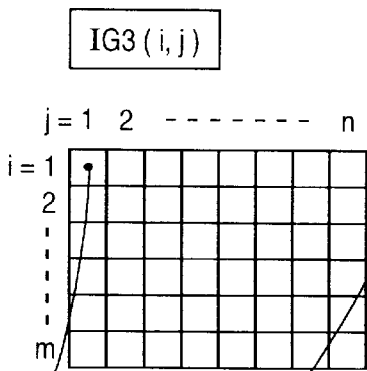
Figure 10D:
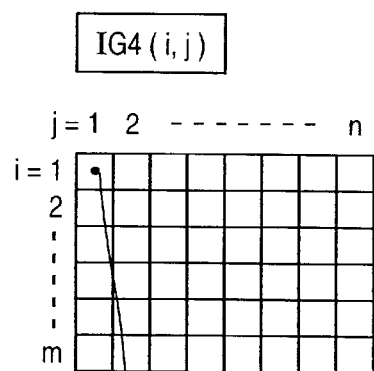
Figure 10E:
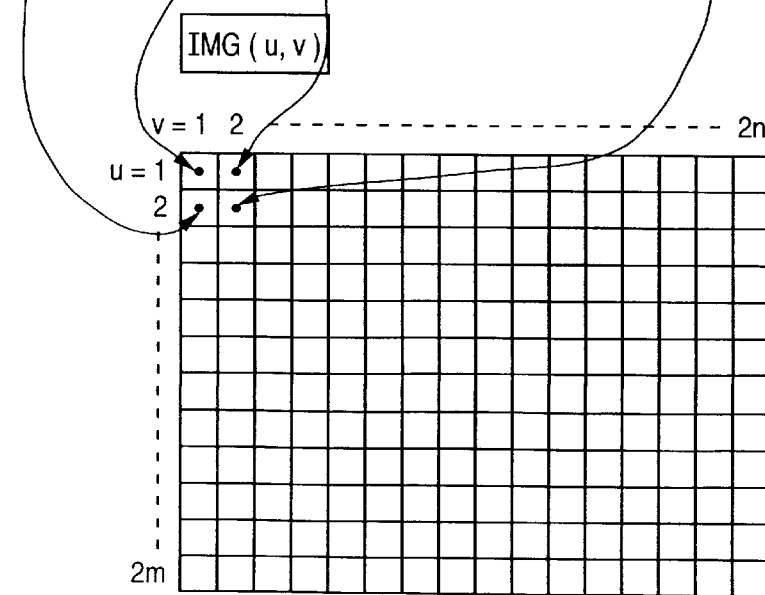

FIGS. 9A and 9B are views for explaining relative position relationship between an image and the image sensing device IMS in pixel shifting operation. FIG. 9A corresponds to FIG. 4, and it shows that the position of the image shifts in the order of IM1, IM2, IM3, IM4, and IM1 with respect to the pixels of the image sensing device IMS fixed in the camera main body CMR. The above movement is equivalent to a case where the position of the image sensing device IMS moves in the order of IG1, IG2, IG3, IG4, and IG1 with respect to a fixed object. Now, let an output signal from each pixel when the image sensing device IMS is at the position, IG1, be IG1(i, j), where i and J are coordinates of the pixel. The image sensing device IMS is an area sensor having m×n pixels. Similarly, let output signals when image sensing device IMS is at the positions, IG2, IG3 and IG4, be IG2(i, j), IG3(i, j), and IG4(i, j), respectively.

FIGS. 10A to 10E show how to synthesize these four sets of image signals.

Let a new set of image signals representing 2m×2n pixels obtained by four sets of m×n pixels be denoted by IMG(u, v). The four left uppermost corner pixels of the image signals IMG(u, v) are obtained by synthesizing the respective left uppermost corner pixels of the four original images as shown in FIGS. 10A to 10E. When a method for synthesizing images is considered with reference to FIGS. 10A to 10E, it is possible to obtain an image signal of a single high-resolution image from the four original images by using the following four equations;

$$IMG(u = 2i - 1, v = 2j) \leftarrow IG1(i, j) \tag{7}$$

$$IMG(u = 2i - 1, v = 2j - 1) \leftarrow IG2(i, j) \tag{8}$$

$$IMG(u = 2i, v = 2j - 1) \leftarrow IG3(i, j) \tag{9}$$

$$IMG(u = 2i, v = 2j) \leftarrow IG4(i, j) \tag{10}$$

Note, the aforesaid pixel shifting operation and the image synthesis method is used when image signals are obtained from a black-and-white image sensing device and a multiple-CCD type color image sensing device using a color separation prism. When image signals are obtained from a single CCD type color image sensing device covered with a mosaic color filter, although there are little differences in pixel shifting amount in the pixel shifting operation and the image synthesis method, the basic ideas of the pixel shifting operation and the image synthesis are the same.

According to the first embodiment as described above, (1) By changing a pixel shifting signal in accordance with the first coefficient, changing a vibration signal in accordance with the second coefficient, and operating an image stabilization lens system on the basis of the synthesized signal of the above two changed signals, it is possible to perform image stabilization operation and pixel shifting operation at the same time using only a single image shifting means, i.e., the image stabilization lens system. Accordingly, it is possible to obtain a high-resolution image, by pixel shifting operation, with less deterioration due to vibration.

(2) By using the first and second coefficients selected in accordance with zooming and focus states, it is possible to always perform precise image stabilization operation and pixel shifting control even when the zooming and focus states are changed.

(3) Since synthesis of images obtained while performing pixel shifting operation is performed within a camera, an image signal of a high-resolution image can be obtained without using an exclusive external device.

Second Embodiment

The first embodiment is for precisely and simultaneously performing image stabilization and pixel shifting operation. In the following second embodiment, an optimum pixel shifting mode is selected in accordance with the state of the camera.

Figure 11:
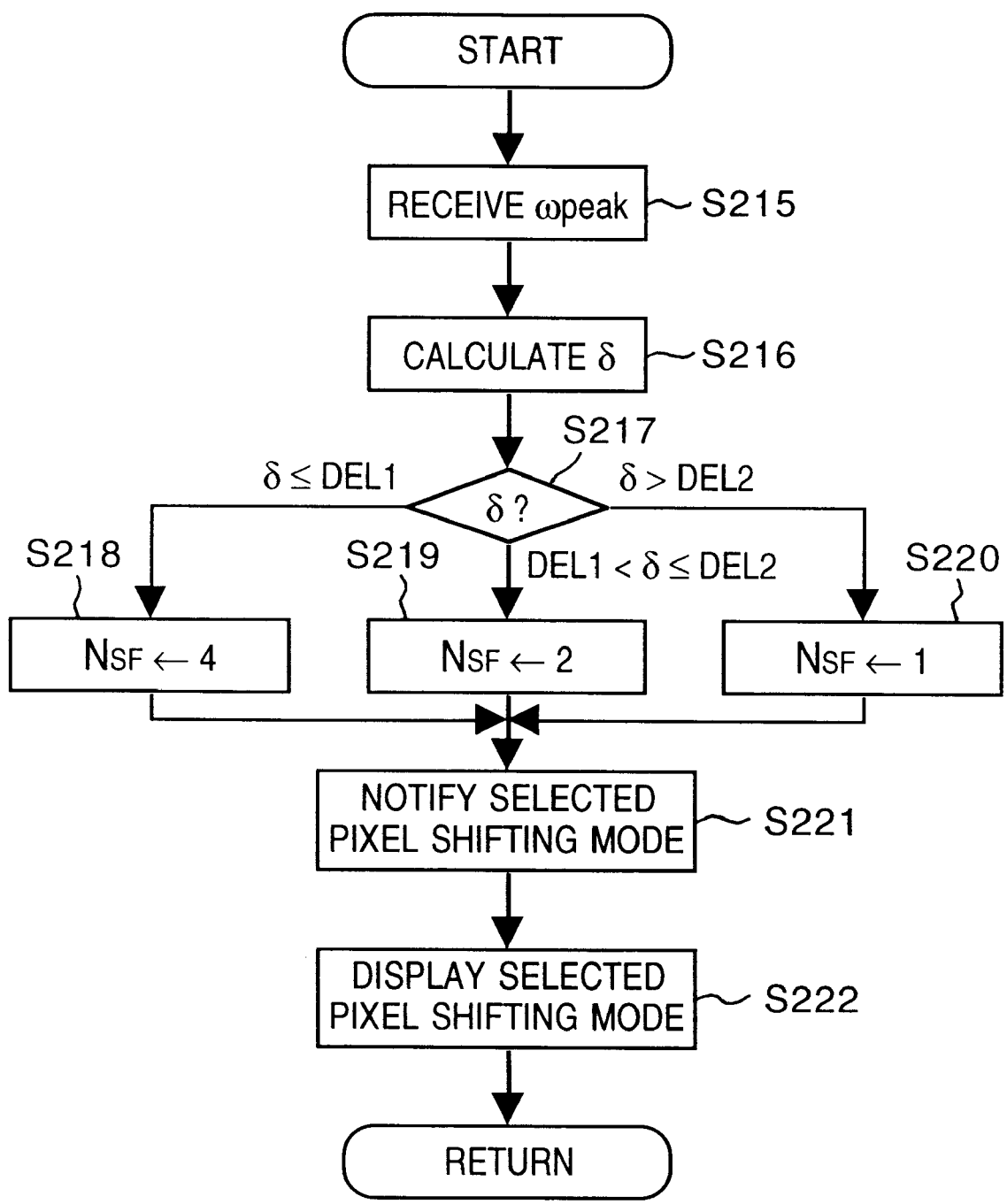
FIG. 11 is a flowchart of control processing in the camera main body according to a second embodiment of the present invention.
Figure 12A:
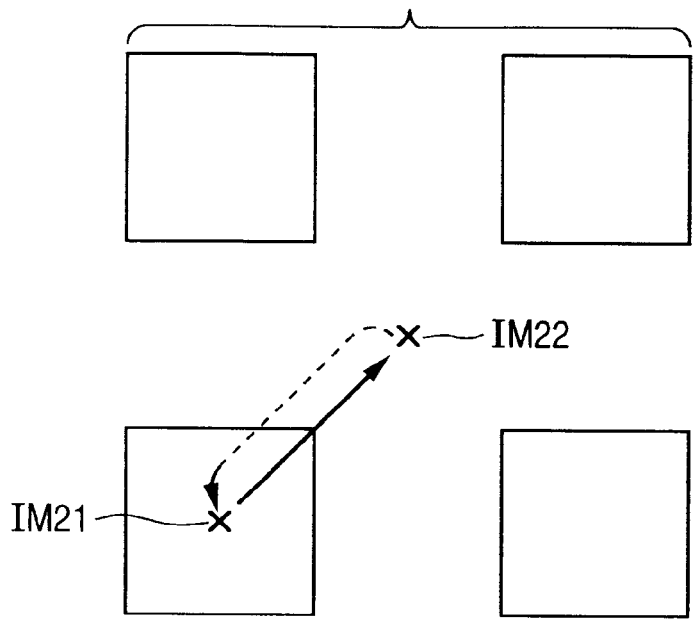
FIGS. 12A and 12B are views for explaining pixel shifting method according to the second and sixth embodiments of the present invention.
Figure 12B:
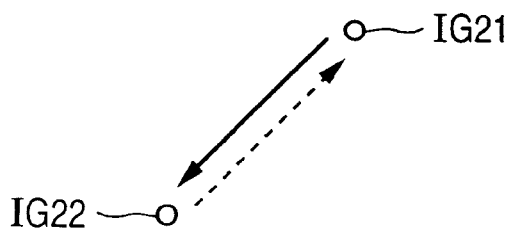
Figure 13A:
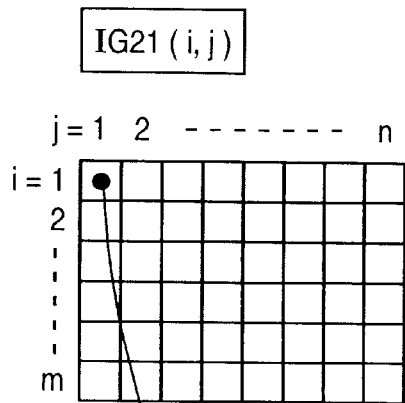
FIG. 13A to 13C are drawings for explaining image synthesis method according to the second and sixth embodiments of the present invention.
Figure 13B:
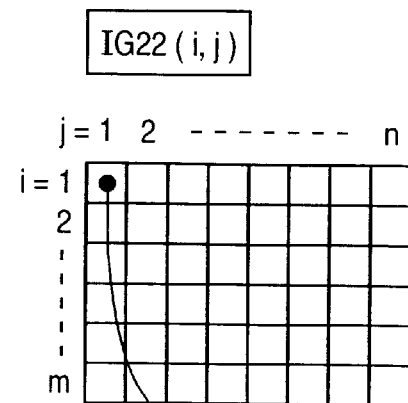
Figure 13C:
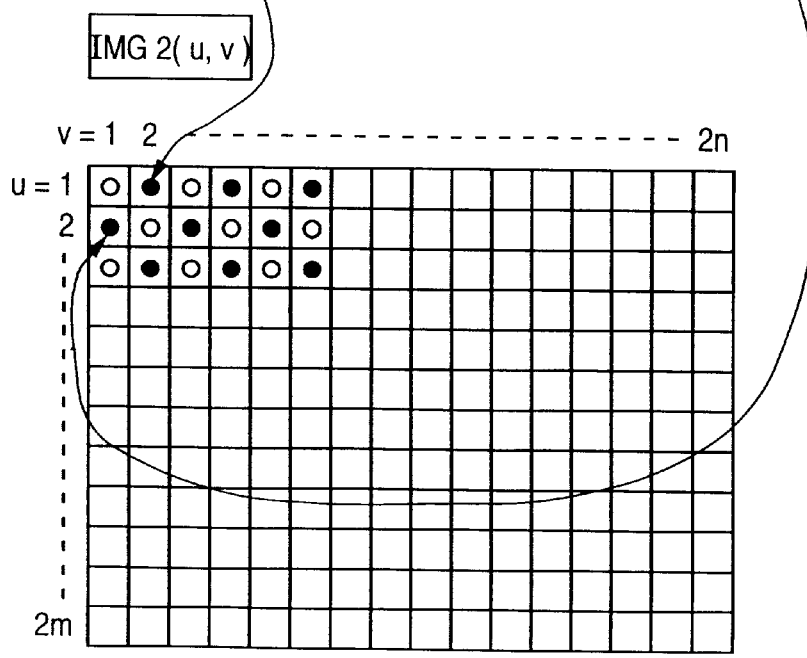

FIG. 11 Is a flowchart showing control processing in the camera main body CMR according to the second embodiment; FIGS. 12A and 12B are views for explaining relative position relationship between an image and the image sensing device IMS in pixel shifting operation according to the second embodiment; and FIGS. 13A to 13C are views for explaining a principle of image synthesis in a second pixel shifting mode (will be explained later). The second embodiment will be explained with reference to accompanying drawings.

The control processing in the camera main body CMR in the second embodiment is basically the same as that shown in FIG. 6 explained in the first embodiment. However, the process performed in step S115, i.e., "to set a pixel shifting condition" is realized by a sub-routine as shown in FIG. 11, thereby the advantage of the second embodiment can be obtained. Below, the control processing according to the second embodiment will be explained with reference to FIGS. 6 and 11. Since the processes shown in FIG. 6 have been already explained in detail in the first embodiment, they are only briefly explained in the second embodiment.

Referring to FIG. 6, when it is determined in step S102 that the switch SW1 is ON, then the process proceeds to step S111. Thereafter, an IS start instruction is transmitted to the lens LNS in step S111 and parameters are received from the lens LNS in step S112. Next in steps S113 and S114, photometry and focus state detection are performed, and the obtained results are transmitted to the microcomputer LCPU of the lens LNS.

In the next step, S115, the processes shown in FIG. 11 are performed. In step S215 in FIG. 11, the microcomputer CCPU requests transmission of the peak value of vibration angular velocity, $\omega_{peak}$, in a predetermined period of time to the microcomputer LCPU. In turn, the microcomputer LCPU transmits the peak value of the vibration angular velocity $\omega_{peak}$ occurring in a two second interval, for example, to the microcomputer CCPU.

In step S216, the maximum vibration value $\delta$ while exposing the image sensing device IMS when the IS function is not operated is calculated on the basis of the following equation, $$\delta = f \times \omega_{peak} \times t_{exp} \quad (11)$$

where, f denotes a focal length of the optical system, and $t_{exp}$ is an exposure time, i.e., charging period, of the image sensing device determined on the basis of the result of photometry. The maximum vibration value $\delta$ obtained here is used in the subsequent steps as an index of vibration for determining whether or not pixel shifting operation should be performed.

In step S217, the value of the maximum vibration value $\delta$ is checked. If the maximum vibration value $\delta$ is equal or less than a predetermined value DEL1, then it is determined that effect of vibration is small, thus the quality of an image would improve by performing pixel shifting operation. Accordingly, the process proceeds to step S218 and the number of image formation positions $N_{SF}$, is set to four. Here, the number of image formation positions, four, indicates the same pixel shifting operation and image synthesis explained in the first embodiment. This overall operation is referred to as "first pixel shifting mode" in the second embodiment.

Whereas, if it is determined in step S217 that the vibration value $\delta$ is larger than the value DEL1 and equal or less than a predetermined value DEL2 (DEL2>DEL1), then the process proceeds to step S219 where the number of image formation positions $N_{SF}$ is set to two. This is because deterioration of an image is expected to some degree even if the image stabilization is performed. Therefore, a mode which requires less image formation positions is selected (this mode is referred to as "second pixel shifting mode") so as to reduce deterioration of the image quality due to vibration and to realize an optimum improvement in image quality. Details of the second pixel shifting mode are explained later.

In step S217, when it is determined that the vibration value $\delta$ is greater than the predetermined value DEL2, then in step S220, the number of image formation positions $N_{SF}$ is set to 1 indicating that no pixel shifting operation is to be performed. The reason for setting the number of image formation positions $N_{SF}$ to 1 is that the effect of the vibration which causes deterioration of an image is stronger than the effect of pixel shifting operation which improves the quality of the image. Therefore, the pixel shifting is disabled.

After one of the processes in steps S218 to S220 is performed, the process proceeds to step S221.

In step S221, information on the determined pixel shifting mode is transmitted to the microcomputer LCPU of the lens LNS.

In step S222, the type of the pixel shifting mode is displayed on the display device DISP of the camera main body CMR to inform the user of which mode is used for photographing an image.

After step S222 is completed, the process returns to step S116.

In step S116, determination of the state of the switch SW2 is performed, and if SW2 is ON, then the process proceeds to step S117.

In steps S117 to S122, the pixel shifting is performed as explained in the first embodiment, however, in the second embodiment, the pixel shifting is performed in accordance with the selected pixel shifting mode determined in steps S215 to S222. Therefore, the pixel shifting operation is performed in the selected pixel shifting mode if either the first or second pixel shifting mode is selected. Whereas, if it is determined in the steps S215 to S222 not to perform pixel shifting operation, image formation position is not shifted.

Then, in step S123, the completion of the pixel shifting operation (or completion of the storing of required image signals) is informed to the microcomputer LCPU, and the process proceeds to step S124. In step S124, the image synthesis processing corresponding to the selected pixel shifting mode is performed if the first or second pixel shifting mode is selected. If the pixel shifting operation was not performed, there is no need to perform image synthesis, therefore, the photographed image is directly outputted.

Then, in step S125, the obtained image is recorded and the process returns to step S102.

FIGS. 12A and 12B are views for explaining pixel shifting method when the number of image formation positions is two. FIG. 12A shows shift of an image with respect to the image sensing device IMS. As shown in FIG. 12A, the image sensing device IMS is charged and read when a given point of an image is at a position IM21. Then, after the point of the image is shifted to the position IM22, the image sensing device is charged and read again. Thereafter, the image formation position is moved back to the initial position so that the point of the image is formed at the position IM21.

FIG. 12B shows a movement of the image sensing device IMS equivalent to the aforesaid movement of the image shown in FIG. 12A, and a pixel of the image sensing device IMS which is at an initial position IG21 is moved to the position IG22 by pixel shifting operation, then moved back to the initial position IG21.

FIG. 13 is a view for explaining an image synthesis method in the second pixel shifting mode. In the second pixel shifting mode, on the basis of image signals of two images, IG21(i, j) and IG22(i, j), namely, image signals of (2×m×n) pixels, an image IMG2(u, v) expressed with (4×m× n) pixels is obtained. For this reason, pixels expressed by black dots in IMG2(u, v) are the same values as pixels in the images IG21(i, j) and IG22(i, j), and the pixels shown by white dots are interpolated with averages of the values of the neighboring four pixels (at edge, two or three pixels, instead of four pixels).

In equations, $$IMG2(u=2i-1, v=2j) \leftarrow IG21(i, j) \quad (12)$$

$$IMG2(u=2i, v=2j-1) \leftarrow IG22(i, j) \quad (13)$$

$$IMG2(u=2i-1, v=2j-1) \leftarrow \{IG21(i, j)+IG22(i, j)+IG21(i, j-1)+IG22(i-1, j)\}/4 \quad (14)$$

$$IMG2(u=2i, v=2j) \leftarrow \{IG21(i, j)+IG22(i, j)+IG21(i+1, J)+IG22(i, j+1)\}/4 \quad (15)$$

According to the second embodiment as described above, in addition to the same effects as those of the first embodiment, (4) It is possible to perform the optimum pixel shifting operation in accordance with image sensing conditions since the optimum image sensing mode is selected in accordance with the vibration in consideration of possibility of deteriorating image quality due to vibration while performing the pixel shifting operation and effect of the pixel shifting operation on resolution of the image.

Third Embodiment

In the second embodiment, the optimum pixel shifting mode is selected in accordance with vibration. In the third embodiment, whether or not the pixel shifting operation is to be performed is determined in accordance with an image sensing mode set by a user, and, if it is determined to perform pixel shifting operation, the pixel shifting mode is changed in accordance with the image sensing mode.

Figure 14:
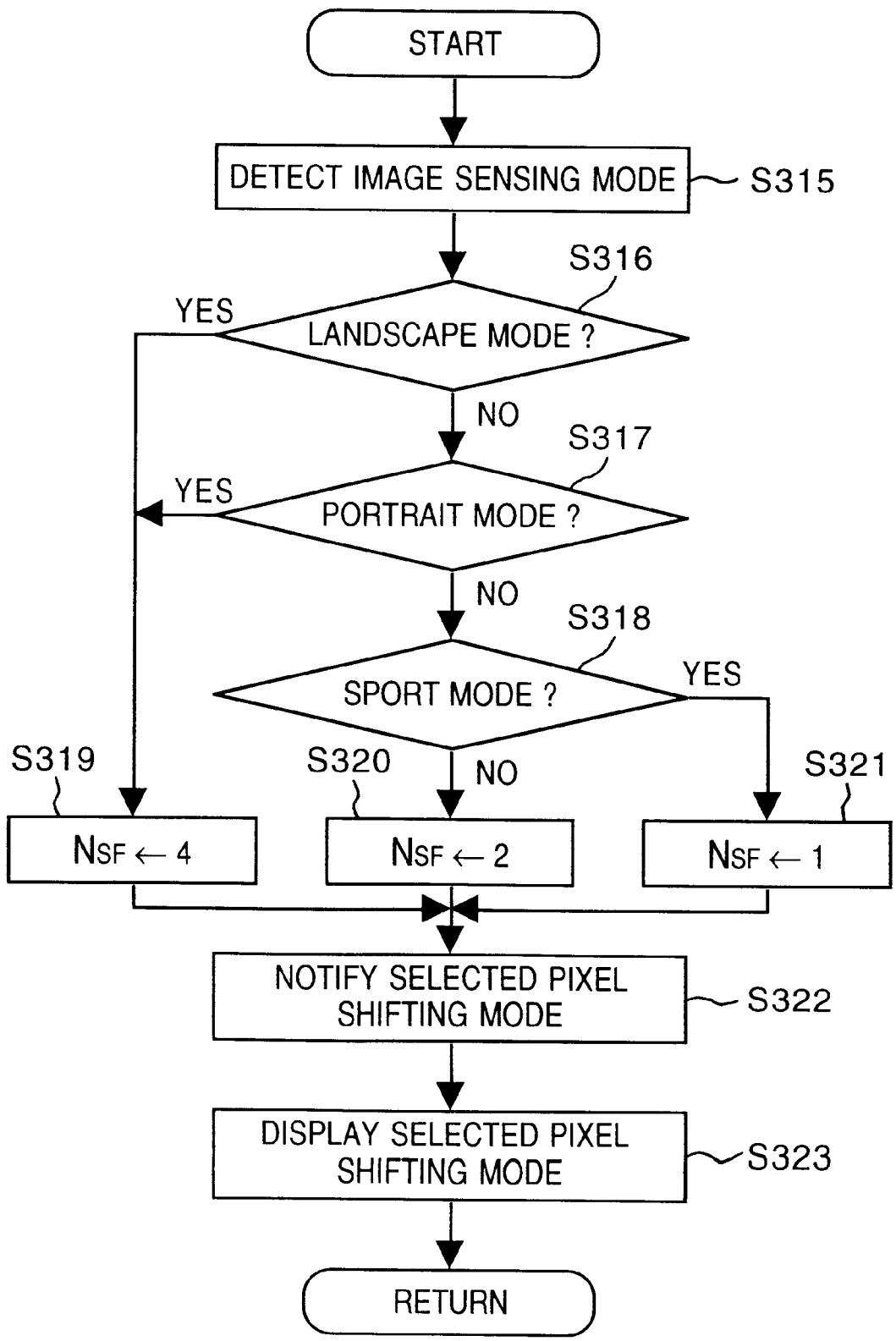
FIG. 14 is a flowchart of control processing in the camera main body according to a third embodiment of the present invention.

The control processing in the camera main body CMR in the third embodiment is basically the same as that shown in FIG. 6 explained in the first embodiment, similarly to the second embodiment. However, the process performed in step S115, i.e., "to set a pixel shifting condition" is realized by a sub-routine as shown in FIG. 14, thereby the advantage of the third embodiment can be obtained. Below, the control processing according to the third embodiment will be explained with reference to FIGS. 6 and 14. Since the processes shown in FIG. 6 have been already explained in detail in the first embodiment, they are only briefly explained in the second embodiment.

Referring to FIG. 6, when it is determined in step S102 that the switch SW1 is ON, the process proceeds to step S111. Thereafter, an IS start instruction is transmitted to the lens LNS in step S111 and parameters are received from the lens LNS in step S112. Next in steps S113 and S114, photometry and focus state detection are performed, and the obtained results are transmitted to the microcomputer LCPU of the lens LNS.

In the next step, S115, the processes shown in FIG. 14 are performed. In step S315 in FIG. 14, the status of the image mode selection switch SWMOD (image sensing mode) provided in the camera main body CMR is determined, thereby image sensing conditions, such as exposure control mode, set by the user are determined.

In step S316, whether or not the image sensing mode selected by the user is a landscape mode is determined. Landscape mode is an exposure control mode in which field depth is deepened by setting a small iris diaphragm control value (large F number). When the landscape mode is set, it is expected that the object stands still, and the camera is held still, thus vibration would not occur in most cases. Accordingly, the process proceeds to step S319, where a "high-resolution" mode for sensing four images while shifting between four image formation positions in pixel shifting operation is set. When it is determined in step S316 that the set image sensing mode is not the landscape mode, then the process proceeds to step S317.

In step S317, whether or not the selected image sensing mode is a portrait mode is determined. Portrait mode is an exposure control mode in which field depth is narrowed by setting the iris diaphragm control value to near open (small F number). Since it is expected that the conditions for photographing in the portrait mode is similar to those of the landscape mode, the process proceeds to step S319. Whereas, if it is determined in step S317 that the set image sensing mode is not the portrait mode, then the process proceeds to step S318.

In step S318, whether or not the set image sensing mode is a sport mode is determined. Sport mode is an exposure control mode for photographing a moving object as if it is not moving by shortening exposure time. When the sport mode is selected, it is expected that the object is moving and the camera may be panning. In other words, the movement of the camera similarly to the vibration by a large displacement amount is expected. Further, blurring of the object due to the movement of the object while performing pixel shifting operation is expected. Accordingly, improvement of image quality is not anticipated; on the contrary, the obtained image by performing pixel shifting operation would be unnatural. Therefore, when the sport mode is set, the process proceeds to step S321 where $N_{SF}$ is set to one and the pixel shifting is disabled. If it is determined in step S318 that the sport mode is not set, namely, when the set image sensing mode is not any of the landscape, portrait, and sport modes, the process proceeds to step S320, and the number of image formation positions $N_{SF}$ is set to two.

After one of the processes in steps S319 to S321 is performed, the process proceeds to step S322.

In step S322, information on the determined pixel shifting mode is transmitted to the microcomputer LCPU of the lens LNS.

In step S323, the type of the pixel shifting mode is displayed on the display device DISP of the camera main body CMR to inform the user of which mode is used for photographing an image.

After step S323 is completed, the process returns to step S116.

In step S116, determination of the state of the switch SW2 is performed, and if SW2 is ON, then the process proceeds to step S117.

In steps S117 to S122, the pixel shifting is performed in accordance with the selected pixel shifting mode as explained in the second embodiment.

Then, in step S123, the completion of the pixel shifting operation (or completion of the storing of required image signals) is informed to the microcomputer LCPU, and the process proceeds to step S124. In step S124, the image synthesis processing corresponding to the selected pixel shifting mode is performed as described in the second embodiment.

In step S125, the obtained image is recorded and the process returns to step S102.

According to the third embodiment as described above, in addition to the same effects as those of the first embodiment, (5) It is possible to perform an optimum pixel shifting operation suitable for movements of both a camera and an object by determining whether or not it is appropriate to perform pixel shifting operation and changing pixel shifting modes, in accordance with an image sensing mode set by the user.

Further, an image sensing mode is selected on the basis of different photographing situations which require different exposure control, however, an image sensing mode may be selected on the basis of the result of focus state detection.

Fourth Embodiment

In the first embodiment, the pixel shifting operation and the image stabilization are achieved using one shifting device, namely, the second lens group L2, which is operated in accordance with the shift amounts adjusted by the first coefficient for the pixel shifting operation and the second coefficient for the image stabilization. It is possible to use the first coefficient in an image stabilization method which is different from the aforesaid image stabilization method in order to further improve image stabilization ability.

Figure 15:
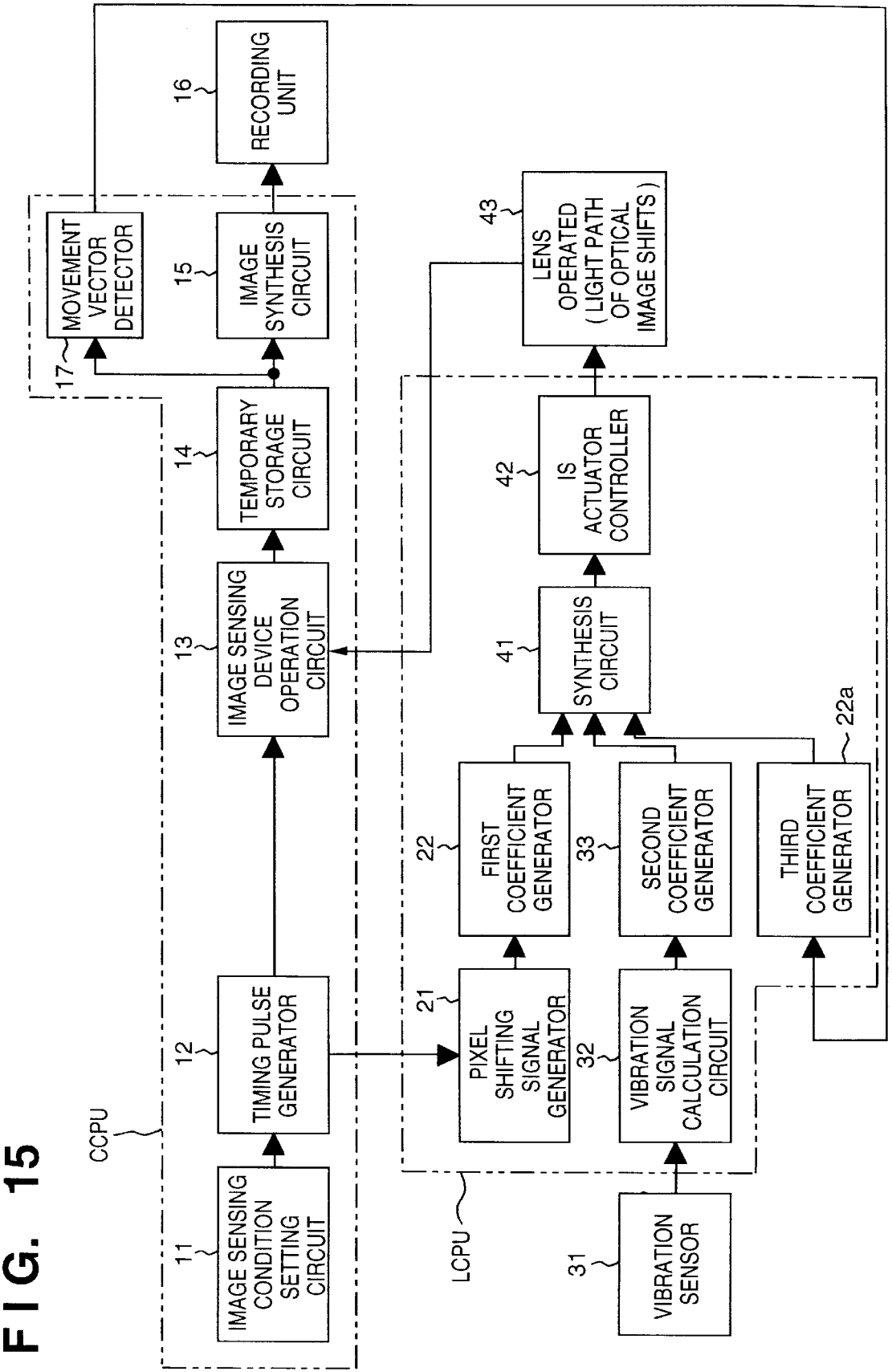
FIG. 15 is a block diagram illustrating a detailed configuration of microcomputers of the camera main body and the lens and their peripheral units according to a fourth embodiment of the present invention.

FIG. 15 is a block diagram illustrating a detailed configuration of microcomputers CCPU and LCPU of the camera main body CMR and the lens LNS and their peripheral units according to the fourth embodiment of the present invention. This is a modified version of the block diagram shown in FIG. 5. As shown in FIG. 15, a movement vector detector 17 is added to the microcomputer CCPU of the camera main body CMR and a third coefficient generator 22a is added to the microcomputer LCPU of the lens LNS.

The movement vector detector 17 is a known circuit for detecting shifted amount, due to vibration, between two images sensed at different times, on the basis of a spatial correlation of image signals of the two images, and used in, so-called, electronic image stabilization. The two images used for movement vector detection are those obtained while performing pixel shifting operation or those obtained periodically with no relation to pixel shifting operation. Alternately, a signal from the focus state detection sensor may be used. Note, image formation positions of the two images obtained in pixel shifting operation are naturally shifted by a predetermined amount, therefore, it is necessary to correct the shifted amount in consideration of the shift amount due to the pixel shifting operation for detecting a movement vector.

Since an image stabilization (IS) system including vibration detection sensors, such as vibration-type gyroscopes, utilizing inertia is provided to the camera in the fourth embodiment, while the IS system is operated, theoretically, blurring of an image is corrected, and thus the movement vector detector 17 does not detect vibration. However, the vibration detection sensors, such as the vibration-type gyro, utilizing inertia have a defect that it can not detect vibration of a very low frequency range because of direct-current offset and drift of an output signal, for instance. Therefore, the movement vector detector 17 detects low frequency vibration while the IS system is operated. Thus, the vibration signal detected by the movement vector detector 17 is converted by the third coefficient generator 22a, and the converted value, the shift amount instruction value, calculated by the first coefficient generator 22, for the second lens group L2 for pixel shifting operation, and the shift amount instruction value, calculated by the second coefficient generator 33, for the second lens group L2 for image stabilization are synthesized in the synthesis circuit 41. Then, by operating the IS actuator 42 on the basis of the synthesized signals, the IS system capable of compensating vibration in a wide frequency range, from a low frequency to a high frequency is realized, thereby image stabilization ability is improved. Accordingly, blurring of images obtained while performing pixel shifting operation is reduced, thereby contributing to improvement of resolution of an image.

Figure 16:
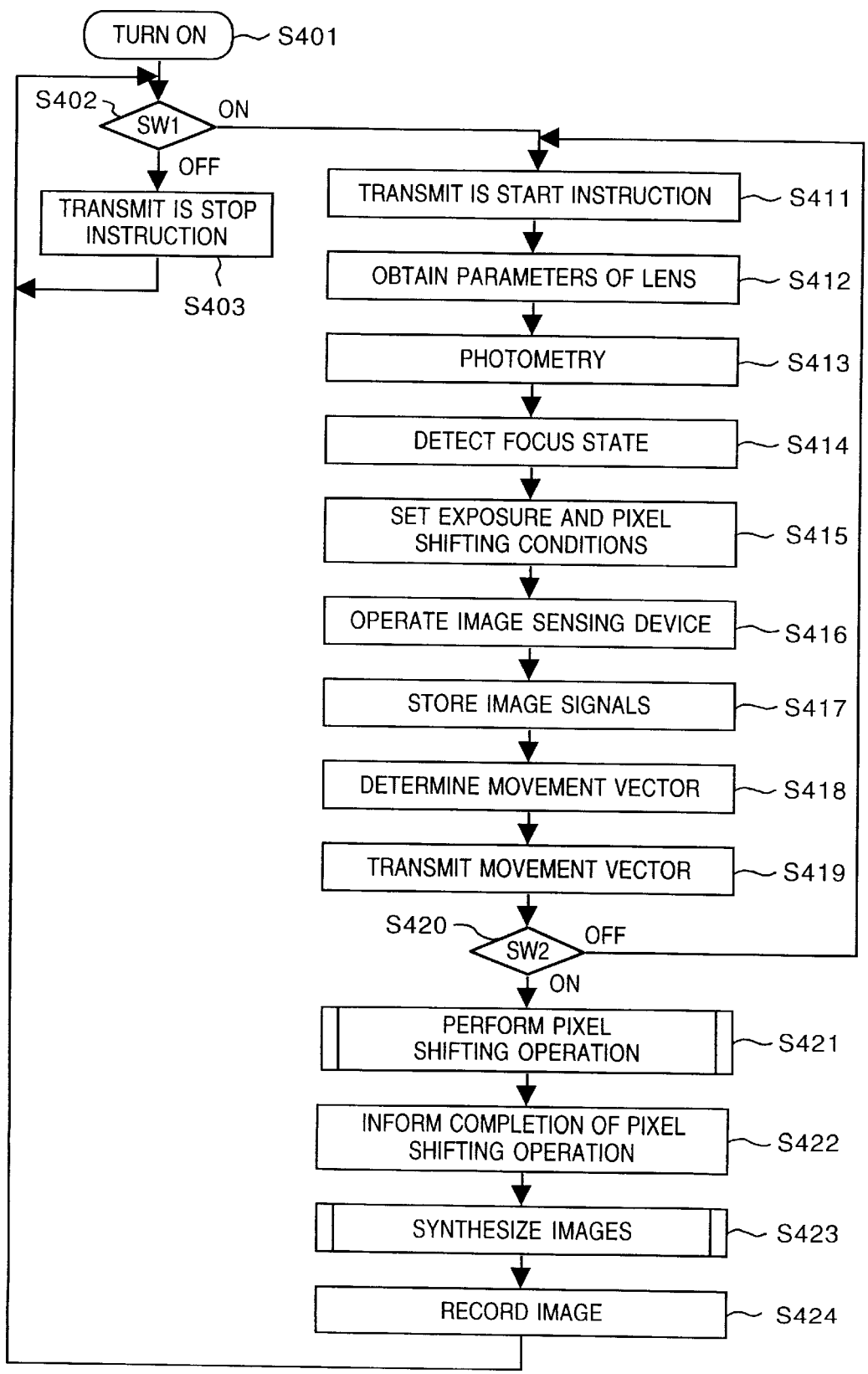
FIG. 16 is a flowchart of control processing in the camera main body according to the fourth embodiment of the present invention.
Figure 17:
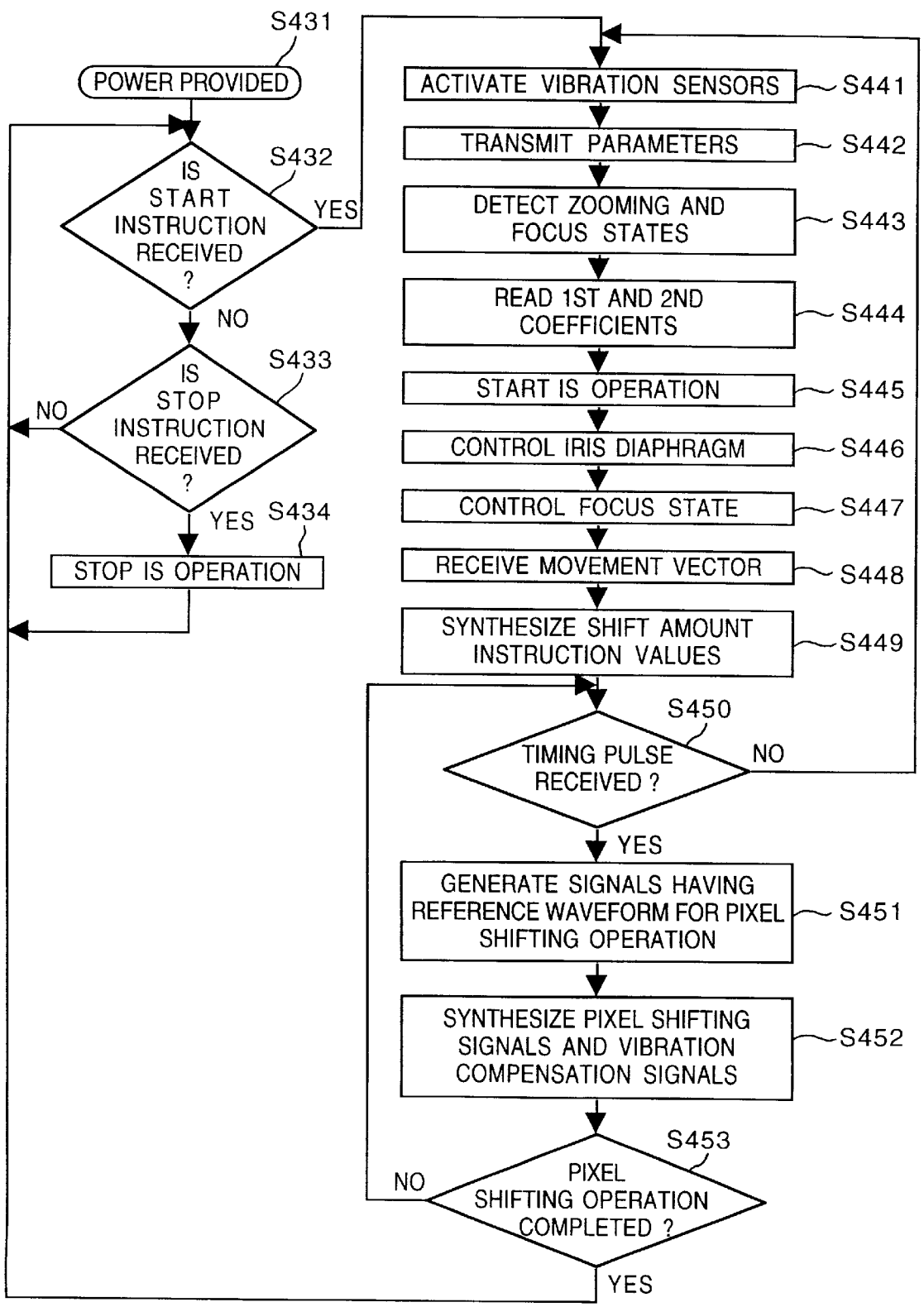
FIG. 17 is a flowchart of control processing in the lens according to the fourth embodiment of the present invention.

FIGS. 16 and 17 are flowcharts of control processings by the microcomputers in the camera main body CMR and in the lens LNS, respectively, according to the fourth embodiment of the present invention.

First, a flow of the control processing by the microcomputer CCPU of the camera main body CMR is explained with reference to FIGS. 1 and 16.

When the main switch (power switch) SWMN of the camera main body CMR is turned on in step S401, electric power is supplied to the microcomputer CCPU, then the process proceeds to step S402 where operation of the camera starts.

In step S402, the state of the switch SW1, which is turned on in response to the half stroke of the release button, is detected. If the SW1 is off, then the process proceeds to step S403 where an instruction to stop image stabilization (IS) operation (IS stop instruction) is transmitted to the lens LNS.

The steps S402 and S403 are repeatedly performed until the switch SW1 is turned on or the main switch SWMN is turned off.

When the switch SW1 is turned on in step S402, the process proceeds to step S411. In step S411, the microcomputer CCPU transmits an instruction to start IS operation (IS start instruction) to the microcomputer LCPU via the signal line DCL.

Next in step S412, communication for obtaining parameters which are specific to the lens, such as F number and focal length of the lens, from the microcomputer LCPU is performed.

Then, in step S413, the luminance of the object is measured by the sensor SNS, and the charging period for obtaining image signals from the image sensing device and the iris diaphragm control value are calculated, and the microcomputer CCPU transmits the calculation result to the microcomputer LCPU.

In step S414, the focus state is detected by the sensor SNS, and the result is also transmitted to the microcomputer LCPU.

In step S415, the state of the pixel shifting mode selection switch SWSF is detected as well as pixel shifting conditions, e.g., whether or not to perform pixel shifting operation and the number of image formation positions, are set on the basis of the result of the photometry performed in step S413, for example.

In step S416, the microcomputer CCPU controls the image sensing device IMS, via the driver IMDR, to charge, then transfer the charges in the image sensing device IMS.

In step S417, the image signals read at step S416 are temporarily stored in the RAM of the microcomputer CCPU.

In step S418, a movement vector is determined from image signals of two images stored in the RAM. Note, when the process in step S418 is performed for the first time, image signals representing only one image are stored in the RAM; therefore, "0" is outputted as the movement vector.

In step S419, the movement vector determined in step 418 is transmitted to the microcomputer LCPU.

Thereafter, the process proceeds to step S420, where the state of the switch SW2 which is turned on in response to the full stroke of the release button is detected. If the switch SW2 is OFF, then the process returns to step S411, and steps S411 to S419 are repeated. Whereas, if it is detected that the switch SW2 is ON, then the process proceeds to step S421.

In step S421, the same pixel shifting control as that performed in steps S117 to S122 in FIG. 6 explained in the first embodiment is performed.

In step S422, completion of pixel shifting operation (or completion of the storing of required image signals) is informed to the microcomputer LCPU.

In step S423, if image signals of a plurality of images are stored in the RAM, then they are synthesized to generate a single high-resolution image, then outputted. Whereas, if image signals of a single image are stored in the RAM, it is not possible to perform synthesis, therefore, the image signals are outputted.

In step S424, the image outputted in step S423 is stored in the memory MEM.

Accordingly, an image sensing operation is completed and the process returns to step S402. If the switch SW1 becomes ON in step S402, then the processes in step S411 and the subsequent steps are repeated, whereas, if the switch SW1 is OFF, then an instruction to stop IS operation is transmitted to the microcomputer LCPU in step S403.

FIG. 17 is the flowchart of control processing by the microcomputer LCPU of the lens LNS.

Referring to FIG. 17, when electric power is provided to the exchange lens, in step S431, in response to the ON operation of the main switch SWMN of the camera main body CMR, then the process proceeds to step S432.

In step S432, whether or not the IS start instruction is received or not is determined, and if the IS start instruction is not received from the camera main body CMR, then the process proceeds to step S433.

In step S433, whether or not the IS stop instruction is received from the camera main body CMR is determined, and if not, the process returns to step S432. If it is determined that the IS stop operation is received, then the process proceeds to step S434 where the IS operation is stopped. More specifically, the pitch and yaw actuators IACTP and IACTY are deactivated.

If the IS start instruction is received from the microcomputer CCPU while performing processes in steps S432 to S434, then the process proceeds from step S432 to step S441.

In step S441, the vibration sensors GRP and GRY are activated, and vibration signals in the pitch and yaw directions are inputted.

Step S142 corresponds to step S412 in FIG. 16, and in response to requests from the microcomputer CCPU, the microcomputer LCPU of the lens LNS transmits the parameters which are specific to the lens LNS to the camera main body CMR.

In step S443, the zoom encoder ZENC and the focus encoder FENC are checked in order to detect zooming and focus states of the lens system.

In step S444, on the basis of the detection result in step S443, the first coefficient for pixel shifting and the second coefficient for IS operation are read from a table stored in the ROM of the microcomputer LCPU.

In step S445, the pitch and yaw actuators IACTP and IACTY are operated on the basis of the vibration signals obtained in step S441 and the second coefficient obtained in step S444 to reduce blurring of an image due to vibration.

In step S446, the microcomputer LCPU operates the iris diaphragm DFM via the iris diaphragm actuator DACT on the basis of the information on a photometry result transmitted from the microcomputer CCPU to control the luminous exposure.

In step S447, the focusing actuator FACT is operated on the basis of the information on the focus state detection obtained from the microcomputer CCPU to adjust focus.

In step S448, the movement vector transmitted in step S419 in FIG. 16 is received.

In step S449, shift amount instruction values for the second lens group L2 for compensating blurring are generated on the basis of the movement vector signal obtained in step S448 and the first coefficient obtained in step S444, and further added to shift amount instruction values obtained from the vibration sensors GRP and GRY and the second coefficient obtained in step S444. Then, the pitch and yaw actuators IACTP and IACTY are driven in accordance with the added signal, thereby realizing image stabilization in wide frequency range of vibration.

Next, in step S450, whether or not a timing pulse for triggering the pixel shifting operation is received is determined. If no timing pulse is received, the process returns to step S441, and the IS operation, the iris diaphragm control, the focus adjustment, and reception of the moving vector are repeatedly performed. When it is determined in step S450 that the timing pulse is received, the process proceeds to step S451.

In step S451, signals having reference waveforms for driving the second lens group L2 in the pitch and yaw directions for pixel shifting operation are generated by the pixel shifting signal generator 21.

In step S452, the amplitudes of the signals having reference waveform, generated in step S451, are multiplied by the first coefficient read in step S444, thereby pixel shifting signals which compensates the effect of the decentering sensitivity of the second lens group L2 are generated. Thereafter, the generated pixel shifting signals are synthesized with signals for the IS operation (vibration compensation signals), generated in step S449, in the synthesis circuit 41. By operating the pitch and yaw actuators IACTP and IACTY in accordance with the synthesized signals, the IS operation and the pixel shifting operation are performed simultaneously and precisely.

In step S453, whether or not a signal indicating completion of the pixel shifting operation is received from the microcomputer CCPU is determined, and if it is not, the process returns to step S450 because the pixel shifting is not finished. Then, the process waits the next timing pulse. The processes in steps S450 to S453 are repeated for a predetermined number of times, and when the signal indicating completion of the pixel shifting operation is transmitted, the process returns from step S453 to step S451.

Then, if the IS start instruction is not received in step S432 and the IS stop instruction is detected in step S433, then the IS operation is stopped in step S434; more specifically, the pitch and yaw actuators IACTP and IACTY are deactivated, and a series of lens control operation relating to the image sensing operation is completed.

According to the fourth embodiment as described above, in addition to the same effects as those of the first embodiment, (6) Correctable frequency range of vibration is widened by converting a pixel shifting signal using the first coefficient, converting a movement vector signal using the first coefficient, converting a vibration signal using the second coefficient, and driving the optical system for image stabilization in accordance with a synthesized signal of the above three converted signals.

(7) Precise vibration compensation is realized even when zooming and focus states are changed by using the first and second coefficients corresponding to the zooming and focus states.

Note, the advantage of the fourth embodiment is obtained with or without pixel shifting function.

Modifications

In the first to fourth embodiments, a lens group in the optical system is moved in the orthogonal direction with respect to the optical axis of the optical system, thereby used as an image shifting means for realizing image stabilization and pixel shifting operation by utilizing optical shifting feature of the lens group. Alternately, it is possible to use a pair of transparent plates between which transparent liquid is fille d, so-called, a variable apical angle prism is used.

Further, any type of optical systems may be used as the optical system in the second and third embodiments. In addition, the features of the second and third embodiments are achieved regardless of the existence of image stabilization function.

Fifth Embodiment

Figure 18:
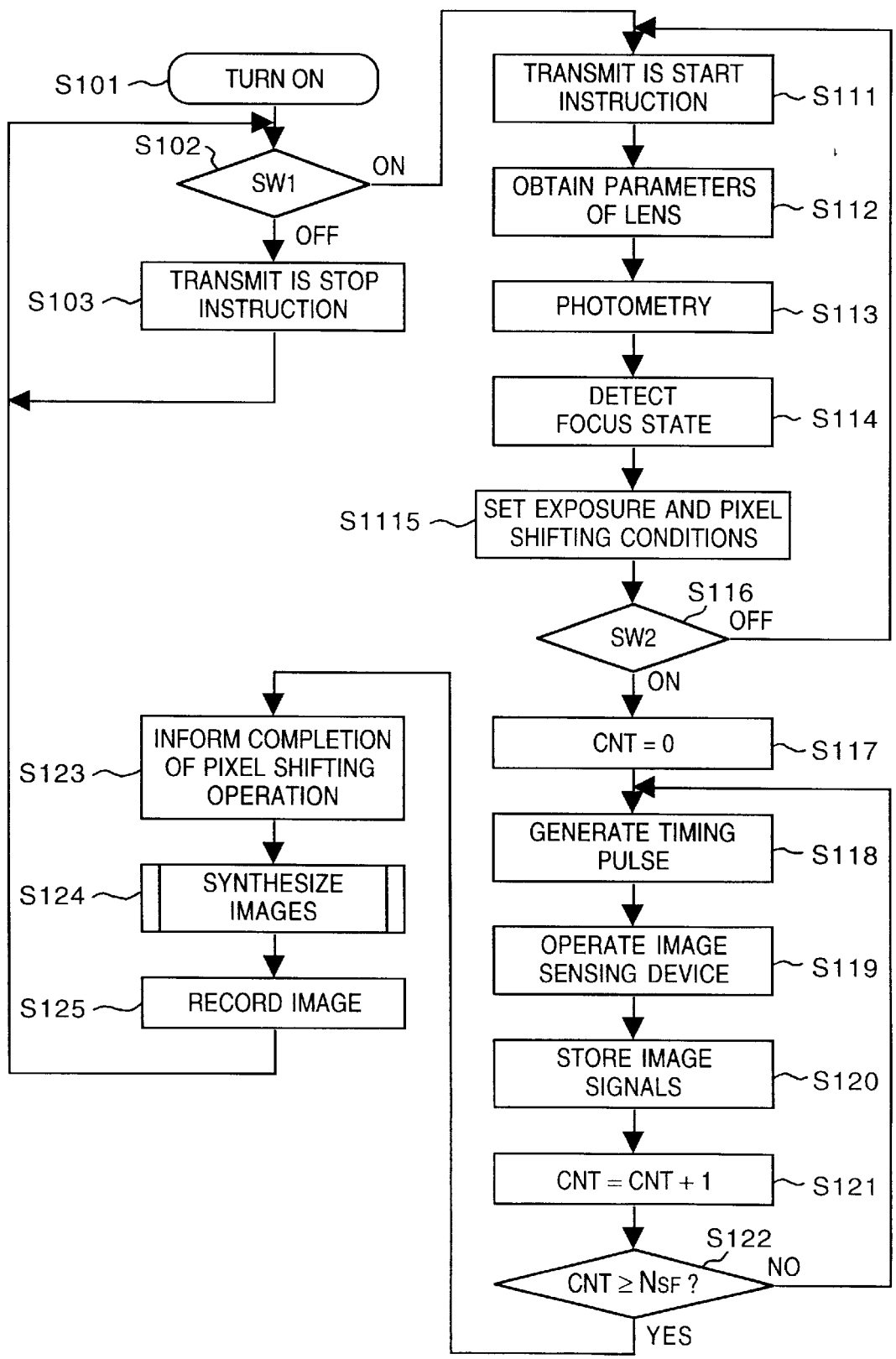
FIG. 18 is a flowchart of control processing in the camera main body according to fifth to eighth, and tenth embodiments of the present invention.

FIG. 18 is a flowchart of control processing performed by the microcomputer CCPU of the camera main body according to a fifth embodiment of the present invention. The processes in FIG. 18 are same as those in FIG. 6 explained in the first embodiment except step S115.

In step S1115 in FIG. 18, the state of the pixel shifting mode selection switch SWSF is detected, and image sensing conditions, such as the type of pixel shifting operation and the type of luminous exposure control of the image sensing device, are set on the basis of results of photometry and focus state obtained in steps S113 and 114. The detail will be explained later.

Note, the control processing by the microcomputer LCPU of the lens LNS is the same as the one shown in FIG. 7 explained in the first embodiment.

Next, method for controlling luminous exposure according to the fifth embodiment will be explained in detail with reference to FIGS. 19 to 21. First, referring to FIG. 20, a typical photo-sensing characteristics of an image sensing device is explained.

Figure 20:
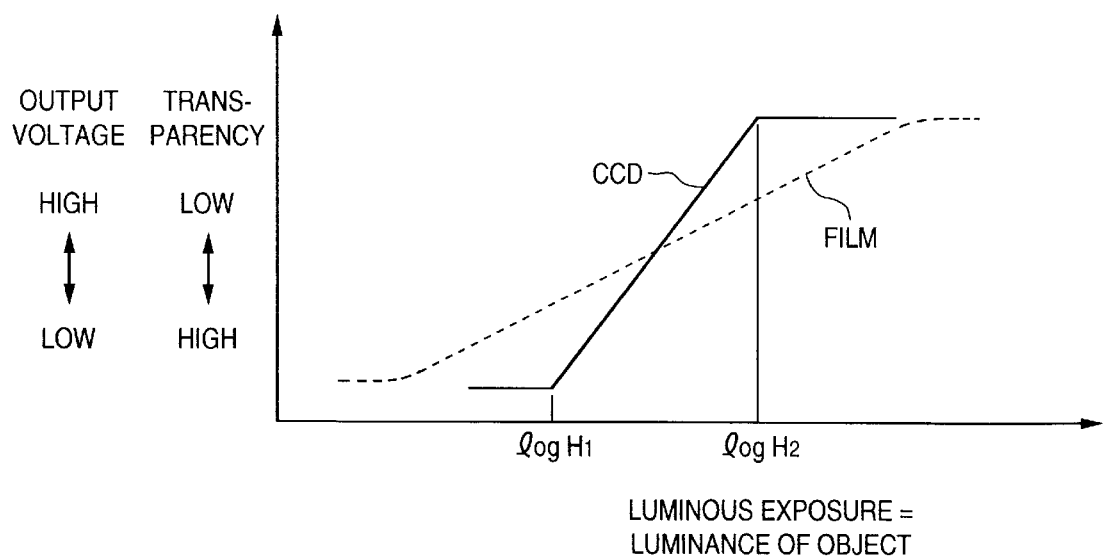
FIG. 20 is a graph showing characteristics of a film and an image sensing device.

Lines in a graph shown in FIG. 20 show characteristics of a film and an image sensing device, and the abscissa indicates luminous exposure and the ordinate indicates transparency of image recorded on the film or output voltage of the image sensing device. If an object is sensed with a fixed iris diaphragm control value at a fixed shutter speed, the abscissa can be considered as luminance of the object.

In FIG. 20, a broken line represents the characteristics of a silver-halide film, and a solid line represents the characteristics of the image sensing device, such as CCD. While the silver-halide film has a wide dynamic range, the dynamic range of the image sensing device is narrow, and the image sensing device can only reproduce an image of the object in a luminance range between log H1 and log H2.

Figure 19:
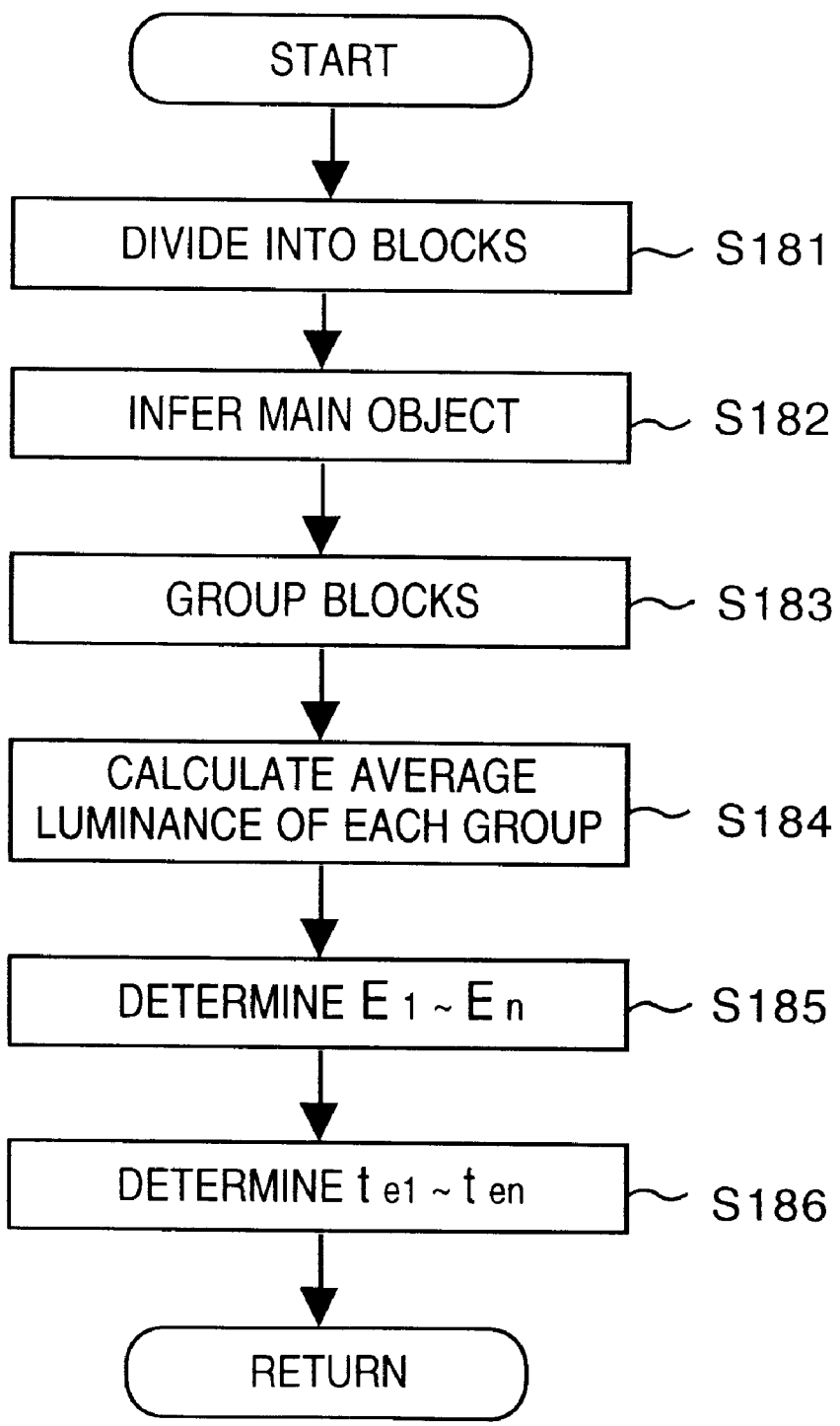
FIG. 19 is a flowchart showing processes for setting luminous exposure performed in processing shown in FIG. 18.

FIG. 19 is a flowchart showing processes for setting luminous exposure, which shows detailed processes in step S1115 in FIG. 18.

In step S181, the image of the object whose luminance is measured in step S113 is divided into a plurality of blocks. Method for dividing the image is explained with reference to FIG. 21.

Figure 21:
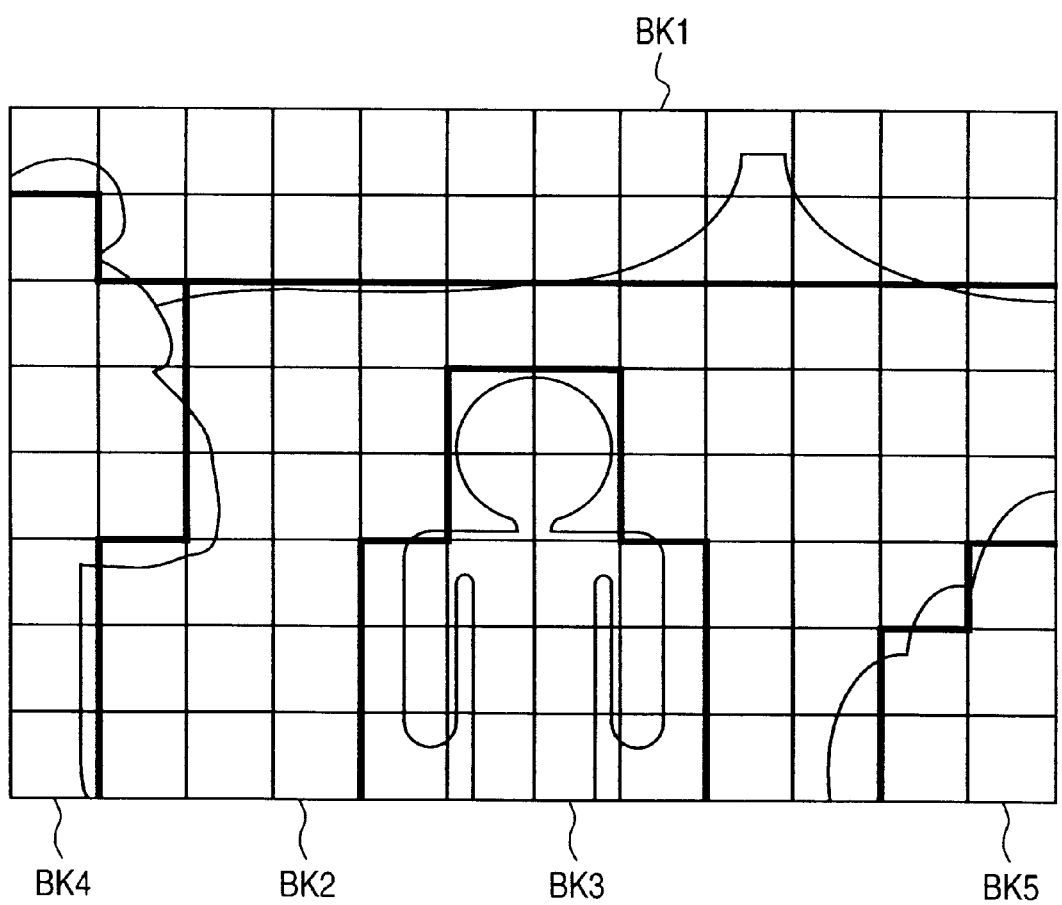
FIG. 21 is a view showing a detection area where focus state detection and the photometry are performed.

FIG. 21 is a view showing an area where focus state detection and the photometry, performed by the sensor SNS shown in FIG. 1, are performed. The detection area of the sensor SNS is roughly the same as the photo-sensing area of the image sensing device IMS, and is divided into 96 (=8×12) areas which are surrounded by thin lines in FIG. 21. Focus state and luminance can be individually detected in each divided area. Note, the sensor SNS can be realized by a pair of secondary focusing optical systems and focus state detection means, configured with two-dimensional image sensor, provided in respective secondary optical systems, adopting secondary phase difference detection method, for example.

On the sensor SNS, an image of an object is formed, as shown in FIG. 21. On the basis of the results of focus state detection and photometry performed on the image, the image is divided into five blocks, BK1 to BK5, surrounded by bold lines in FIG. 21, in this case. The division of the area is performed so that each block consists of the areas having roughly the same focus state and luminance levels out of the aforesaid 96 areas.

In step S182 in FIG. 19, a block including a main object is inferred from the divided blocks BK1 to BK5 on the basis of a predetermined algorithm. More specifically, the maim object can be inferred using the following principles:

i) If an area on which focus state detection is to be performed is designated by a user, then an object in the area is the main object;

ii) If the camera is set to a mode for automatically detecting a main object, then an object which is near the center of an image and at relatively short distance from the camera is the main object;

iii) If an area on which photometry is to be performed is designated by the user, then an object included in the area is the main object; and iv) If a camera has a function for detecting the direction of the line of sight of the user, then an object on the line of sight is the main object.

In the fifth embodiment, one of the above principles is used, and it is assumed that a person included in the block BK3 is determined as the main object.

Then in step S183, on the basis of the divided blocks and the result of the main object inference, the blocks are made into groups. Since the main purpose of the fifth embodiment is luminous exposure control while performing pixel shifting operation, the number of luminous exposures used for sensing images in the pixel shifting operation should be equal or less than the number of image formation positions. Accordingly, the blocks are further collected into groups of a smaller number; more specifically, the number which is equal or less than that of the image formation positions in the pixel shifting operation. For example, the blocks BK1 and BK2 form a high luminance group GP1, and the block BK3, which includes the main object, forms a medium luminance group GP2, and the groups BK4 and BK5 form a low luminance group GP3. Namely,

| BK1, BK2 | → GP1 (high luminance group) |
|---|---|
| BK3 | → GP2 (medium luminance group) |
| BK4, BK5 | → GP3 (low luminance group) |

Next, in step S184, an average luminance of each group determined in step S183 is calculated.

In step S185, proper luminous exposures $E_1$ to $E_n$ (n=3, in this case) corresponding to respective average luminances are calculated. Then in step S186, iris diaphragm control values and exposure times $t_{e1}$ to $t_{en}$ for obtaining the proper luminous exposures $E_1$ to $E_n$ are calculated on the basis of a predetermined program.

After step S186, the process returns to step S116 in FIG. 18, and the pixel shifting operation and exposure (charging) of the image sensing device IMS are performed.

FIG. 22 is a timing chart for explaining operations of the camera main body CMR and the lens LNS shown in the flowcharts in FIGS. 18, 19 and 7.

Signal a and b show states of the switches SW1 and SW2, respectively; a signal c is a timing signal for pixel shifting operation; a signal d is for charging in the image sensing device IMS; signals e and f have reference waveforms for pixel shifting operation (referred to as "pixel shifting reference signals" hereinafter) in the pitch direction and the yaw direction, respectively; and signals g and h are vibration signals, in the pitch and yaw directions, detected by the vibration sensors GRP and GRY, respectively. Here, vibration shift waveforms obtained by processing the detected signals by integration, for example, are shown. Further, signals i and j are operation signals for shifting the second lens group L2 in the pitch and yaw directions, respectively.

Next, overall operation shown in the flowcharts in FIGS. 18, 19 and 7 is explained with reference to the timing chart shown in FIG. 22.

When the switch SW1 is turned on at time $t_1$, the vibration signals g and h are outputted. In turn, the second lens group L2 is operated as shown in the waveforms of the signals i and j in accordance with the vibration signals multiplied by the second coefficient.

Then the switch SW2 is turned on at time $t_2$, and after a predetermined period of time elapses from the time $t_2$, a timing pulse TP1 is generated at time $t_{11}$. In turn, the photo-sensing elements of the image sensing device IMS are charged between time $t_{12}$ and time $t_{13}$, namely, the exposure time $t_{e2}$, calculated in step S186 in FIG. 19, which is suitable for the medium luminance group GP2.

When the charging operation ends at the time $t_{13}$, the charges are transferred and read. At the same time, the pixel shifting reference signal f in the yaw direction is generated. Accordingly, the second lens group L2 is operated in the yaw direction on the basis of instruction values shown by the signal j, obtained by adding the pixel shifting reference signal f multiplied by the first coefficient and the vibration signal h, multiplied by the second coefficient.

After a predetermined period of time has passed since time $t_{11}$, the second timing pulse TP2 is generated at time $t_{21}$. Then, similarly to above, the photo-sensing elements of the image sensing device IMS are charged between time $t_{22}$ and time $t_{23}$. The exposure time used this time is the exposure time $t_{e1}$, calculated in step S186 in FIG. 19, which is suitable for the high luminance group GP1.

When the charging operation ends at time $t_{23}$, the charges are transferred and read. At the same time, the pixel shifting reference signal e in the pitch direction is generated. Accordingly, the second lens group L2 is operated in the pitch direction on the basis of instruction values shown by the signal i obtained by adding the pixel shifting reference signal e multiplied by the first coefficient and the vibration signal g multiplied by the second coefficient.

After a predetermined period of time has passed since time $t_{21}$, the third timing pulse TP3 is generated at time $t_{31}$. Then, similarly to above, the photo-sensing elements of the image sensing device IMS are charged between time $t_{32}$ and time $t_{33}$. The exposure time used this time is the exposure time $t_{e2}$, calculated in step S186 in FIG. 19, which is suitable for the medium luminance group GP2.

When the charging operation ends at time $t_{33}$, the charges are transferred and read. At the same time, the value of the pixel shifting reference signal f in the yaw direction is changed to the initial value. Accordingly, the second lens group L2 is operated in the yaw direction on the basis of instruction values shown by the signal j corresponding to the vibration signal h multiplied by the second coefficient.

After a predetermined period of time has passed since time $t_{31}$, the last timing pulse TP4 is generated at time $t_{41}$. Then, similarly to above, the photo-sensing elements of the image sensing device IMS are charged between time $t_{42}$ and time $t_{43}$. The exposure time used this time is the exposure time $t_{e3}$, calculated in step S186 in FIG. 19, which is suitable for the low luminance group GP3.

When the charging operation ends at time $t_{43}$, the charges are transferred and read. At the same time, the value of the pixel shifting reference signal e in the pitch direction is changed to the initial value. Accordingly, the second lens group L2 is operated in the pitch direction on the basis of instruction values shown by the signal i, corresponding to the vibration signal g multiplied by the second coefficient.

After the switch SW1 is turned off at time $t_5$, the vibration detection and the operation of the second lens group L2 are stopped.

A given point of an image formed on the image sensing device IMS while performing the image stabilization and the pixel shifting operation at time $t_{11}$, $t_{21}$, $t_{31}$, $t_{41}$ and $t_5$ are at IM1, IM2, IM3, IM4 and IM1 in FIG. 4, respectively, thus image formation positions of the image are shifted by a half pixel distance from each other in the vertical and horizontal directions. In the four exposure operations of image sensing device IMS in the pixel shifting operation, exposure times suitable for respective luminance groups are used.

Note, the reason for the pixel shifting reference waveform being a trapezoid shape rather than a square shape is to mitigate shock of sudden movement of the second lens group L2.

Next, the principle for generating an image signal of a single high-resolution image by synthesizing a plurality of images obtained while performing pixel shifting operation, according to the fifth embodiment is explained with reference to FIGS. 9A, 9B and 10A to 10E.

FIGS. 9A and 9B are views for explaining relative position relationship between an image and the image sensing device IMS in pixel shifting operation. FIG. 9A corresponds to FIG. 4, and it shows that the position of the image shifts in the order of IM1, IM2, IM3, IM4, and IM1 with respect to the pixels of the image sensing device IMS fixed in the camera main body CMR. The above movement is equivalent to a case where the position of the image sensing device IMS moves in the order of IG1, IG2, IG3, IG4, and IG1 with respect to a fixed object. Since exposure time changes as the position of the image shifts in the pixel shifting operation, in other words, changes in accordance with the position of the image sensing device IMS, the lengths of the exposure times are expressed by the sizes of the circles in FIG. 9B.

Next, a method for synthesizing a plurality of images obtained in the aforesaid operation is explained. An output signal from each pixel when the image sensing device IMS is at the position, IG1, be IG1(i, j), where i and j are coordinates of the pixel. The image sensing device IMS is an area sensor having m×n pixels. Similarly, let output signals when image sensing device IMS is at the positions, IG2, IG3 and IG4, be IG2(i, j), IG3(i, j), and IG4(i, j), respectively.

FIGS. 10A to 10E show how to synthesize these four sets of image signals.

Let a new set of image signals representing 2m×2n pixels obtained by four sets of m×n pixels be denoted by IMG(u, v). The four left uppermost corner pixels of the image signals IMG(u, v) are obtained by synthesizing the respective left uppermost corner pixels of the four original images as shown in FIGS. 10A to 10E. When a method for synthesizing images is considered with reference to FIGS. 10A to 10E, it is possible to obtain an image signal of a single high-resolution image from the four original images by using the following four equations;

$$IMG(u=2i-1, v=2j) \leftarrow IG1(i, j) \times K_2 + L_2 \quad (16)$$

$$IMG(u=2i-1, v=2j-1) \leftarrow IG2(i, j) \times K_1 + L_1 \quad (17)$$

$$IMG(u=2i, v=2j-1) \leftarrow IG3(i, j) \times K_2 + L_2 \quad (18)$$

$$IMG(u=2i, v=2j) \leftarrow IG4(i, j) \times K_3 + L_3 \quad (19)$$

Here, coefficients $K_1$ to $K_3$ and off set values and $L_1$ to $L_3$ are for correcting differences in output levels of the four original images due to the difference in exposure time. Regarding $K_1$ to $K_3$, they are represented as, $$K_1 = C/t_{e1} \quad (20)$$

$$K_2 = C/t_{e2} \quad (21)$$

$$K_3 = C/t_{e3} \quad (22)$$

where C is a constant; therefore, $K_1 > K_2 > K_3$. Regarding the offset values $L_1$ to $L_3$, they can be determined in accordance with the characteristics of the image sensing device IMS and luminous exposure.

Figure 23:
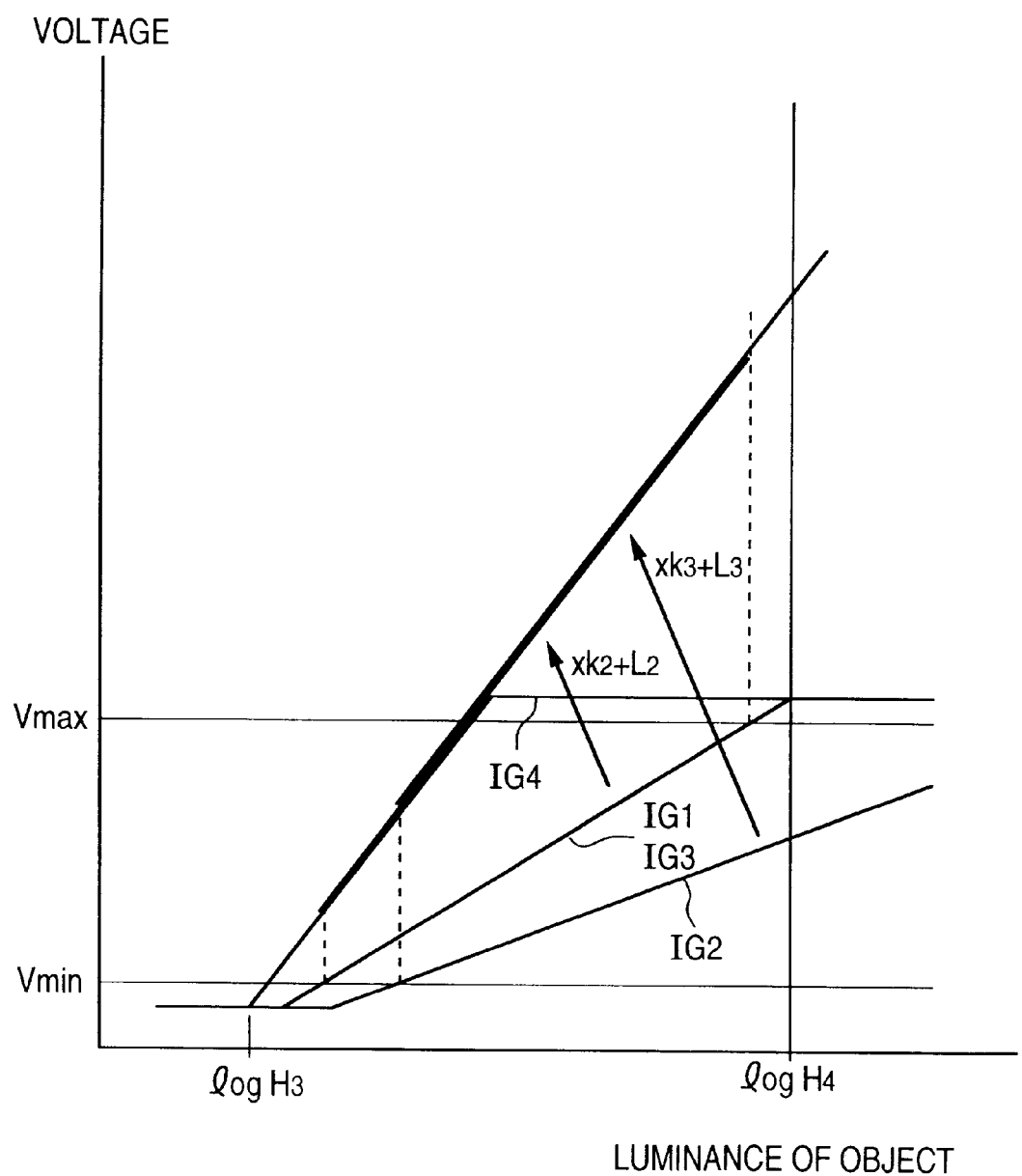
FIG. 23 is a graph showing a feature of the fifth embodiment.

FIG. 23 is a graph showing the feature of the fifth embodiment. Similarly to FIG. 20, the abscissa indicates luminance of the object and the ordinate indicates output voltage. Here, the coefficient $K_3$ for the image signals IG4(i, j) which are obtained by exposing the image sensing device IMS for the longest period is set to 1, and the image signals IG1(i, j) and IG3(i, j) are synthesized after amplified by $K_2$, further, the image signal IG2 is synthesized after amplified by $K_1$. Further, referring to FIG. 23, the effective range of the output voltage of the original image signal is set between $V_{min}$ and $V_{max}$, and the output voltage of the image signal IG4(i, j) which is higher than the upper limit of the effective range $V_{max}$, the output voltage of the image signals IG1(i, j) and IG3(i, j) which are higher than the upper limit of the effective range $V_{max}$ and the lower than the lower limit of the effective range $V_{min}$, and the output voltage of the image signal IG4(i, j) which is lower than the lower limit of the effective range $V_{min}$ are not used for image synthesis. Regarding pixels corresponding to the image signals which are not used in the image synthesis, the missing pixels are interpolated on the basis of image information on the neighboring pixels after the four images are synthesized.

More specifically, image signals obtained by exposing the image sensing device IMS for a short exposure time are amplified with a large gain, and image signals obtained by exposing the image sensing device IMS for a long exposure time are amplified with a small gain, thereby realizing normalization of the image signals for obtaining a synthesized high-resolution image. In this manner, in a case where pixels included in a given area in one of the plurality of images are saturated but pixels included in the same area of another image are not saturated, image signals corresponding to the saturated pixels are interpolated on the basis of image signals of the non-saturated pixels. With the aforesaid operation, it is possible to faithfully reproduce the image within a luminance range between log H3 and log H4.

In the fifth embodiment as described above, among the four exposure operations performed in the pixel shifting operation, the two exposure operations are performed using the same exposure time which is suitable for luminance of the main object. This is because more information on the main object can be obtained in this manner.

Further, the signal normalization in image synthesis is controlled based on the exposure times in the fifth embodiment. Alternately, the signal normalization may be performed so as to control output values in the same area in the plurality of images become equal.

Note, the aforesaid pixel shifting operation and the image synthesis method is used when image signals are obtained from a black-and-white image sensing device and a multiple-CCD type color image sensing device using a color separation prism. When image signals are obtained from a single CCD type color image sensing device covered with a mosaic color filter, although there are little differences in pixel shifting amount in the pixel shifting operation and the image synthesis method, the basic ideas of the pixel shifting operation and the image synthesis are the same.

According to the fifth embodiment as described above, (1) It is possible to obtain an image of high resolution in wide dynamic range by changing luminous exposures, used for sensing respective images obtained while performing pixel shifting operation, on the basis of luminance information, obtained by performing photometry by the sensors, on a plurality of divided areas of an image, and synthesizing the sensed images.

(2) Since main object is inferred and luminous exposures are changed on the basis of the detected result, image reproductivity of the main object improves.

(3) The more number of images are sensed using exposure time suitable for the luminance of the main object than the number of images sensed using any other exposure times, image reproductivity of the main object improves.

Sixth Embodiment

The number of the image formation positions shifted in the pixel shifting operation in the fifth embodiment is fixed, and only the luminous exposure is changed in accordance with the luminance of the main object. In a sixth embodiment as described below, the optimum pixel shifting mode is selected on the basis of image sensing conditions, and luminous exposures suitable for the selected pixel shifting mode are determined.

Figure 24:
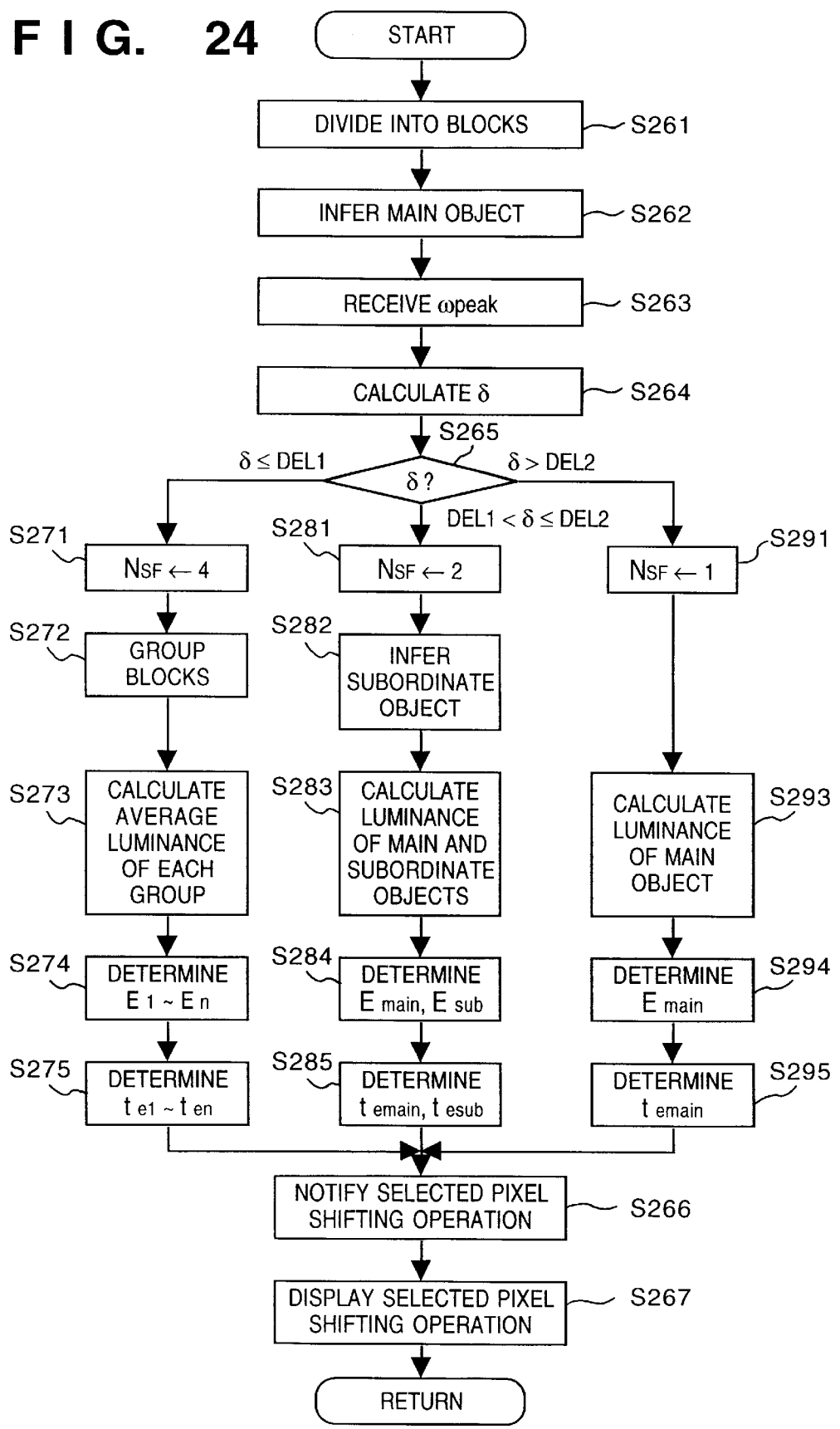
FIG. 24 is a flowchart of control processing in the camera main body according to a sixth embodiment of the present invention.

FIG. 24 is a flowchart showing control processing in the camera main body CMR according to the sixth embodiment; FIGS. 12A and 12B are views for explaining relative position relationship between an image and the image sensing device IMS in pixel shifting operation according to the sixth embodiment; and FIGS. 13A to 13C are views for explaining the principle of image synthesis in a second pixel shifting mode (will be explained later). The sixth embodiment will be explained with reference to accompanying drawings.

The control processing in the camera main body CMR in the sixth embodiment is basically the same as that shown in FIG. 18 explained in the fifth embodiment. However, the process performed in step S1115, i.e., "to set exposure and pixel shifting conditions" is realized by a sub-routine as shown in FIG. 24, thereby the advantage of the sixth embodiment can be obtained. Below, the control processing according to the sixth embodiment will be explained with reference to FIGS. 18 and 24. Since the processes shown in FIG. 18 have been already explained in detail in the fifth embodiment, they are only briefly explained in the sixth embodiment.

Referring to FIG. 18, when it is determined in step S102 that the switch SW1 is ON, then the process proceeds to step S111. Thereafter, an IS start instruction is transmitted to the lens LNS in step S111 and parameters are received from the lens LNS in step S112. Next in steps S113 and S114, photometry and focus state detection are performed, and the obtained results are transmitted to the microcomputer LCPU of the lens LNS.

In the next step, S1115, the processes shown in FIG. 24 are performed. In step S261 in FIG. 24, an image formed on the sensor SNS is divided into a plurality of blocks in the same manner as performed in step S181 in FIG. 19, explained in the fifth embodiment.

In the following step S262, the main object is inferred in the same manner as performed in step S182 in FIG. 19.

In step S263, the microcomputer CCPU requests transmission of the peak value of vibration angular velocity, $\omega_{peak}$, in a predetermined period of time to the microcomputer LCPU. In turn, the microcomputer LCPU transmits the peak value of the vibration angular velocity $\omega_{peak}$ occurring in a two second interval, for example, to the microcomputer CCPU.

In step S264, the maximum vibration value δ while exposing the image sensing device IMS when the IS function is not operated is calculated on the basis of the following equation, $$\delta = f \times \omega_{peak} \times t_{exp} \quad (23)$$

where, f denotes a focal length of the optical system, and $t_{exp}$ is an exposure time, i.e., charging period, of the image sensing device determined on the basis of the result of photometry. The maximum vibration value δ obtained here is used in the subsequent steps as an index of vibration for determining whether or not pixel shifting operation should be performed.

In step S265, the value of the maximum vibration value δ is checked. If the maximum vibration value δ is equal or less than a predetermined value DEL1, then it is determined that effect of vibration is small, thus the quality of an image would improve by performing pixel shifting operation. Accordingly, the process proceeds to step S271 and the number of image formation positions $N_{SF}$, is set to four. Here, the number of image formation positions, four, indicates the same pixel shifting operation and image synthesis explained in the fifth embodiment. This overall operation is referred to as "first pixel shifting mode" in the sixth embodiment. When the first pixel shifting mode is decided, processes in steps S272 to S275 are performed.

In steps S272 to S275, the same operations as those performed in steps S183 to S186 in FIG. 19 are performed, and exposure times $t_{e1}$ to $t_{en}$ (n=3) to be used in four exposure operations in the pixel shifting operation are determined. After step S275, the process proceeds to step S266.

Whereas, if it is determined in step S265 that the vibration value δ is larger than the value DEL1 and equal or less than a predetermined value DEL2 (DEL2>DEL1), then the process proceeds to step S281 where the number of image formation positions $N_{SF}$ is set to two. This is because deterioration of an image is expected to some degree even if image stabilization is performed. Therefore, a mode which requires less image formation positions is selected (this mode is referred to as "second pixel shifting mode") so as to reduce deterioration of the image quality due to vibration and to realize an optimum improvement in image quality. Details of the second pixel shifting mode are explained later.

In step S282, a subordinate object which is the second important object is inferred. For instance, a block having the largest area among all the blocks, except the block including the main object, which are divided in step S261 is determined to include the subordinate object.

In step S283, luminance of the block including the main object, determined in step S262, and luminance of the block including the subordinate object, determined in step S282, are calculated.

In step S284, luminous exposure $E_{main}$ which is suitable for the luminance of the main object (precisely, of the block including the main object) and luminous exposure $E_{sub}$ which is suitable for the luminance of the subordinate object (precisely, of the block including the subordinate object) are calculated on the basis of the luminances obtained in step S283.

In step S285, exposure time $t_{emain}$ which is suitable for the main object and exposure time $t_{esub}$ which is suitable for the subordinate object are calculated on the basis of the luminous exposures $E_{main}$ and $E_{sub}$, calculated in step S284. Thereafter, the process proceeds to step S266. Note, the second pixel shifting mode is explained later in detail.

Further, in step S265, when it is determined that the vibration value δ is greater than the predetermined value DEL2, then in step S291, the number of image formation positions $N_{SF}$ is set to 1 indicating that no pixel shifting operation is to be performed. The reason for setting the number of image formation positions $N_{SF}$ to 1 is that the effect of the vibration which causes deterioration of an image is stronger than the effect of pixel shifting operation which improves the quality of the image. Therefore, the pixel shifting is disabled.

In step S293, luminance of the block including the main object, determined in step S262, is calculated.

In step S294, luminous exposure $E_{main}$ which is suitable for the luminance of the main object (precisely, of the block including the main object) is calculated on the basis of the luminance obtained in step S293.

In step S295, exposure time $t_{emain}$ which is suitable for the main object is calculated on the basis of the luminous exposure $E_{main}$ calculated in step S294. Thereafter, the process proceeds to step S266.

After one of the series of processes in steps S271 to S272, S281 to 285, and S291 to 295 are performed, the process proceeds to step S266.

In step S266, information on the determined pixel shifting mode is transmitted to the microcomputer LCPU of the lens LNS.

In step S267, the type of the pixel shifting mode is displayed on the display device DISP of the camera main body CMR to inform the user of which mode is used for photographing an image.

After step S267 is completed, the process returns to step S116 in FIG. 18.

In step S116, determination of the state of the switch SW2 is performed, and if SW2 is ON, then the process proceeds to step S117.

In steps S117 to S122, the pixel shifting is performed as explained in the fifth embodiment, however, in the sixth embodiment, the pixel shifting is performed in accordance with the selected pixel shifting mode determined in steps S271 to S295. Therefore, the pixel shifting operation is performed in the selected pixel shifting mode if either the first or second pixel shifting mode is selected. Whereas, if it is determined in the steps S261 to S267 not to perform pixel shifting operation, image formation position is not shifted.

Then, in step S123, the completion of the pixel shifting operation (or completion of the storing of required image signals) is informed to the microcomputer LCPU, and the process proceeds to step S124.

In step S124, the image synthesis processing corresponding to the selected pixel shifting mode is performed if the first or second pixel shifting mode is selected. If the pixel shifting operation was not performed, there is no need to perform image synthesis, therefore, the photographed image is directly outputted.

Then, in step S125, the obtained image is recorded and the process returns to step S102.

The second pixel shifting mode, namely, a case where the number of image formation positions is two, is explained with reference to FIGS. 12A and 12B.

FIG. 12A shows shift of an image with respect to the image sensing device IMS. As shown in FIG. 12A, the image sensing device IMS is charged and read when a given point of an image is at a position IM21. Then, after the point of the image is shifted to the position IM22, the image sensing device is charged and read again. Thereafter, the image formation position is moved back to the initial position so that the point of the image is formed at the position IM21.

FIG. 12B shows a movement of the image sensing device IMS equivalent to the aforesaid movement of the image shown in FIG. 12A. The image sensing device IMS is exposed for the exposure time $t_{emain}$ when a pixel of the image sensing device IMS which is at an initial position IG21. Thereafter, the pixel of the image sensing device IMS is moved to the position IG22 by pixel shifting operation and the image sensing device IMS is exposed for the exposure time $t_{esub}$, then moved back to the initial position IG21.

FIG. 13 is a view for explaining an image synthesis method in the second pixel shifting mode. In the second pixel shifting mode, on the basis of image signals of two images, IG21(i, j) and IG22(i, j), namely, image signals of (2×m×n) pixels, an image IMG2(u, v) expressed with (4×m×n) pixels is obtained. For this reason, pixels expressed by black dots in IMG2(u, v) are the same values as pixels in the images IG21(i, j) and IG22(i, j), and the pixels shown by white dots are interpolated with averages of the values of the neighboring four pixels (at edge, two or three pixels, instead of four pixels).

In equations, $$IMG2(u=2i-1, v=2j) \; IG21(i, j) \times K_{main} \quad (24)$$

$$IMG2(u=2i, v=2j-1) \; IG22(i, j) \times K_{sub} \quad (25)$$

$$IMG2(u=2i-1, v=2j-1) \leftarrow \{IG21(i, j) \times K_{main} + IG22(i, j) \times K_{sub} + IG21(i, j-1) \times K_{main} + IG22(i-1, j) \times K_{sub}\}/4 \quad (26)$$

$$IMG2(u=2i, v=2j) \leftarrow \{IG21(i, j) \times K_{main} + IG22(i, j) \times K_{sub} + IG21(i+1, j) \times K_{main} + IG22(i, j+1) \times K_{sub}\}/4 \quad (27)$$

Here, $K_{main}$ and $K_{sub}$ are coefficients for correcting difference in output levels of the two original images due to the difference in exposure time, similarly to the first embodiment, and they are represented as, $$K_{main} = C/t_{emain} \quad (28)$$

$$K_{sub} = C/t_{esub} \quad (29)$$

According to the sixth embodiment as described above, in addition to the same effects as those of the first embodiment, (4) Since the optimum pixel shifting operation is selected in consideration of the vibration and the luminous exposure is changed so as to suit the selected pixel shifting mode, it is possible to obtain an image of optimum resolution in optimum dynamic range in accordance with the image sensing conditions.

Seventh Embodiment

In the sixth embodiment, the optimum pixel shifting mode is selected in accordance with vibration and the luminous exposure is controlled in accordance with the selected pixel shifting mode. In the seventh embodiment, whether or not the pixel shifting operation is to be performed is determined in accordance with an image sensing mode set by a user, and, if it is determined to perform pixel shifting operation, the pixel shifting mode as well as an luminous exposure are changed in accordance with the image sensing mode.

Figure 25:
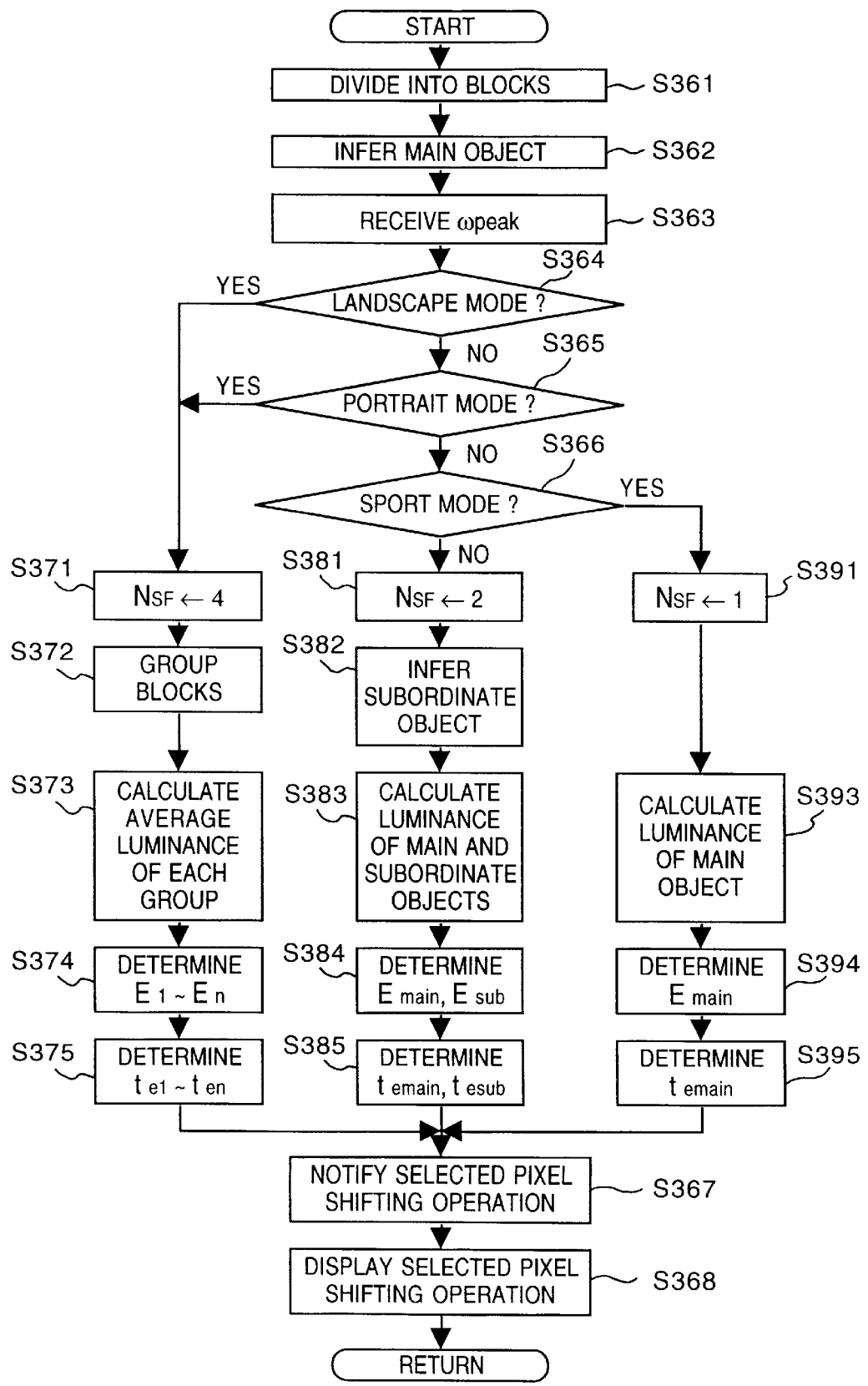
FIG. 25 is a flowchart of control processing in the camera main body according to a seventh embodiment of the present invention.

The control processing in the camera main body CMR in the seventh embodiment is basically the same as that shown in FIG. 18 explained in the fifth embodiment, similarly to the sixth embodiment. However, the process performed in step S1115, i.e., "to set exposure and pixel shifting conditions" is realized by a sub-routine as shown in FIG. 25, thereby the advantage of the seventh embodiment can be obtained. Below, the control processing according to the seventh embodiment will be explained with reference to FIGS. 18 and 25. Since the processes shown in FIG. 18 have been already explained in detail in the fifth embodiment, they are briefly explained in the sixth embodiment.

Referring to FIG. 18, when it is determined in step S102 that the switch SW1 is ON, the process proceeds to step S111. Thereafter, an IS start instruction is transmitted to the lens LNS in step S111 and parameters are received from the lens LNS in step S112. Next in steps S113 and S114, photometry and focus state detection are performed, and the obtained results are transmitted to the microcomputer LCPU of the lens LNS.

In the next step, S1115, the processes shown in FIG. 25 are performed. In step S361 in FIG. 24, an image formed on the sensor SNS is divided into a plurality of blocks in the same manner as performed in step S181 in FIG. 19, explained in the fifth embodiment.

In the following step S362, the main object is inferred in the same manner as performed in step S182 in FIG. 19.

In step S363, the status of the image mode selection switch SWMOD (image sensing mode) provided in the camera main body CMR is determined, thereby image sensing conditions, such as exposure control mode, set by the user are determined.

In step S364, whether or not the image sensing mode selected by the user is a landscape mode is determined. Landscape mode is an exposure control mode in which field depth is deepened by setting a small iris diaphragm control value (large F number). When the landscape mode is set, it is expected that the object stands still, and the camera is held still, thus vibration would not occur in most cases. Accordingly, the process proceeds to step S371, where a "high-resolution" mode for sensing four images while shifting between four image formation positions in pixel shifting operation is set. When it is determined in step S364 that the set image sensing mode is not the landscape mode, then the process proceeds to step S365.

In step S365, whether or not the selected image sensing mode is a portrait mode is determined. Portrait mode is an exposure control mode in which field depth is narrowed by setting the iris diaphragm control value to near open (small F number). Since it is expected that the conditions for photographing in the portrait mode is similar to those of the landscape mode, the process proceeds to step S371. Whereas, if it is determined in step S365 that the set image sensing mode is not the portrait mode, then the process proceeds to step S366.

In step S366, whether or not the set image sensing mode is a sport mode is determined. Sport mode is an exposure control mode for photographing a moving object as if it is not moving by shortening exposure time. When the sport mode is selected, it is expected that the object is moving and the camera may be panning. In other words, the movement of the camera similarly to the vibration by a large displacement amount is expected. Further, blurring of the object due to the movement of the object while performing pixel shifting operation is expected. Accordingly, improvement of image quality is not anticipated; on the contrary, the obtained image by performing pixel shifting operation would be unnatural. Therefore, when the sport mode is set, the process proceeds to step S391 where $N_{SF}$ is set to one and the pixel shifting is disabled. If it is determined in step S366 that the sport mode is not set, namely, when the set image sensing mode is not any of the landscape, portrait, and sport modes, the process proceeds to step S381, and the number of image formation positions $N_{SF}$ is set to two.

In steps S371 to S375, steps S381 to S385, and steps S391 to S395, the same processes as those performed in steps S271 to S275, steps S281 to S285, and steps S291 to S295 shown in FIG. 24 and explained in the sixth embodiment, respectively, are performed. In short, luminous exposures are determined on the basis of the selected exposure mode. Since these operations have been explained in detail in the sixth embodiment, the explanation of them is omitted.

After one of the processes in steps S375, S385 and S195 is performed, the process proceeds to step S367.

In step S367, information on the determined pixel shifting mode is transmitted to the microcomputer LCPU of the lens LNS.

In step S368, the type of the pixel shifting mode is displayed on the display device DISP of the camera main body CMR to inform the user of which mode is used for photographing an image.

After step S368 is completed, the process returns to step S116.

In step S116, determination of the state of the switch SW2 is performed, and if SW2 is ON, then the process proceeds to step S117.

In steps S117 to S122, the pixel shifting is performed in accordance with the selected pixel shifting mode as explained in the sixth embodiment.

Then, in step S123, the completion of the pixel shifting operation (or completion of the storing of required image signals) is informed to the microcomputer LCPU, and the process proceeds to step S124. In step S124, the image synthesis processing corresponding to the selected pixel shifting mode is performed as described in the sixth embodiment.

In step S125, the obtained image is recorded and the process returns to step S102.

According to the seventh embodiment as described above, in addition to the same effects as those of the fifth embodiment, (5) It is possible to perform an optimum pixel shifting operation suitable for movements of both a camera and an object by determining whether or not it is appropriate to perform pixel shifting operation and changing pixel shifting modes, in accordance with an image sensing mode set by the user. Accordingly, it is possible to obtain an image of optimum resolution in optimum dynamic range in accordance with the image sensing conditions.

Further, an image sensing mode is selected on the basis of different photographing situations which require different exposure control, however, an image sensing mode may be selected on the basis of the result of focus state detection.
Modifications In the fifth to seventh embodiments, a lens group in the optical system is moved in the orthogonal direction with respect to the optical axis of the optical system, thereby used as an image shifting means for realizing image stabilization and pixel shifting operation by utilizing optical shifting feature of the lens group. Alternately, it is possible to use a pair of transparent plates between which transparent liquid is filled, so-called, a variable apical angle prism is used.

In addition, the features of the seventh embodiments are achieved regardless of the existence of image stabilization function.

Further, exposure time is changed in order to change luminous exposures for sensing a plurality of images when performing pixel shifting operation. Instead, the iris diaphragm can be changed. Alternately, it is possible to change the luminous exposure by providing a transmitting light adjusting means, such as an electrochromic (EC) element and a liquid crystal element, in the optical system and changing the density of the element.

Further, the effects of the fifth to seventh embodiments can be obtained if a plurality of images are sensed in different exposure levels without shifting image formation position. In such a case, the resolution of an image is not improved; however, it is possible to widen a dynamic range in accordance with the state of an object.

Eighth Embodiment

The control processing performed by the microcomputer CCPU of the camera main body CMR according to an eighth embodiment is basically the same as that shown in FIG. 18, except the process in step S124. More specifically, in step S124 in the eighth embodiment, blurring is determined from image signals of a plurality of images obtained in pixel shifting operation, then the images are synthesized by a predetermined method, or may not be synthesized, in accordance with the determination result, and a single image of high resolution is obtained. The details will be explained later with reference to FIG. 33.

Note, the control processing performed by the microcomputer LCPU of the lens LNS is substantially the same as that shown in FIG. 7.

Further, the control processing shown in FIGS. 7 and 18 are performed in the same timing as shown by the timing chart in FIG. 8 in the same manner as described in the first embodiment.

Next, a method of determining blurring caused by vibration of the camera on the basis of a plurality of images sensed in pixel shifting operation will be explained with reference to FIGS. 26A to 32.

FIGS. 26A and 26B, and FIGS. 27A and 27B are graphs for explaining the principle for calculating the relative shifted amount between two images on the basis of correlation between image signals of the corresponding line of the two images. In these figures, the abscissa indicates coordinate of pixel of the image sensing device, and the ordinate indicates output signal value of each pixel.

Figure 26A:
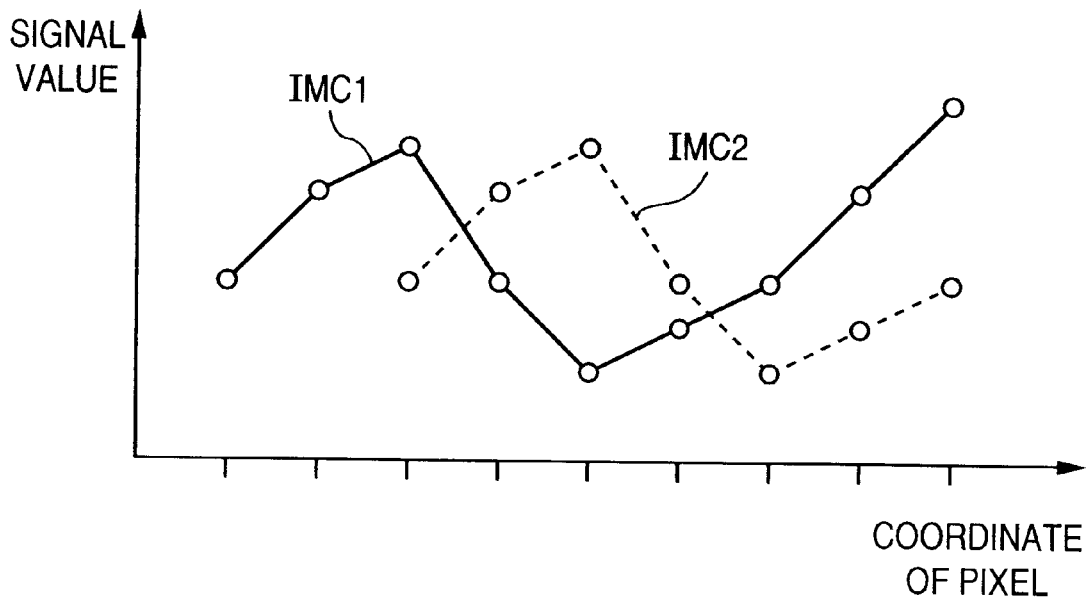
FIGS. 26A and 26B are graphs for explaining a principle for calculating a relative shifted amount of two images.

The curve IMC1 in FIG. 26A shows first image signals of a first image (referred to as "first image signals" hereinafter) obtained at a given time, and the curve IMC2 shows image signals of a second image (referred to as "second image signals" hereinafter) obtained at time after a predetermined period has passed since the first image is sensed. It is assumed that the two images are shifted from each other by a distance which is the integer multiple number of a distance between pixels, due to pixel shifting operation or vibration.

Figure 26B:
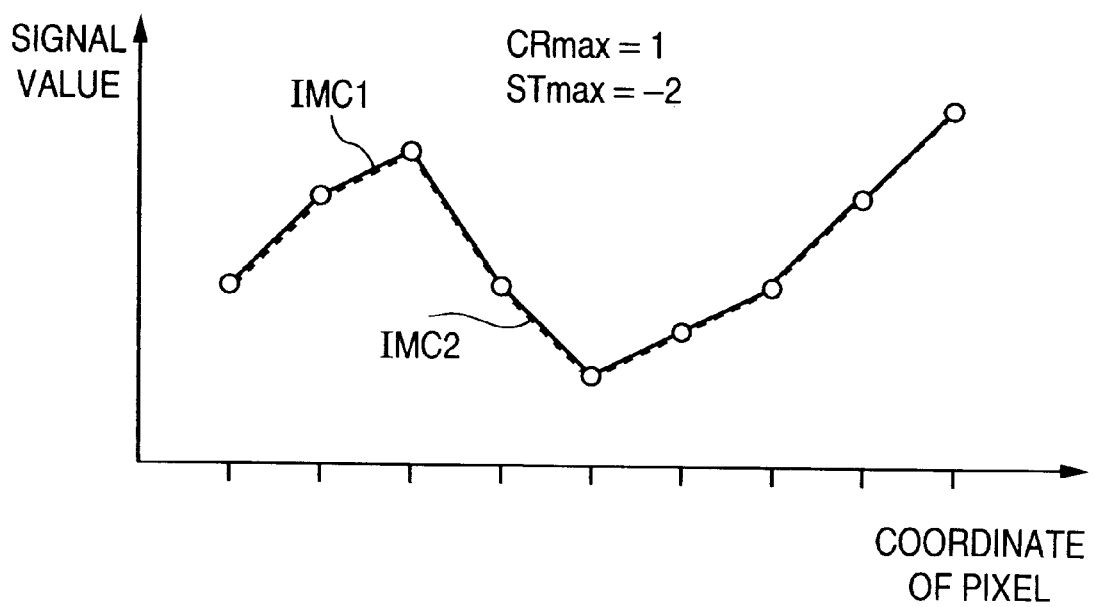

FIG. 26B shows a state in which the image signals IMC2 of the second image is shifted by two pixel distances to the left, and the first image signals and the second image signals exactly coincides.

Here, the correlation CR between the first and second image signals is denoted by, $$CR = 1 - \Sigma\{ABS(IMC2(i) - IMC1(i))/(IMC1(i) + IMC2(i))\} \quad (30)$$

where ABS is an abbreviation of an absolute value, i is the pixel number, and $\Sigma$ is a summation operator from i=1 to a predetermined pixel number. In this case, when the shift amount, ST, of the image signals IMC2 is −2, the correlation CR becomes the maximum, 1. This state is expressed as STmax=−2, CRmax=1.

Figure 27A:
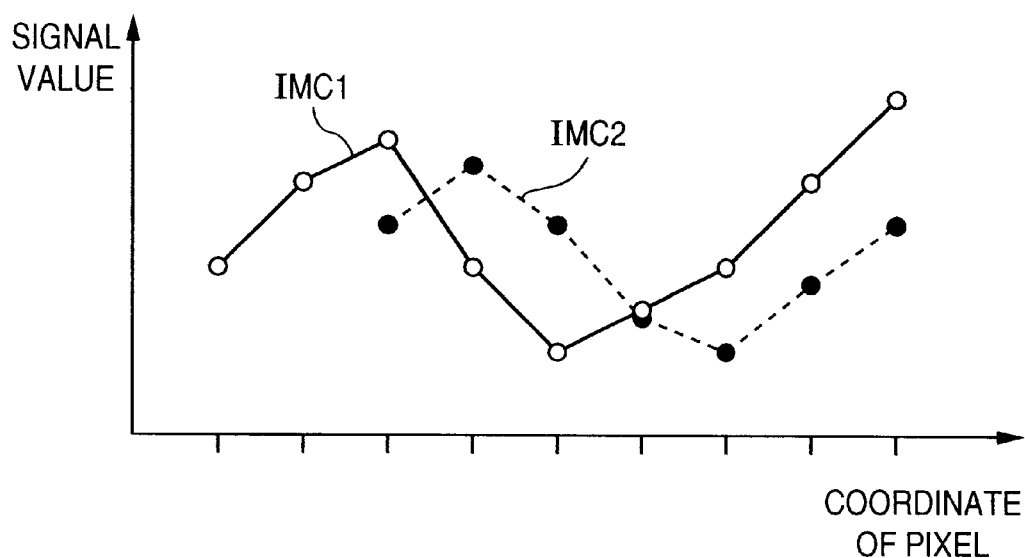
FIGS. 27A and 27B are graphs for explaining the principle for calculating a relative shifted amount of the two images.

FIG. 27A shows a case where the shifted amount of the image signals of the two images is not an integer multiple number of the interval between pixels (1.5 pixels in FIG. 27A).

Figure 27B:
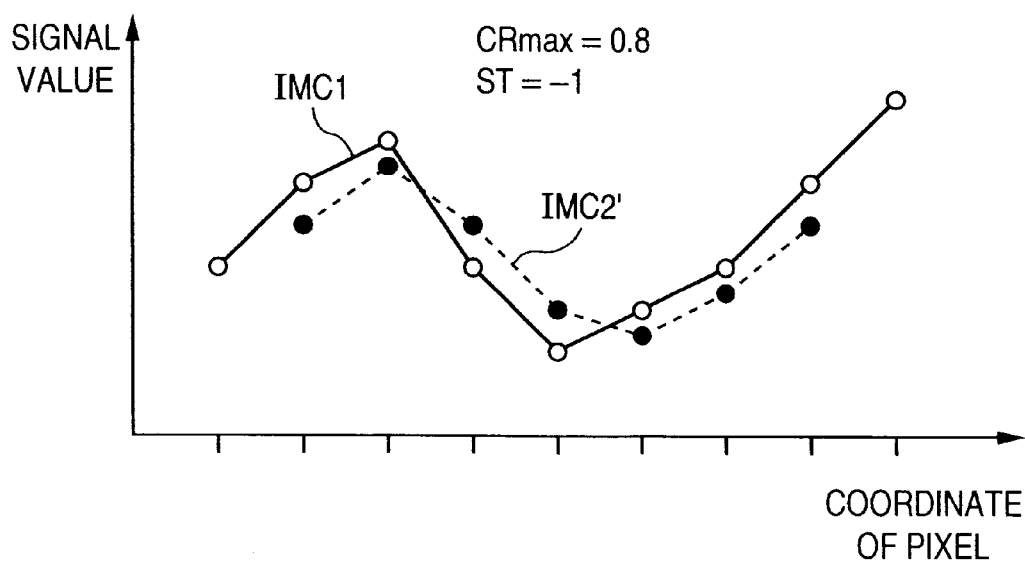

FIG. 27B shows a state in which the image signals IMC2 of the second image is shifted by one pixel distance to the left, and the maximum correlation CRmax is 0.8, in this case. Even through the image signals IMC2, is shifted by another pixel distance to the left, the maximum correction CRmax does not become 1.

Figure 28:
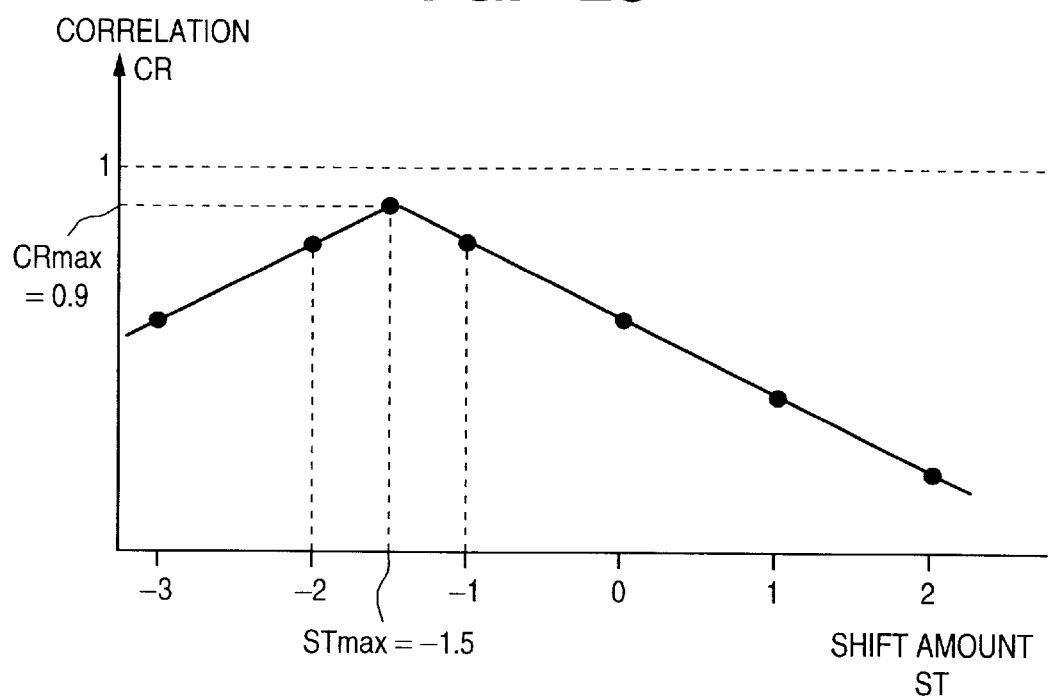
FIG. 28 is a graph showing relationship between shift amount and correlation.

FIG. 28 shows the relationship between the shift amount ST and the correlation CR.

Referring to FIG. 28, when the correlation CR is calculated for shift amount ST between +2 and −3 (integers only), the maximum correlation value CRmax is obtained when the shift amount ST is −1 and −2. Further, when the correlation CR is interpolated by linear regression as shown in FIG. 28, it is known that the correlation CR has a real maximum value of 0.9 when the shift amount ST is −1.5. Thus, STmax=−1.5 and CRmax=0.9.

The aforesaid calculation method is for obtaining shift amount between image signals of corresponding lines of the two images, however, it is possible to calculate shift amounts between image signals of two images in the up-and-down and right-and-left directions (namely, in two dimensions) by applying the aforesaid calculation method in two dimensions. More specifically, as disclosed in Japanese Patent Application Laid-Open No. 64-10787, image signals of two dimensional images, which are taken at different times, are sequentially compressed by projecting them on an abscissa and an ordinate, and a horizontal movement vector is calculated on the basis of a couple of the image signals projected on the abscissa and a vertical movement vector is calculated on the basis of a couple of the image signals projected on the ordinate. Alternately, correlation is calculated while sequentially shifting two dimensional images in two directions, thereby directly obtaining movement vectors in two dimensions.

Figure 29:
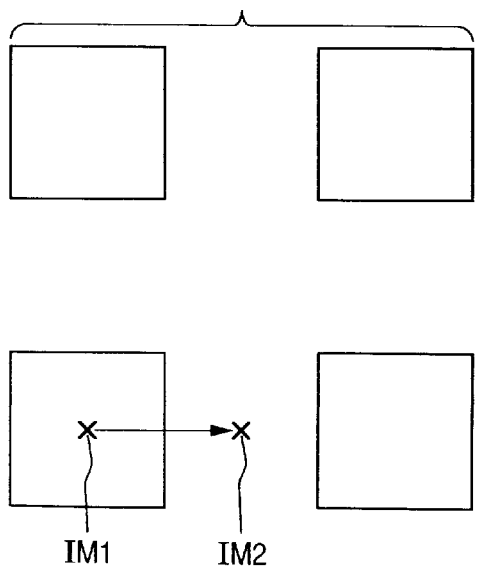
FIG. 29 is an explanatory drawing of a principle of pixel shifting according to an eighth embodiment.

FIG. 29 is a drawing showing image formation positions when the precise pixel shifting is performed without being affected by vibration. Similarly to FIG. 4, FIG. 29 shows image formation position of a given point of the image on the image sensing device IMS.

In FIG. 29, in a state in which the given point of an image is at a position IM1 in the left-lower pixel, first image signals are obtained (charges the image sensing device IMS and read the charges from the image sensing device IMS). Then, the image formation position is shifted by a half pixel distance to the horizontal direction (corresponding to yaw direction) so as to move the given point to a position IM2, where second image signals are obtained.

Figure 30:
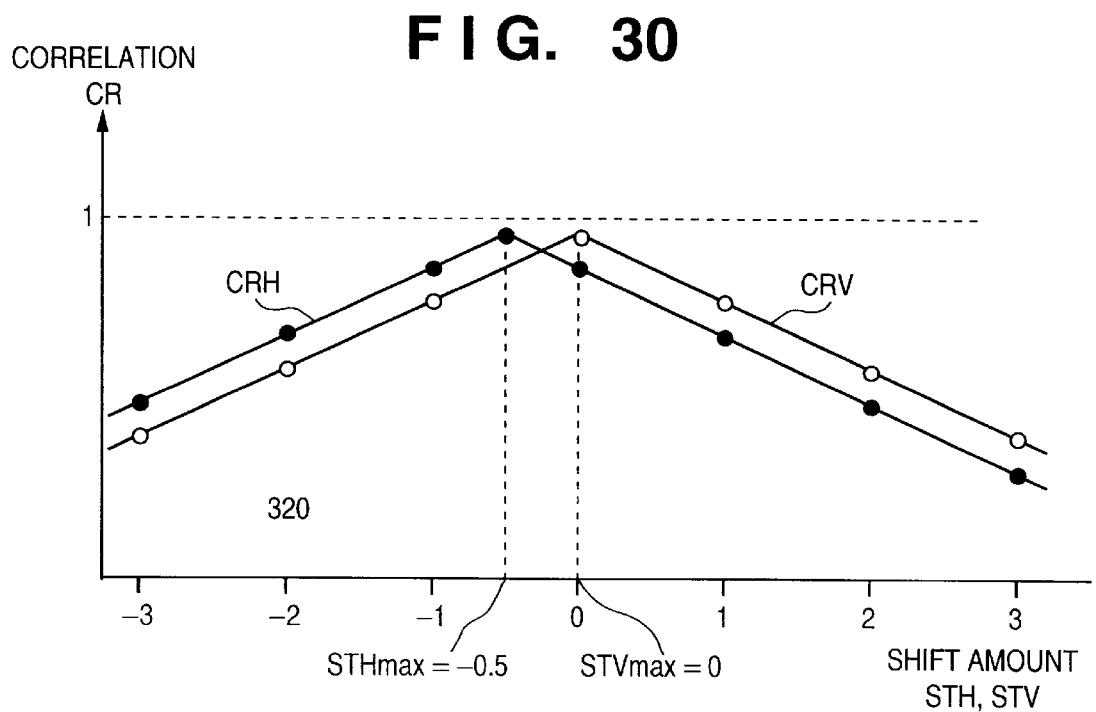
FIG. 30 is a graph showing correlation between first and second image signals.

FIG. 30 is a graph showing the correlation CR between the first and second image signals which were obtained in the states explained with reference to FIG. 29. The abscissa indicates shift amount between image signals of two images, and the shift amount in the horizontal direction is denoted by STH, and the shift amount in the vertical direction is denoted by STV. The ordinate indicates correlation CR. A line CRH shows correlation while shifting relative position between the two images in the horizontal direction by the shift amount of STH (between −3 and +3 pixel distances), and a line CRV shows correlation while shifting relative position between the two images in the vertical direction by the shift amount of STV (between −3 and +3 pixel distances).

Since the image formation position shown in FIG. 29 is shifted by a half pixel in the horizontal direction, and is not shifted in the vertical direction (pitch direction), the shift amounts, STH and STV, with which the correlation CR reaches the maximum value (called "maximum correlation shift amounts" hereinafter) are STHmax=−0.5 and STVmax=0. The maximum correlation values CRHmax and CRVmax in this case are little less than 1. This is because the second image is obtained by shifting the image formation position by a half-pixel distance, not by the integer multiple number of the interval between pixels; therefore, points of the first image sensed by respective pixels of the image sensing device IMS are not formed on the pixels when sensing the second image. The same holds true for correlation in the vertical direction, therefore, CRVmax does not become 1.

Figure 31:
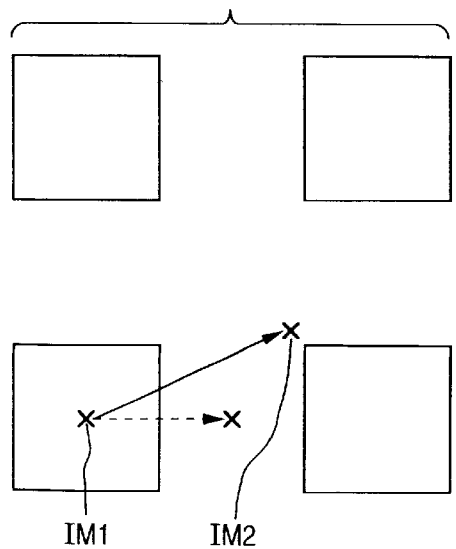
FIG. 31 is an explanatory view showing a case where large vibration was occurred while performing pixel shifting operation according to an eighth embodiment.

FIG. 31 is a view showing a case where a large vibration occurs while performing pixel shifting operation and the vibration can not be completely compensated even through image stabilization is functioning.

Referring to FIG. 31, in a state in which a given point of an image is at a position IM1 in the left-lower pixel, first image signals are obtained. Next, the image formation position is to be ideally shifted by a half pixel distance to the horizontal direction as indicated by a broken arrow, however, due to the vibration, it is assumed that the given point is shifted to a position IM2, and second image signals are obtained.

Figure 32:
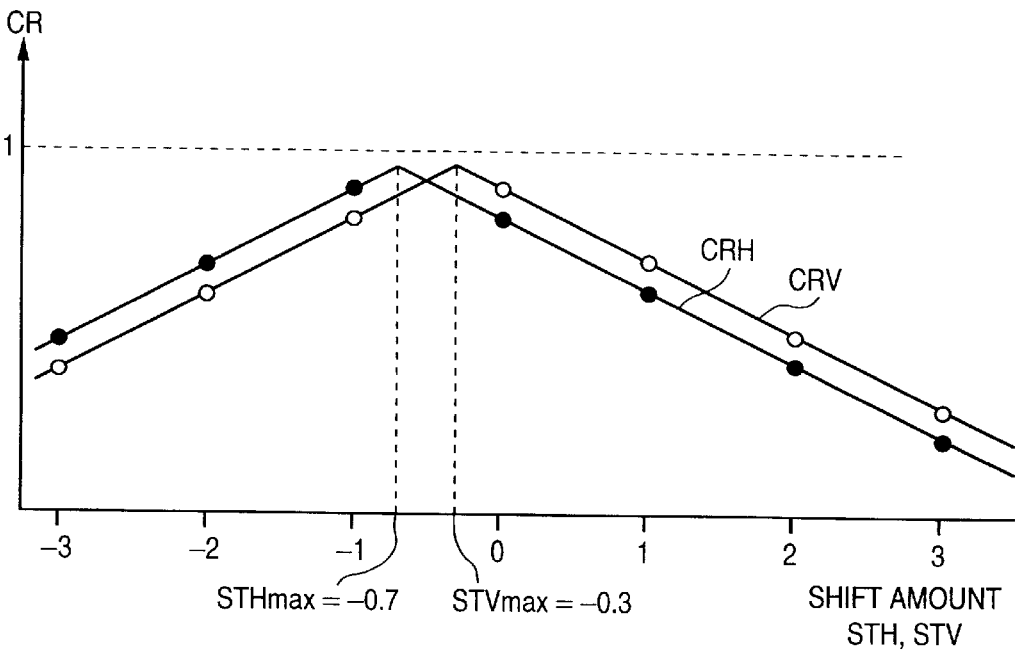
FIG. 32 is a graph showing correlation between first and second image signals.

FIG. 32 is a graph showing correlation CR between the first and second image signals obtained at different image formation positions as described with reference to FIG. 31. References used in FIG. 32 are the same as those used in FIG. 30.

Referring to FIG. 32, the maximum shift amounts in the horizontal and vertical directions, STHmax and STVmax, are −0.7 and −0.3, respectively. Let the differences between these maximum shift amounts and maximum shift amounts obtained when no vibration occurs as shown in FIG. 30 be $\delta_H$ and $\delta_V$, then $$\delta_H = ABS(-0.7 - (-0.5)) = 0.2 \quad (31)$$

$$\delta_V = ABS(-0.3 - 0) = 0.3 \quad (32)$$

$\delta_H$ and $\delta_V$ are blurring amounts (unit is "pixel distance"), caused by vibration, in the horizontal and vertical directions and ABS is an abbreviation of "absolute value". When these blurring amounts $\delta_H$ and $\delta_V$ exceed a predetermined value, e.g., $\delta_{MAX} = \pm 0.1$ pixel distance, improvement in resolution by synthesizing the first image signals and second image signals can not be expected. In such a case, pixel shifting mode, for example, is changed.

Here, since the image stabilization is functioning in the eighth embodiment, blurring due to vibration ideally does not occur; however, there is a possibility that blurring may occur due to an output error of the vibration sensors GRP and GRY and due to a large vibration which exceeds the ability of the image stabilization system of the camera. Blurring caused by the aforesaid reasons is uniformly observed in the entire area between sensed images. Therefore, by performing the aforesaid correlation calculation over the entire area of the sensed images, it is possible to determine blurring due to vibration.

The principle for generating a single high-resolution image by synthesizing a plurality of images obtained while performing pixel shifting operation is same as that explained in the first embodiment with reference to FIGS. 9A to 10E and equations (7) to (10), therefore, explanation of it is omitted.

Note, the aforesaid pixel shifting operation and the image synthesis method is used when image signals are obtained from a black-and-white image sensing device and a multiple-CCD type color image sensing device using a color separation prism. When image signals are obtained from a single CCD type color image sensing device covered with a mosaic color filter, although there are little differences in pixel shifting amount in the pixel shifting operation and the image synthesis method, the basic ideas of the pixel shifting operation and the image synthesis are the same.

Figure 33:
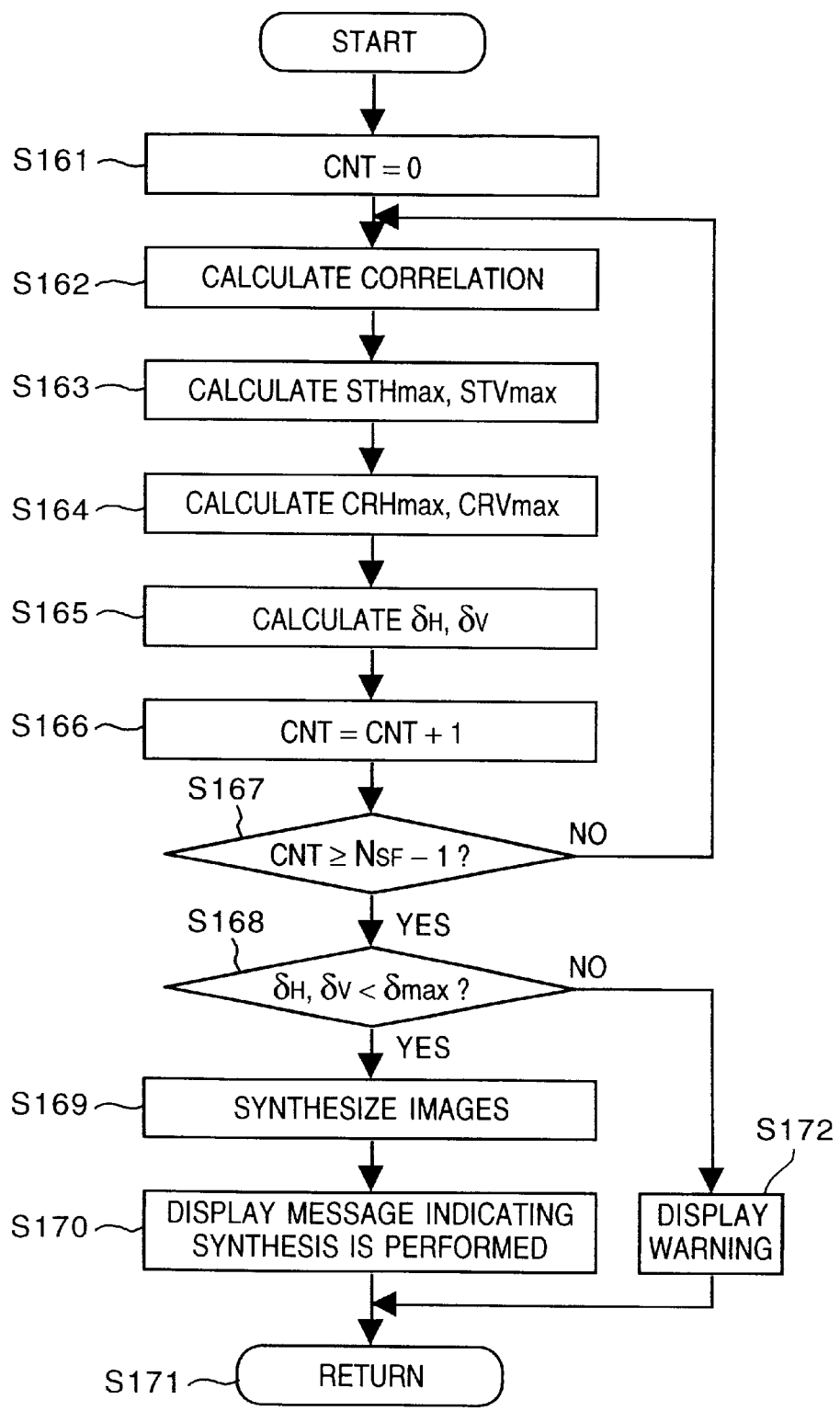
FIG. 33 is a flowchart of control processing performed in the processing shown in FIG. 18.

FIG. 33 is a flowchart of determination processing on vibration and image synthesis operation, as explained with reference to FIGS. 26A to 32 and 9A to 10E, performed during pixel shifting operation. This processing corresponds to the process performed in step S124 in FIG. 18.

First in step S161, a counter CNT for counting the number of image formation positions is initialized to 0.

In step S162, correlation between the first and second image signals are calculated on the basis of the equation (30). The process proceeds to step S163 where the maximum shift amounts in the horizontal and vertical directions, STHmax and STVmax, are calculated on the basis of the result of the correlation calculated in step S162.

Thereafter, in step S164, the maximum correlation in the horizontal and vertical directions, CRHmax and CRVmax are calculated. Further, in step S165, the blurring amounts in the horizontal and vertical directions, $\delta_H$ and $\delta_V$ are calculated.

In step S166, the counter CNT is increased by 1, and in step S167, the value of the counter CNT and the predetermined value $N_{SF}$ indicating the number of image formation positions are compared. For example, if $N_{SF}$ is 4, calculations performed in steps S162 to S165 are performed three times, i.e., between the first and second image signals, the second and third image signals, and the third and fourth image signals. Therefore, if CNT is less than $N_{SF}-1$, then the process returns to step S162, and the processes in steps S162 to S166 are performed on the next pair of image signals. When the CNT reaches $N_{SF}-1$, the process proceeds to step S168.

In step S168, the respective blurring amounts $\delta_H$ and $\delta_V$ which are calculated in step S165 are compared to the predetermined value $\delta_{MAX}$. If both of the blurring amounts $\delta_H$ and $\delta_V$ are less than the predetermined value $\delta_{MAX}$, improvement in resolution is expected by synthesizing a plurality of images obtained in pixel shifting operation, therefore, the process proceeds to step S169 where image synthesis is performed in the same manner as described with reference to FIGS. 10A to 10E.

In step S170, a message indicating that a normal image synthesis of a plurality of images obtained while performing pixel shifting operation is performed is displayed on the display DISP. Thereafter, in step S171, the process returns to the main processing shown in FIG. 18.

Whereas, if it is determined in step S168 that at least one of the blurring amounts $\delta_H$ and $\delta_V$ is equal or greater than the predetermined value $\delta_{MAX}$ then the process goes to step S172 where a warning message notifying that image synthesis of the plurality of images obtained while performing pixel shifting operation is not performed is displayed on the display DISP. Thereafter, the process returns to the main processing shown in FIG. 18 in step S171. In the above case, one of the plurality of images, not a synthesized image, such as the one represented by the first image signals, is outputted.

According to the eighth embodiment as described above, (1) Blurring due to vibration is determined on the basis of correlation between image signals of a plurality of images which are obtained in pixel shifting operation, and whether or not image synthesis of the plurality of images should be performed is determined in accordance with the degree of the blurring. Accordingly, deterioration of image quality due to vibration can be reduced, and a high-resolution image obtained by synthesizing a plurality of images obtained while performing pixel shifting operation can be generated.

(2) Since whether or not image synthesis of the plurality of images was performed is notified to the user using a display, the user can check the resolution of an obtained image. Further, in a case where image synthesis is not performed because of strong effect of vibration, it is possible for the user to perform image sensing operation once more.

(3) Blurring amounts are calculated each time an image formation position shifts while performing pixel shifting operation, therefore, blurring is detected at high precision. Accordingly, deterioration of image quality by performing pixel shifting operation due to vibration is prevented.

Ninth Embodiment

In the eighth embodiment, blurring is determined each time the image formation position is shifted in the pixel shifting operation, and when large vibration occurs even one time, the image synthesis is not performed. In the following ninth embodiment, image signals of one more image are obtained in the initial image formation position of pixel shifting operation, and the image signals are used for blurring detection.

Figure 34:
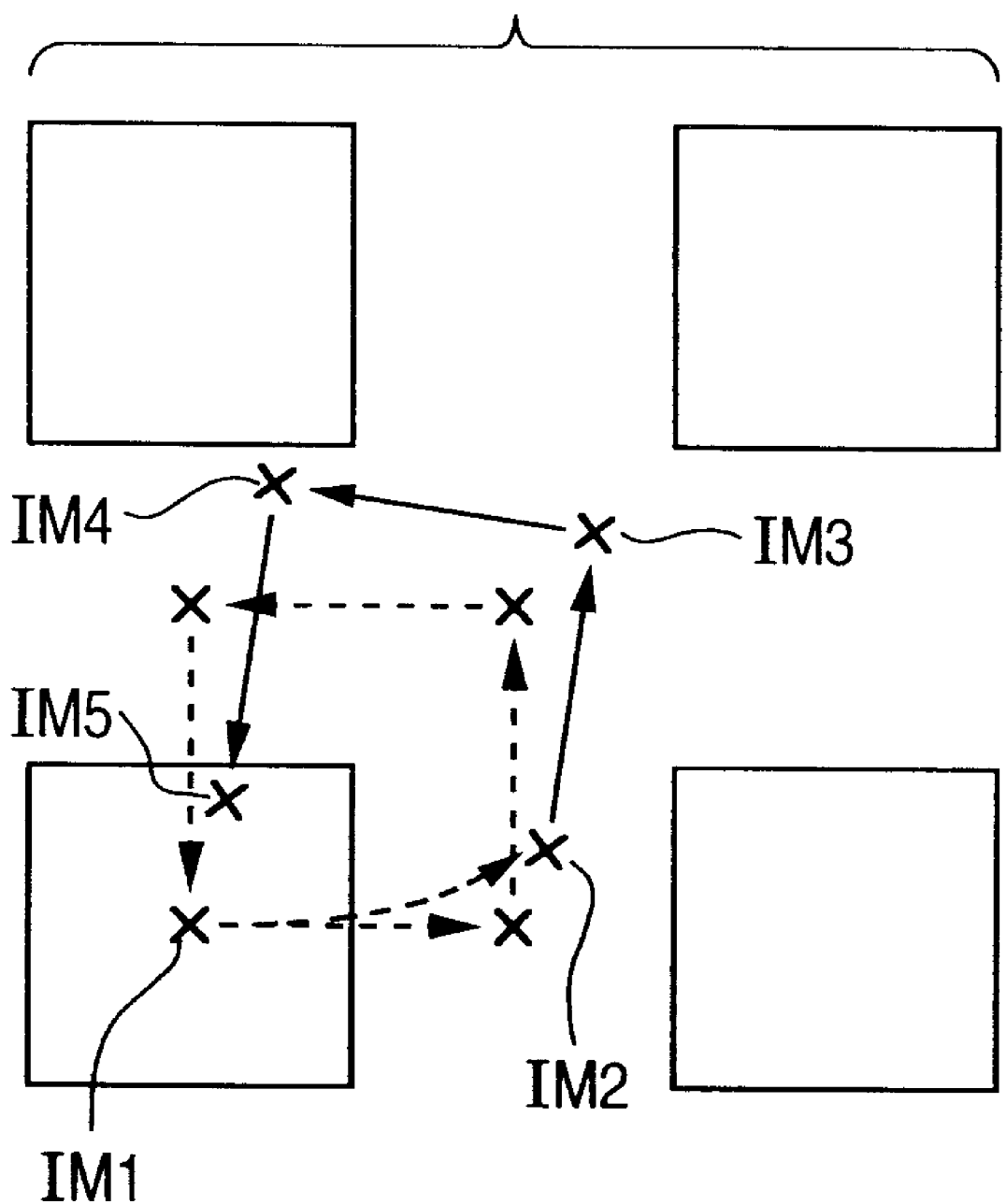
FIG. 34 is an explanatory view showing a track of a given point of an image formed on an image sensing device according to a ninth embodiment of the present invention.
Figure 35:
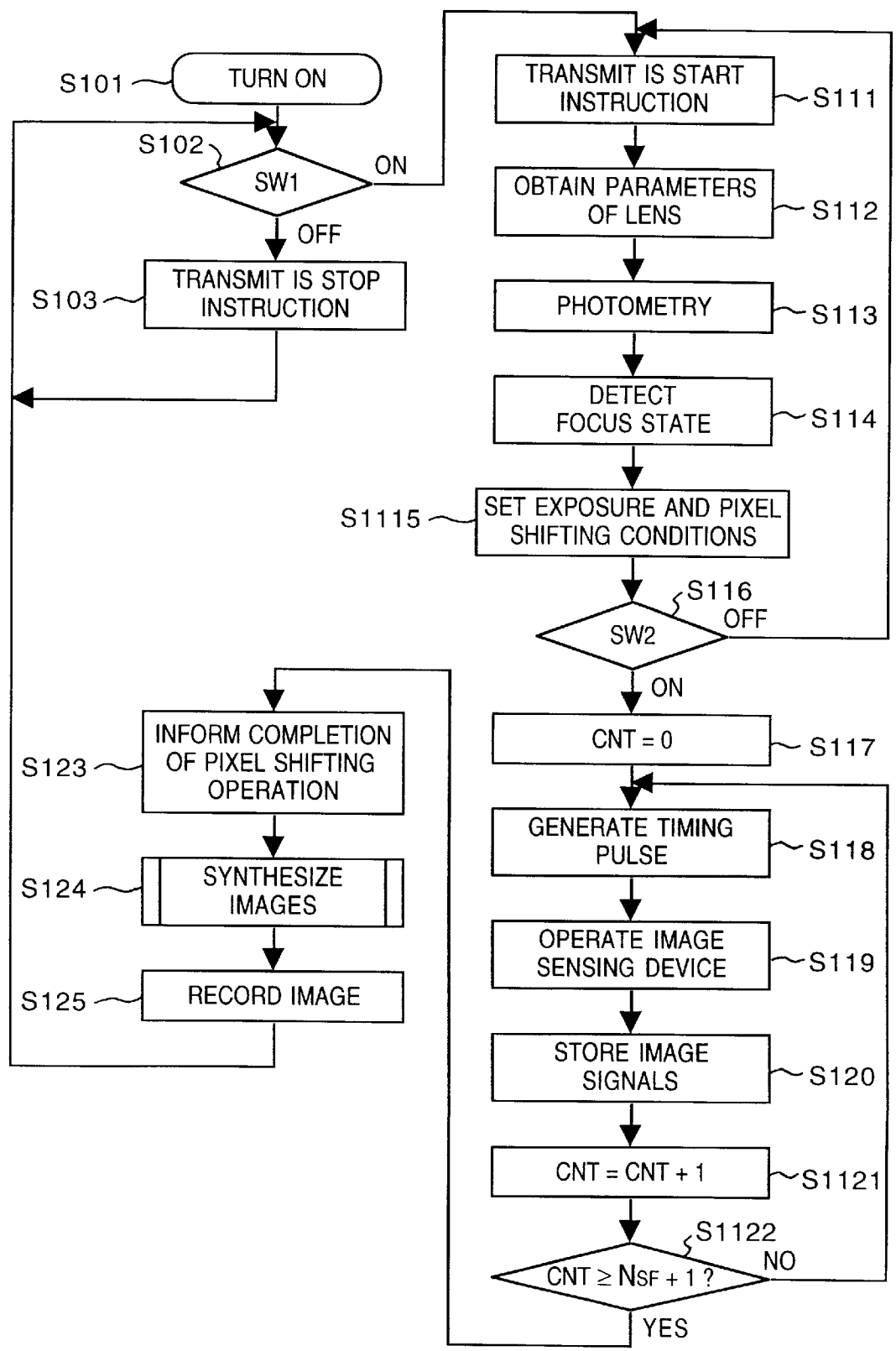
FIG. 35 is a flowchart of control processing in the camera main body according to the ninth embodiment of the present invention.
Figure 36:
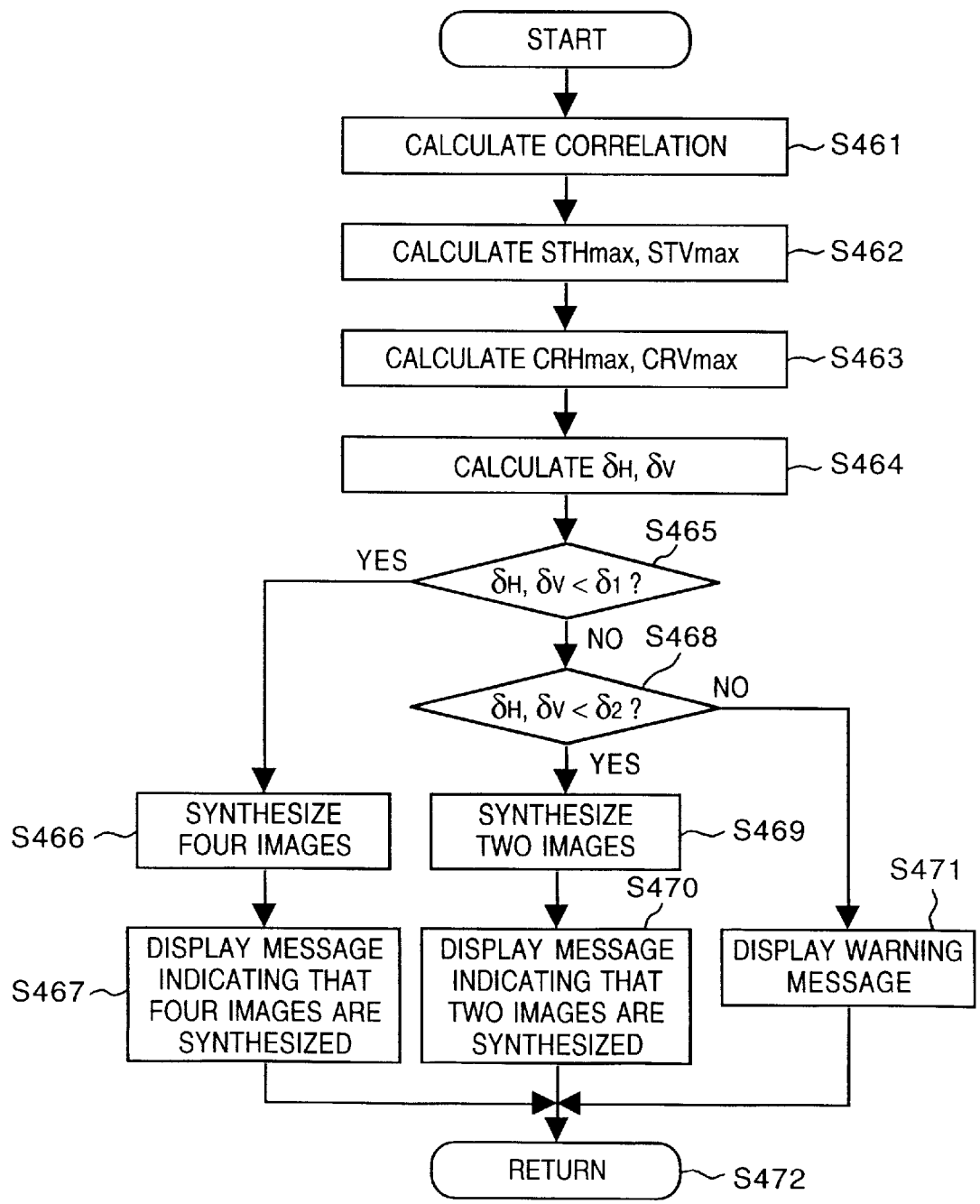
FIG. 36 is a flowchart of control processing in the camera main body according to the ninth embodiment of the present invention.

FIG. 34 shows a track of a given point of an image formed on the image sensing device IMS when performing pixel shifting operation. FIGS. 35 and 36 are flowcharts of control processing in the camera main body according to the ninth embodiment. Explanation on operation according to the ninth embodiment follows with reference to FIGS. 34 to 36.

Referring to FIG. 34, an image is to be ideally shifted on the track, shown by a broken line, with respect to the image sensing device IMS, and image signals of five images (respectively referred to as "first to fifth image signals" hereinafter) are obtained. However, it is assumed that the actual image formation position shifts on the track, shown by a solid line, in the order of IM1, IM2, IM3, IM4 and IM5. In order to increase resolution in pixel shifting operation, the first to fourth image signals are synthesized, and the first and fifth image signals are used to calculate correction for determining blurring in the images. More specifically, if no blurring is determined, the first image signals obtained at the position IM1 and the fifth image signals obtained at the position IM5 should completely match, and STHmax and STVmax should be 0, $\delta_H$ and $\delta_V$ should be 0, and CRHmax and CRVmax should be 1. Whereas, if images are affected by vibration, blurring amounts in the horizontal and vertical directions $\delta_H$ and $\delta_V$ have values other than 0 which represent resultant blurring occurred in pixel shifting operation.

The control processing shown in FIG. 35 is basically the same as that explained in the eighth embodiment with reference to FIG. 18; however, step S122 in FIG. 18 where the number of image formation positions is compared to a predetermined value is different. More specifically, in step S122 in FIG. 18, after image signals of four images are obtained, the process proceeds to step S123.

Whereas, in the ninth embodiment as shown in FIG. 35, the image formation position is returned to the initial position of the pixel shifting operation after image signals of four images are obtained, and a fifth image to be used for determining blurring of images is sensed. Accordingly, after the counter CNT for counting the number of image formation positions becomes $N_{SF}+1$, e.g., 5, in step S1122, the process proceeds to step S123.

After the process in step S123 is performed, a plurality of images are synthesized in step S124 in such a manner as shown in the flowchart in FIG. 36. The steps other than steps S1122, and S124 are the same as that explained in the eighth embodiment with reference to FIG. 18, therefore, explanation of them are omitted.

FIG. 36 is a flowchart showing control processing of image synthesis performed in step S124 in FIG. 35. Similarly to the processing shown in FIG. 33 explained in the eighth embodiment, detection of blurring occurred while performing pixel shifting operation and image synthesis are performed.

In step S461, correlation between the first and fifth image signals is calculated on the basis of the equation (30).

Thereafter, in step S462, the maximum shift amounts STHmax and STVmax are calculated on the basis of the correlation result.

In step S463, the maximum correlation CRHmax and CRVmax are calculated.

In step S464, the blurring amounts $\delta_H$ and $\delta_V$ are calculated. In the ninth embodiment, the maximum shift amounts STHmax and STVmax are $\delta_H$ and $\delta_V$.

Then, in step S465, the respective blurring amounts $\delta_H$ and $\delta_V$ calculated in step S464 are compared to a first predetermined value $\delta_1$. If both the blurring amounts $\delta_H$ and $\delta_V$ calculated in step S464 are smaller than the first predetermined value $\delta_1$, it is determined that blurring due to vibration is very small and improvement in resolution is expected by synthesizing all the four images sensed while performing pixel shifting operation. Therefore, the process proceeds to step S466 where the four images are synthesized in the same manner as explained with reference to FIGS. 10A to 10E.

In step S467, a message indicating that four images are synthesized is displayed on the display DISP. Then, the process proceeds to step S472 where the process returns to the control processing shown in FIG. 35. If it is determined in step S465 that at least one of the blurring amounts $\delta_H$ and $\delta_V$ is equal or greater than the first predetermined value $\delta_1$ then the process proceeds to step S468. In step S468, the blurring amounts $\delta_H$ and $\delta_V$ are compared to a second predetermined value $\delta_2$ which is greater than $\delta_1$. If both of the blurring amounts $\delta_H$ and $\delta_V$ are smaller than the second predetermined value $\delta_2$, since improvement in resolution is expected by synthesizing a plurality of images although a synthesized image would somewhat blur because of vibration. Accordingly, the process proceeds to step S469 where two images out of four images are synthesized. This is because synthesis of a plurality of images increase resolution, however, there is a possibility that the quality of the synthesized image would decrease, because of effect of vibration, by synthesizing a plurality of images which are obtained in a long period of time. There is even a possibility that the quality of the synthesized image would be lower than the quality of each of the four images. Accordingly, in the ninth embodiment, all the four images are not synthesized to remove the effect of vibration, although the possible highest resolution can not be achieved. More specifically, the first and second image signals may be synthesized to increase the resolution in the horizontal direction, or the first and third image signals may be synthesized, for instance. In these cases, pixels which are not provided with information from the synthesized image signals of the two images may be interpolated with their neighbor pixel values.

After the image synthesis in a predetermined manner is completed in step S469, the process proceeds to step S470 where a message indicating that two images are synthesized is displayed on the display DISP. Thereafter, the process proceeds to step S472 and returns to the control processing shown in FIG. 35.

Whereas, if at least one of the blurring amounts $\delta_H$ and $\delta_V$ is larger than the second predetermined value $\delta_2$, it is expected that the image would deteriorate by synthesizing a plurality of images because of large vibration, therefore, the process proceeds to step S471 where a warning message indicating that image synthesis was not performed is displayed on the display DISP. Then, in step S472, the process returns to the control processing shown in FIG. 35. In this case, one of the first to fourth image signals, not synthesized image signals, e.g., the first image signals, are outputted as the final image signals.

According to the ninth embodiment as described above, in addition to the same effects as those of the eighth embodiment, (4) Blurring occurred while performing the pixel shifting operation is determined on the basis of two images, therefore, it takes a short time to determine the blurring.

(5) Since an image which is first sensed in pixel shifting operation and an image sensed after an image formation position in the image shifting operation is moved back to the initial position are used for calculating correlation, the shifted amounts between the two images, calculated on the basis of the result of correlation, corresponds to blurring amounts. Therefore, calculation on the blurring amounts is simplified, since it is unnecessary to calculate correlation in consideration of shifted amounts due to the pixel shifting operation.

(6) An optimum image synthesis mode is selected from a plurality of image synthesis modes in accordance with the blurring amounts; therefore, it is possible to prevent deterioration of an image caused by synthesizing a plurality of images obtained in pixel shifting operation, due to vibration.

(7) Since the selected pixel shifting mode is displayed, the user can determine the resolution of an obtained image.

Tenth Embodiment

In the eighth and ninth embodiments, blurring amounts are calculated on the basis of correlation between a plurality of images obtained while performing pixel shifting operation, and when at least one the blurring amounts is greater than a predetermined value, synthesis is disabled. In the following tenth embodiment, by providing means for correcting blurring, synthesis of a plurality of images is performed even when the blurring amount is greater than the predetermined value.

Figure 39:
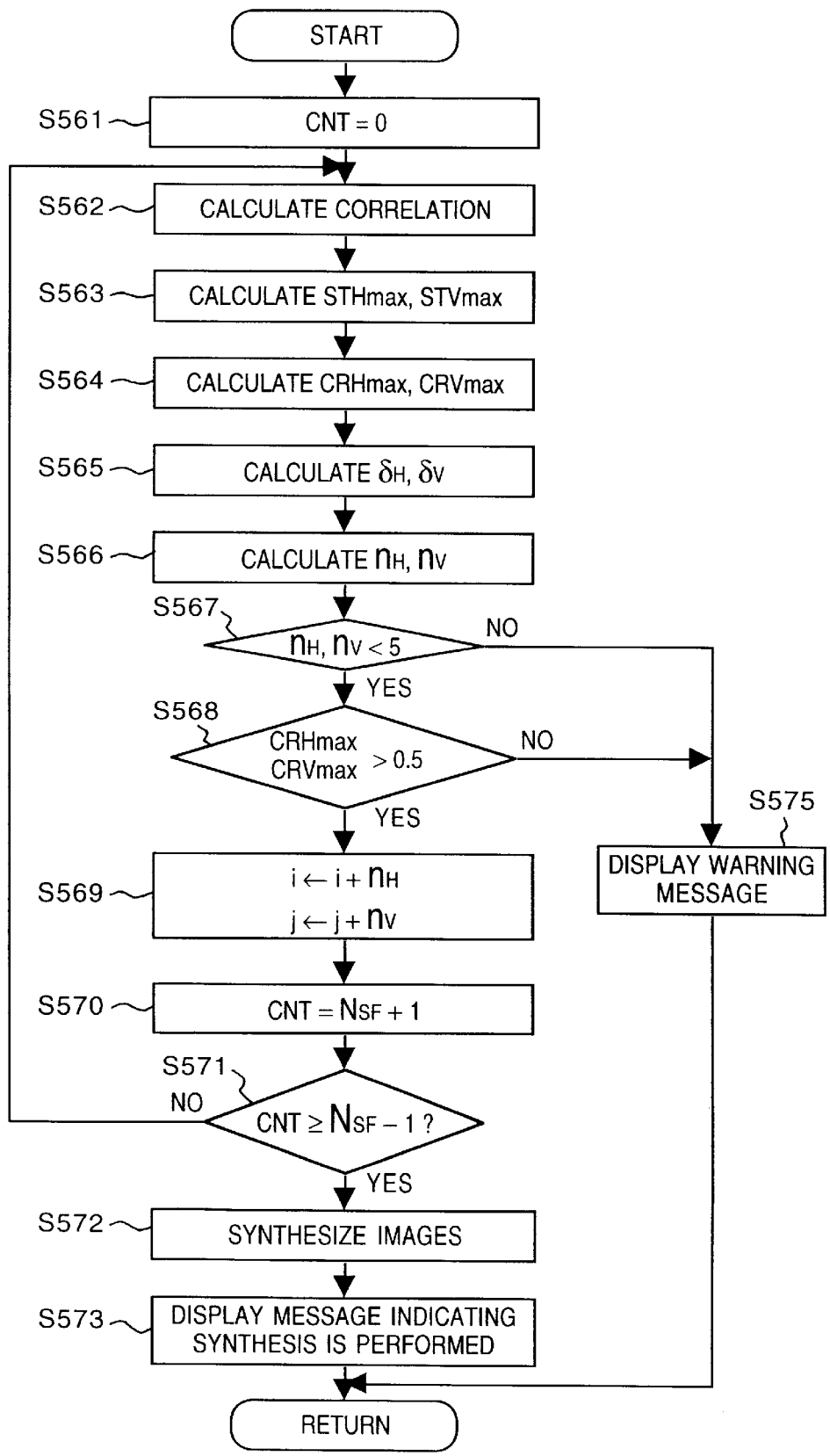
FIG. 39 is a flowchart of control processing in the camera main body according to the tenth embodiment of the present invention.

FIG. 37 is an explanatory view showing a track of a given point of an image on the image sensing device IMS according to the tenth embodiment of the present invention. FIG. 38 is a graph showing correlation CR between first and second image signals, and FIG. 39 is a flowchart of control processing in the camera main body. The operation of the tenth embodiment follow with reference to FIGS. 37 to 39.

Referring to FIG. 37, the given point of the image is to be ideally shifted by a half pixel distance in the horizontal direction, as indicated by a broken line. However, it is assumed that the position of the given point of the image is actually shifted from IM1 to IM2, as shown by a solid line, because of vibration.

FIG. 38 is a graph showing correlation between the two images sensed when the given point of the image is at the positions IM1 and IM2. For convenience, the image sensed when the given point of the image is at the position IM1 is referred to as "first image IM1", and the other image is referred to as "second image IM2" below. Referring to FIG. 38, it is known that STHmax is −1.5, STVmax is 0, $\delta_H$ is 1 (=ABS(−1.5−0.5))), $\delta_V$ is 0 (=ABS(0−0)), and CRHmax and CRVmax are 0.94. Here, the blurring amount in the vertical direction $\delta_V$ is 0, thus does not cause any problem; however, since the blurring amount $\delta_H$ in the horizontal direction corresponds to one pixel distance, if a plurality of images are synthesized in this state, the obtained image would have lower image quality than that of each of the plurality of images. However, in a case where a blurring amount between the two images is about the integer multiple numbers of pixel distance, by synthesizing the two images after one of these images is shifted in a direction, which is opposite to the blurring direction, by the distance of the integer multiple numbers of one pixel distance, it is possible to cancel out the blurring. For example, in FIG. 37, the second image IM2 is shifted by 1.5 pixel distances in the horizontal direction with respect to the first image IM1 due to pixel shifting operation and vibration. Thus, by synthesizing the first image IM1 and the second image IM2 after the second image IM2 is shifted by one pixel distance, blurring due to vibration is canceled, and only the shift amount of a half pixel distance due to pixel shifting operation remains.

More specifically, $$n_H = INT(\delta_H) \tag{33}$$

$$N_V = INT(\delta_V) \tag{34}$$

where INT() indicates the rounding off, to the nearest whole number, to change the blurring amounts $\delta_H$ and $\delta_V$ to integers $n_H$ and $n_V$. Further, coordinate of pixels, i and j, of the image signals IG2(i, j) described in the aforesaid equation (8) are changed on the basis of, $$i \leftarrow i + n_H \tag{35}$$

$$j \leftarrow j + n_V \tag{36}$$

Accordingly, coordinates of pixels of the second image IM2 are shifted by a distance of the blurring amount before being synthesized with the first image IM1, thereby it is possible to cancel out the blurring.

The aforesaid operation is also performed on the image signals IM3 and IM4 (i.e., IG3(i, j) and IG4(i, j) of the equations (9) and (10)). In this case, correlation used for calculating blurring amounts is preferably performed with respect to the first image IM1.

By synthesizing images using the equations (7) to (10) after the aforesaid operation is performed on each of the plurality of images, it is possible to increase the resolution of an image by synthesizing the plurality of images obtained while performing pixel shifting operation even in a case where blurring which is greater than one pixel distance occurred between the plurality of images.

The control processing performed by the microcomputer CCPU of the camera main body CMR according to the tenth embodiment is basically the same as that shown in FIG. 18 explained in the eighth embodiment, except a process in step S124. In step S124 in the tenth embodiment, processing as described in the flowchart in FIG. 39 is performed.

First in step S561, a counter CNT for counting the number of image formation positions is initialized to 0.

In step S562, correlation between the first and second image signals is calculated on the basis of the equation (30).

Thereafter, in step S563, the maximum shift amounts STHmax and STVmax are calculated on the basis of the correlation result.

In step S564, the maximum correlation CRHmax and CRVmax are calculated.

In step S565, the blurring amounts $\delta_H$ and $\delta_V$ are calculated.

In step S566, the blurring amounts $\delta_H$ and $\delta_V$ are rounded into integers ($n_H$ and $n_V$).

In step S567, the rounded blurring amounts $n_H$ and $n_V$ are evaluated, and if both of them are smaller than five pixel distances, then the process proceeds to step S568. Whereas, if at least one of the rounded blurring amounts $n_H$ and $n_V$ is equal or greater than five pixel distances, since there is a more possibility that each of the plurality of images blurs, a warning message indicating that blurring due to vibration is large is displayed on the display DISP in step S575.

Thereafter, the process proceeds to step S574 and returns to the control processing in FIG. 18. In this case, synthesis of images is not performed, and one of the images sensed while performing pixel shifting operation is recorded on a recording device in step S125 in the processing shown in FIG. 18.

Whereas, when the process proceeds from step S567 to step S568, whether or not both of the maximum correlation values CRHmax and CRVmax are greater than a predetermined value, e.g., 0.5, is determined. If both of the maximum correlation values CRHmax and CRVmax are greater than 0.5, the process proceeds to step S569. Whereas, if at least one of the maximum correlation values CRHmax and CRVmax does not exceed 0.5, then it is determined that reliability of the blurring amounts $\delta_H$ and $\delta_H$, calculated from the correlation, is low. If blurring is corrected on the basis of an incorrect result of blurring determination and the images are synthesized, the synthesized image would have lower quality than each of the original images. Accordingly, when at least one of the maximum correlation values CRHmax and CRVmax is equal or less than 0.5, the process proceeds to step S575 where a warning message is displayed and the process returns to the processing shown in FIG. 18, in step S574.

If the integer blurring amounts $n_H$ and $n_V$ are smaller than the predetermined value (5, in this case) in step S567 and the maximum correlation values CRHmax and CRVmax are greater than the predetermined value (0.5, in this case) in step S568, then the process proceeds to step S569.

In step S569, blurring correction is performed in accordance with the equations (35) and (36).

In step S570, the counter CNT is increased by 1.

Next in step S571, the value of the counter CNT is compared with a predetermined value $N_{SF}$ indicating the number of image formation positions. For example, when $N_{SF}$ is 4, calculations performed in steps S562 to S569 are performed three times between the first and second image signals, the second and third image signals, and the third and fourth image signals. Therefore, if CNT is less than $N_{SF}-1$, then the process returns to step S562, and the processes in steps S562 to S569 are performed on the next pair of image signals. When the CNT reaches $N_{SF}-1$, the process proceeds to step S572.

Thereafter, in step S572, image synthesis is performed in the same manner as described with reference to FIGS. 10A to 10E.

In step S573, a message indicating that image synthesis is performed after correcting blurring is displayed on the display DISP. Then, in step S574, the process returns to the processing shown in FIG. 18.

According to the tenth embodiment as described above, in addition to the same effects as those of the eighth embodiment, (8) Since synthesis of a plurality of images sensed while performing pixel shifting operation is performed after detecting and correcting blurring between the plurality of images, it is possible to obtain a high-resolution image by synthesizing the plurality of images even in a case where blurring amount, due to vibration, is larger than a pixel distance.

(9) Since whether or not to perform synthesis of a plurality of images obtained while performing pixel shifting operation is determined in accordance with the correlation between the plurality of images, it is possible to prevent deterioration of an image when pixel shifting operation was unsuccessful.

Modifications

The above eighth to tenth embodiments can be applied to an image sensing apparatus which senses a plurality of images in a predetermined period and synthesizes the sensed images for purposes other than pixel shifting operation. For example, by applying the eighth to tenth embodiments to an image sensing apparatus which senses a plurality of images while changing luminous exposure and synthesizes the plurality of images in order to widen the dynamic range of a synthesized image, it is possible to obtain an image of a wide dynamic range without being affected by vibration.

In another example, by applying the eighth to tenth embodiments to an image sensing apparatus which senses a plurality of images of the same scene at different timing to realize an effect of multiple exposures, plural number of a moving object are recorded overlaid in a single image, while a still object is reproduced without blurring.

Eleventh Embodiment

Figure 40:
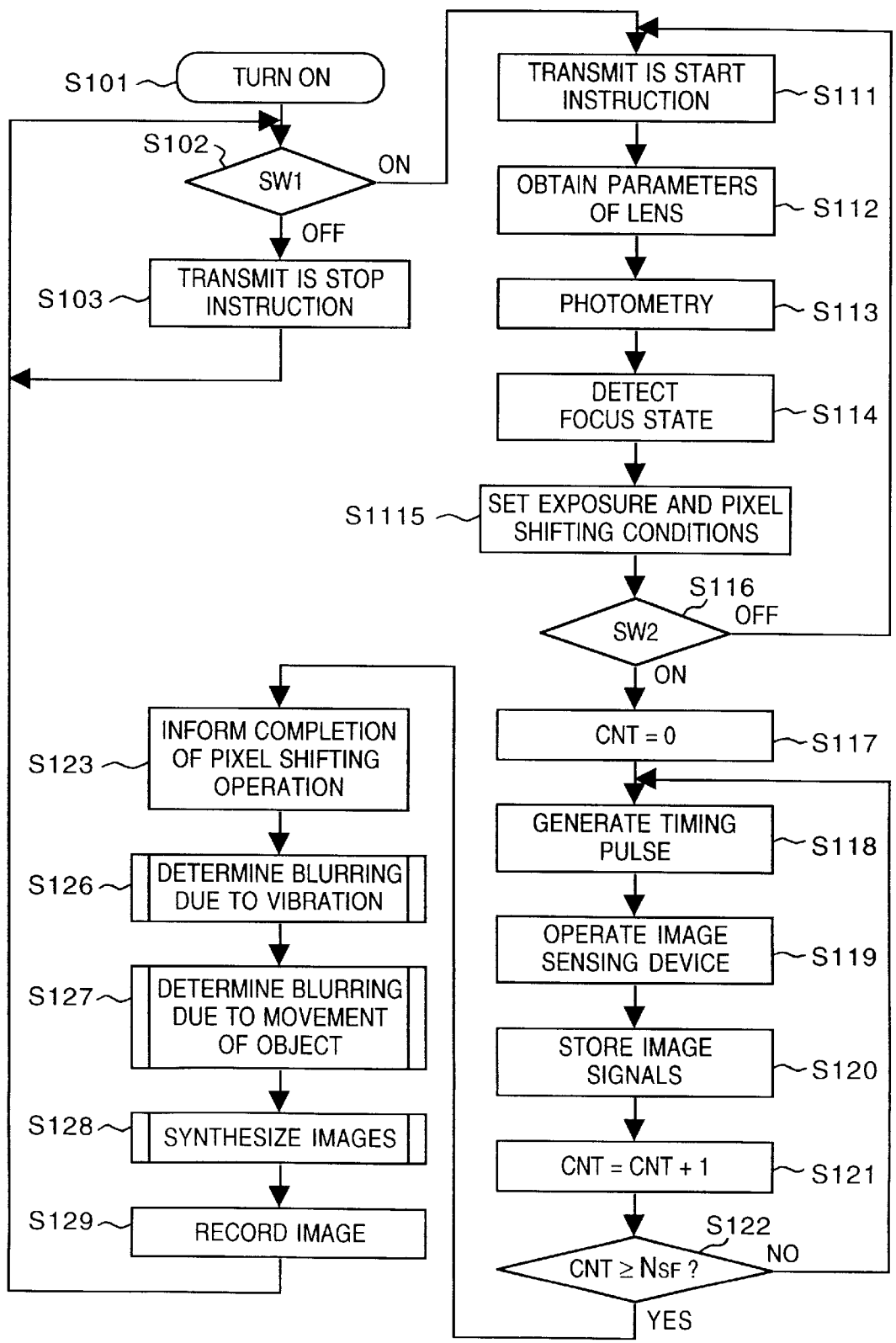
FIG. 40 is a flowchart of control processing in the camera main body according to an eleventh embodiment of the present invention.

FIGS. 40 and 7 are flowcharts of control processing by the microcomputer CCPU of the camera main body CMR and the microcomputer LCPU of the lens LNS, respectively, according to an eleventh embodiment of the present invention.

First, a flow of the control processing by the microcomputer CCPU of the camera main body CMR is explained with reference to FIGS. 1 and 40.

When the main switch (power switch) SWMN of the camera main body CMR is turned on in step S101, electric power is supplied to the microcomputer CCPU, then the process proceeds to step S102 where operation of the camera starts.

In step S102, the state of the switch SW1, which is turned on in response to the half stroke of the release button, is detected. If the SW1 is off, then the process proceeds to step S103, where an instruction to stop image stabilization (IS) operation (IS stop instruction) is transmitted to the lens LNS.

The steps S102 and S103 are repeatedly performed until the switch SW1 is turned on or the main switch SWMN is turned off.

When the switch SW1 is turned on in step S102, the process proceeds to step S111. In step S111, the microcomputer CCPU transmits an instruction to start IS operation (IS start instruction) to the microcomputer LCPU via the signal line DCL.

Next in step S112, communication for obtaining parameters which are specific to the lens, such as F number and focal length of the lens, from the microcomputer LCPU is performed.

Then, in step S113, the luminance of the object is sensed by the sensor SNS, and the charging period of the image sensing device for obtaining image signals and the value for controlling the iris diaphragm are calculated in accordance with the predetermined exposure control program, and the microcomputer CCPU transmits the calculation results to the microcomputer LCPU.

The process proceeds to step S114 where the focus state is detected by the sensor SNS, and an instruction for operating the focus lens is transmitted to the microcomputer LCPU.

In step S1115, the state of the pixel shifting mode selection switch SWSF is detected. Further, pixel shifting conditions, such as, whether or not the pixel shifting is to be performed and the number of image formation positions $N_{SF}$ on the image sensing device IMS in an image sensing operation (if it determined not to perform pixel shifting, $N_{SF}$ is set to 1, whereas if it is determined to perform pixel shifting, then $N_{SF}$ is set to at least 2), are set on the basis of the result of the photometry.

Thereafter, the process proceeds to step S116, where the state of the switch SW2 which is turned on in response to the full stroke of the release button is detected. If the switch SW2 is OFF, then the process returns to step S111, and steps S111 to S115 are repeated. Whereas, if it is detected that the switch SW2 is ON, then the process proceeds to step S117.

In step S117, a counter CNT for counting the number of image formation positions is initialized to 0.

Then, in step S118, a timing pulse which is a trigger signal for image sensing operation is generated, and transmitted to the microcomputer LCPU.

In step S119, the microcomputer CCPU controls the image sensing device IMS, via the driver IMDR, to charge, then transfer the charges in the image sensing device IMS.

In step S120, the image signals read at step S119 are temporarily stored in the RAM of the microcomputer CCPU.

In step S121, the counter CNT 1 is increased by 1.

In step S122, whether or not the counter CNT reaches the number of image formation positions $N_{SF}$ is determined. If it is not, then the process returns to step S118 and waits for the next timing pulse being generated, then pixel shifting operation is continued. If it is determined that the counter CNT has reached the number of image formation positions $N_{SF}$, then the process proceeds to step S123.

In step S123, completion of pixel shifting operation (or completion of the storing of required image signals) is informed to the microcomputer LCPU.

Thereafter, the process proceeds to step S126, where blurring in images due to vibration is determined from the plurality of images obtained while performing pixel shifting operation. Details will be explained later with reference to FIG. 46.

In step S127, blurring in images due to movement of an object is also determined from the plurality of images obtained while performing the pixel shifting operation. Details will be explained later with reference to FIG. 47.

Then the process proceeds to step S128 where a plurality of images are synthesized to generate a single image in accordance with the result of blurring due to vibration and movement of the object, detected in steps S126 and S127. Details will be explained with reference to FIG. 48.

In step S129, the image outputted in step S128 is stored in the memory MEM.

Accordingly, an image sensing operation is completed and the process returns to step S102. If the switch SW1 becomes ON in step S102, then the processes in step S111 and the subsequent steps are repeated, whereas, if the switch SW1 is OFF, then an instruction to stop IS operation is transmitted to the microcomputer LCPU in step S103.

Control processing performed by the microcomputer LCPU of the lens LNS is the same as that explained in the first embodiment with reference to FIG. 7, therefore, the explanation of it is omitted.

Further, method for determining blurring due to vibration from the plurality of images obtained while performing pixel shifting operation is the same as that explained in the eighth embodiment with reference to FIGS. 26A to 32, the explanation of it is also omitted.

Next, method for determining blurring in images due to movement of an object is explained with reference to FIGS. 41 and 42.

Figure 41:
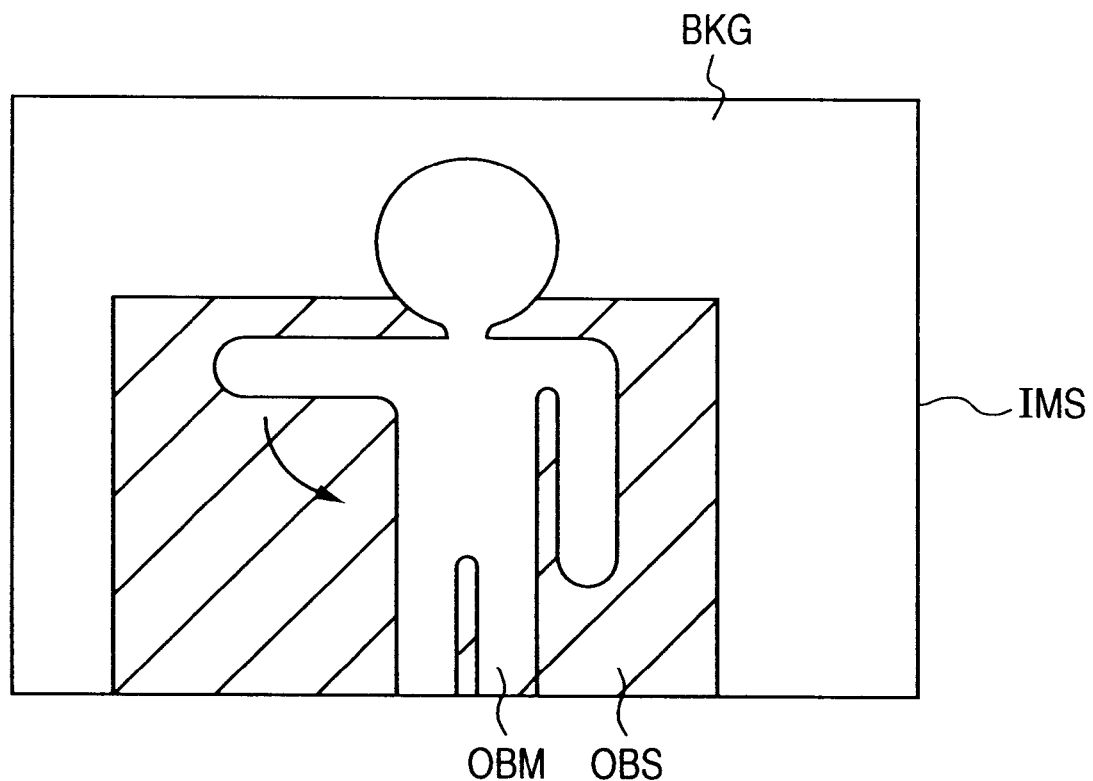
FIG. 41 is an explanatory view showing an image of an object formed on a photo-sensing surface of an image sensing device.

FIG. 41 is an explanatory view showing an image of an object formed on the photo-sensing surface of the image sensing device IMS. In the middle portion of the image, the main object OBM, e.g., a person, is formed, and in the back of the main object, a subordinate object OBS is formed, further, in the back of the subordinate object OBS, a background BKG is formed. Here, it is assumed that a part of the person, e.g., the arm, is moving in the direction of the arrow.

Figure 42:
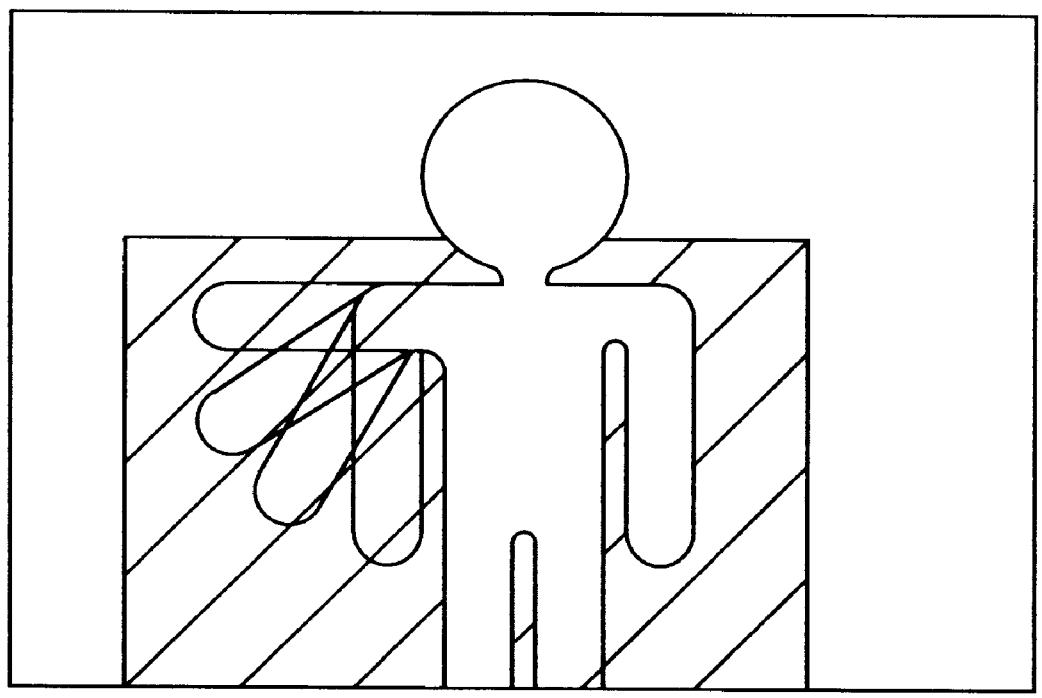
FIG. 42 is an explanatory view showing a synthesized image of an object.

FIG. 42 is an explanatory view showing an image obtained by synthesizing four images of the object which is shown in FIG. 41 sensed while performing pixel shifting operation, without correcting blurring of the object. In the pixel shifting operation, the same exposure operation as that of multiple exposure operation is performed, and blurring due to movement of the object can not be corrected by compensating blurring due to vibration, which uniformly occurs over the images. In this case, therefore, the person reproduced in the synthesized image looks as if he/she has transparent four arms through which the subordinate object is seen, as shown in FIG. 42. Thus, the obtained image would not be a normal photograph which the user would have intended.

Figure 43:
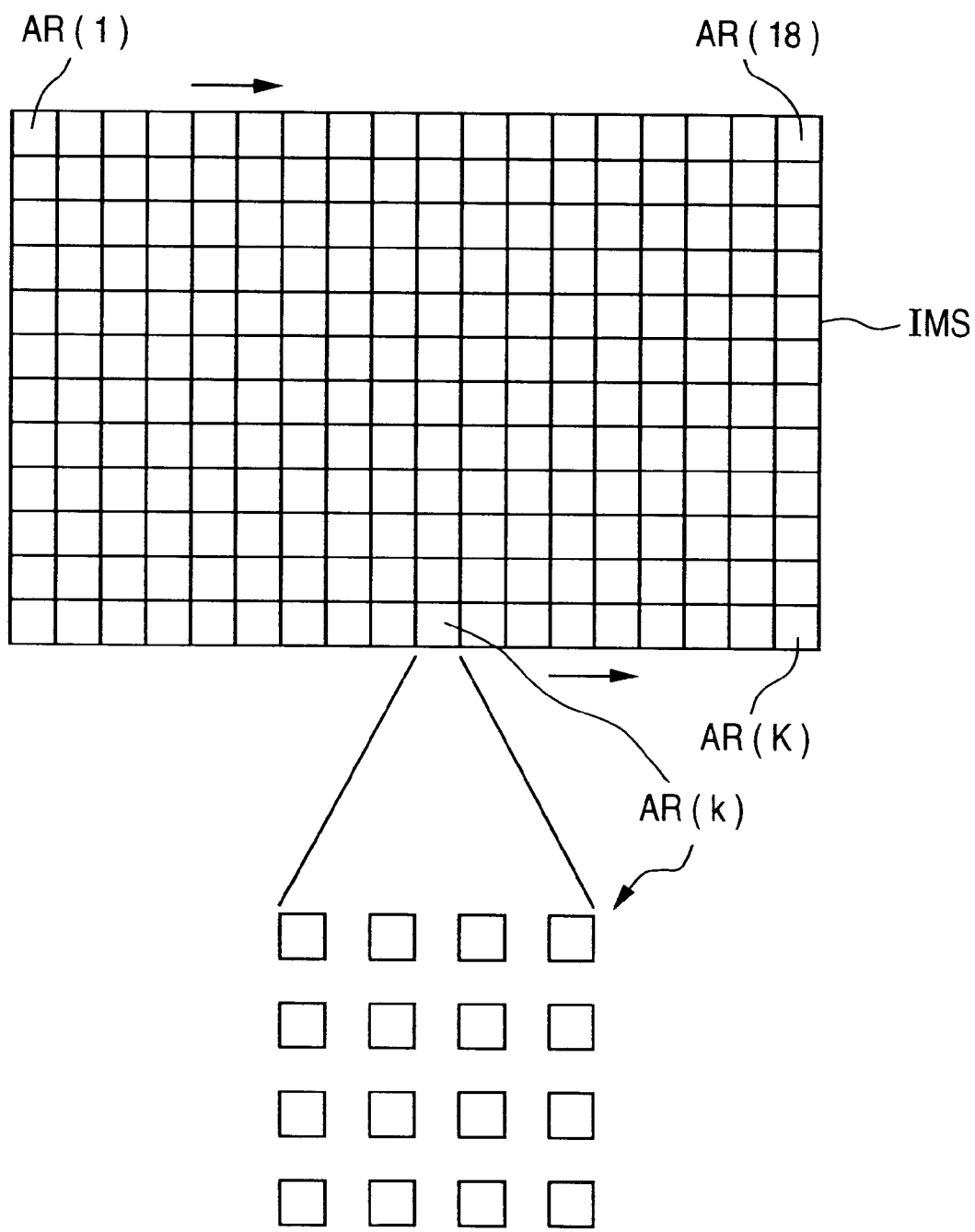
FIG. 43 is an explanatory view of divided areas of a photo-sensing surface of the image sensing device.

FIG. 43 is a view for explaining method for dividing the photo-sensing surface of the image sensing device IMS in order to detect partial blurring due to movement of an object as described above. In FIG. 43, the photo-sensing surface is divided into a plurality of small areas AR(k) of, e.g., 216 (=18×12) (k=1 to K, K=216). Each divided area AR(k) consists of a plurality of pixels. On each divided area AR(k), correlation and blurring amounts are calculated in such a manner as explained in the eighth embodiment with reference to FIGS. 26A to 32. Then, if blurring amounts in all of the respective divided areas AR(k) are near zero, then it is determined that neither blurring due to vibration nor blurring due to movement of the object occurred. If blurring amounts in all of the respective divided areas AR(k) have almost the same value which is over a predetermined value, then it is determined that blurring due to vibration occurred. Further, if blurring amounts are large in specific divided areas, then it is determined that blurring due to movement of the object occurred.

Figure 44:
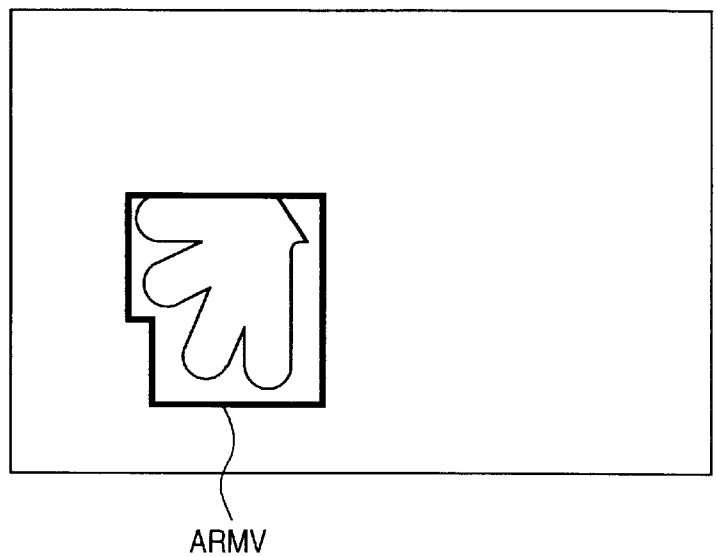
FIG. 44 is an explanatory view showing a determined result of blurring due to movement of the object.

FIG. 44 is an explanatory view showing a determined result of blurring due to movement of the object performed on the basis of a plurality of images of the object, which is shown in FIG. 41, sensed while performing pixel shifting operation. In FIG. 44, an area ARMV, including the moving arm and enclosed by a solid line, has large blurring amounts.

Figure 45:
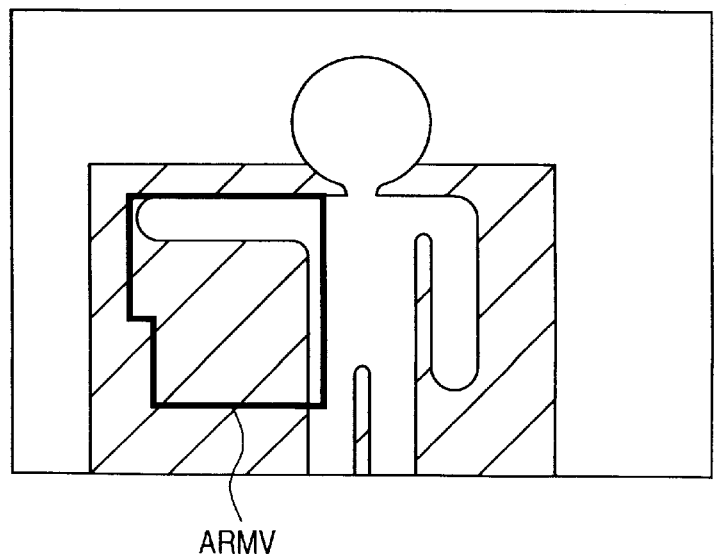
FIG. 45 shows an image obtained by synthesizing a plurality of images according to the eleventh embodiment of the present invention.

FIG. 45 shows an image obtained by synthesizing the plurality of images sensed in pixel shifting operation in accordance with the detected result of blurring. Referring to FIG. 45, the area outside of the area ARMV (same as that shown in FIG. 44) is obtained by synthesizing the image signals of four images obtained in pixel shifting operation to generate a high-resolution image. Whereas, image signals of the first image, out of the four images, is used for reproducing the area ARMV. As a result, the resolution of the image inside of the area ARMV is not improved, however, the undesired effect caused by exposing the moving object a plurality of times is prevented, as well as the resolution of the image in the area outside of the area ARMV is improved.

As for method for generating a single high-resolution image by synthesizing a plurality of images obtained while performing pixel shifting operation is basically the same as that explained in the first embodiment with reference to FIGS. 9A to 10E using equations (7) to (10).

The above image synthesis method is for a case where no blurring due to vibration nor movement of an object occurs and resolution of the synthesized image can be improved in whole area. In the eleventh embodiment, blurring detection and image synthesis are performed by each small area AR(k) of the photo-sensing surface of the image sensing device IMS, therefore, the image synthesis using the equations (7) to (10) is also performed by each small area AR(k). Then, in a small area where blurring due to movement of an object occurs, the image is reproduced on the basis of one of the four images instead of synthesizing the four images. In this case, instead of the equations (7) to (10), the following equations are used.

$$\text{IMG } (u = 2i - 1, v = 2j) \leftarrow IG1 (i, j) \quad \ldots (37)$$
$$\text{IMG } (u = 2i - 1, v = 2j - 1) \leftarrow IG1 (i, j) \quad \ldots (38)$$
$$\text{IMG } (u = 2i, v = 2j - 1) \leftarrow IG1 (i, j) \quad \ldots (39)$$
$$\text{IMG } (u = 2i, v = 2j) \leftarrow IG1 (i, j) \quad \ldots (40)$$

More specifically, in an area of a synthesized image where blurring is not found and the image synthesis is performed on the basis of the equations (7) to (10), the quantity of information on the area as well as the number of pixels configuring the area is four times greater than each of the four images. Whereas, in an area of the synthesized image where blurring due to movement of the object occurred and a corresponding image portion is reproduced on the basis of the equations (37) to (40), the number of pixels configuring the area is also four times greater than each of the four images, however, the quantity of information is the same as that of each of the four images. More specifically, the resolution of the image is the same as that of each of the four images.

Note, the aforesaid image synthesis method is used when image signals are obtained from a black-and-white image sensing device and a multiple-CCD type color image sensing device using a color separation prism. When image signals are obtained from a single CCD type color image sensing device covered with a mosaic color filter, although there are little differences in pixel shifting amount in the pixel shifting operation and the image synthesis method, the basic ideas of the pixel shifting operation and the image synthesis are the same.

Figure 46:
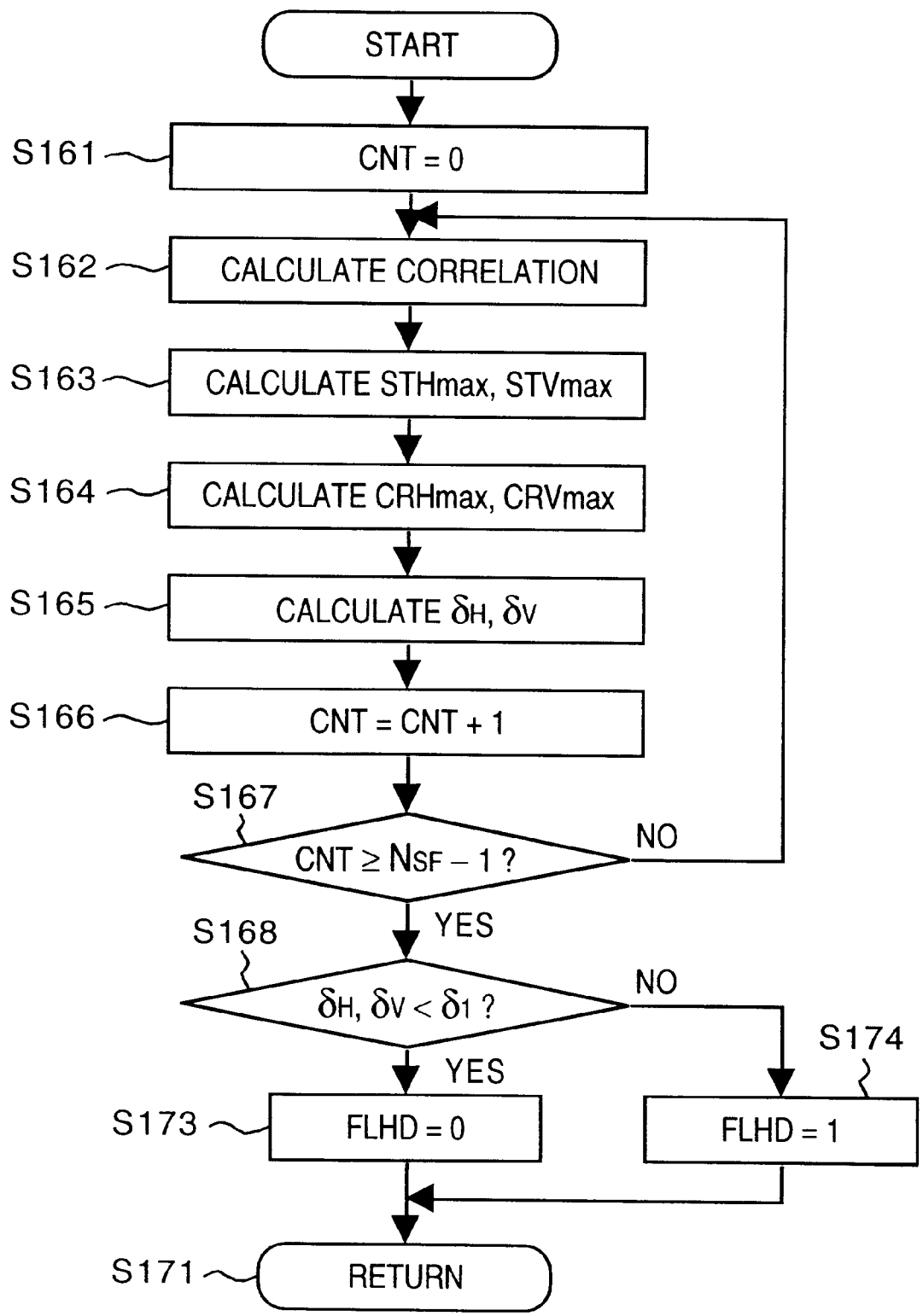
FIG. 46 is a flowchart of blurring determination processing due to vibration performed in the processing shown in FIG. 40.

FIG. 46 is a flowchart of determination processing on blurring due to vibration, as explained with reference to FIGS. 26A to 32 and 9A to 10E, performed during pixel shifting operation. This processing corresponds to the process performed in step S126 in FIG. 40.

First in step S161, a counter CNT for counting the number of image formation positions is initialized to 0.

In step S162, correlation between the first and second image signals are calculated on the basis of the equation (30). The process proceeds to step S163 where the maximum shift amounts in the horizontal and vertical directions, STHmax and STVmax, are calculated on the basis of the result of the correlation calculated in step S162.

Thereafter, in step S164, the maximum correlation in the horizontal and vertical directions, CRHmax and CRVmax are calculated. Further, in step S165, the blurring amounts in the horizontal and vertical directions, $\delta_H$ and $\delta_V$, are calculated.

In step S166, the counter CNT is increased by 1, and in step S167, the value of the counter CNT and the predetermined value $N_{SF}$ indicating the number of image formation positions are compared. For example, if $N_{SF}$ is 4, calculations performed in steps S162 to S165 are performed three times between the first and second image signals, the second and third image signals, and the third and fourth image signals. Therefore, if CNT is less than $N_{SF}-1$, then the process returns to step S162, and the processes in steps S162 to S166 are performed on the next pair of image signals. When the CNT reaches $N_{SF}-1$, the process proceeds to step S168.

In step S168, the respective blurring amounts $\delta_H$ and $\delta_V$ which are calculated in step S165 are compared to a predetermined value $\delta_1$. If both of the blurring amounts $\delta_H$ and $\delta_V$ are less than the predetermined value $\delta_1$, it is determined that the blurring due to vibration is almost nil, and a flag FLHD for indicating whether or not blurring due to vibration occurred (referred to as "vibration flag FLHD" hereinafter) is set to 0.

Whereas, if it is determined in step S168 that at least one of the blurring amounts $\delta_H$ and $\delta_V$ is equal or greater than the predetermined value $\delta_1$, then the process goes to step S174 where the vibration flag FLHD is set to 1.

After a process in either step S173 or S174 is performed, the process proceeds to step S171 where the process returns to the processing in FIG. 40.

Blurring due to vibration is determined as described above.

Figure 47:
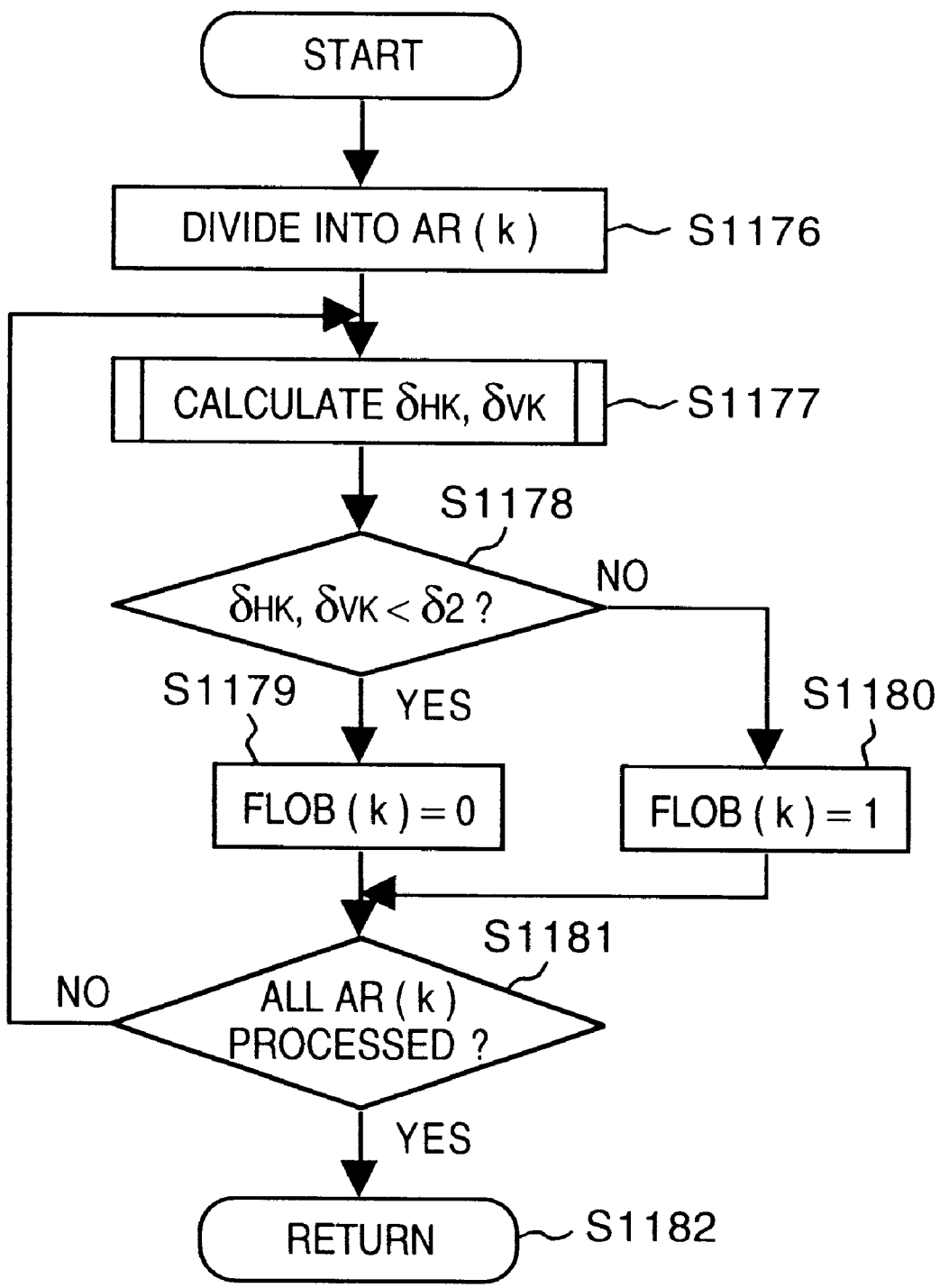
FIG. 47 is a flowchart of blurring determination processing due to movement of the object performed in the processing shown in FIG. 40.

FIG. 47 is a flowchart of blurring determination processing due to movement of the object occurred while performing pixel shifting operation, explained with reference to FIGS. 43 and 44, and the blurring determination processing corresponds to step S127 in FIG. 40.

First in step S1176, the photo-sensing surface of the image sensing device IMS is divided into the K number of small areas AR(k) as shown in FIG. 43.

In step S1177, blurring amounts, $\delta_{HK}$ and $\delta_{VK}$ are calculated for each of the divided areas AR(k). More specifically, the processes in steps S161 to S167 are repeatedly performed on the respective divided areas AR(k), thereby blurring amounts in the horizontal and vertical directions $\delta_{HK}$ and $\delta_{VK}$ are calculated for each of the divided areas AR(k).

In step S1178, the blurring amounts $\delta_{HK}$ and $\delta_{VK}$ calculated in step S1177 are compared to a predetermined value $\delta_2$. If both of the blurring amounts $\delta_{HK}$ and $\delta_{VK}$ are smaller than the predetermined value $\delta_2$, then it is determined that the blurring due to movement of the object in the divided area is almost nil. Thereafter, the process proceeds to step S1179 where a flag FLOB(k) indicating occurrence of blurring due to movement of the object (referred to as "movement flag FLOB" hereinafter) is set to 0.

Whereas, if at least one of the blurring amounts $\delta_{HK}$ and $\delta_{VK}$ is greater than the predetermined value $\delta_2$, in step S1178, then the process proceeds to step S1180, where the movement flag FLOB(k) is set to 1.

In step S1181, whether or not the processes in steps S1177 to S1180 have been performed on all the divided areas AR(k) is determined. If not, the process returns to step S1177 where the processes in steps S1177 to S1180 are performed on the unprocessed divided area. Whereas, if it is determined in step S1181 that the processes in steps S1177 to S1180 are performed on all the divided areas AR(k), then the process proceeds to step S1182 where the process returns to the processing shown in FIG. 40.

In the aforesaid manner, blurring due to movement of the object in each divided area is determined.

Figure 48:
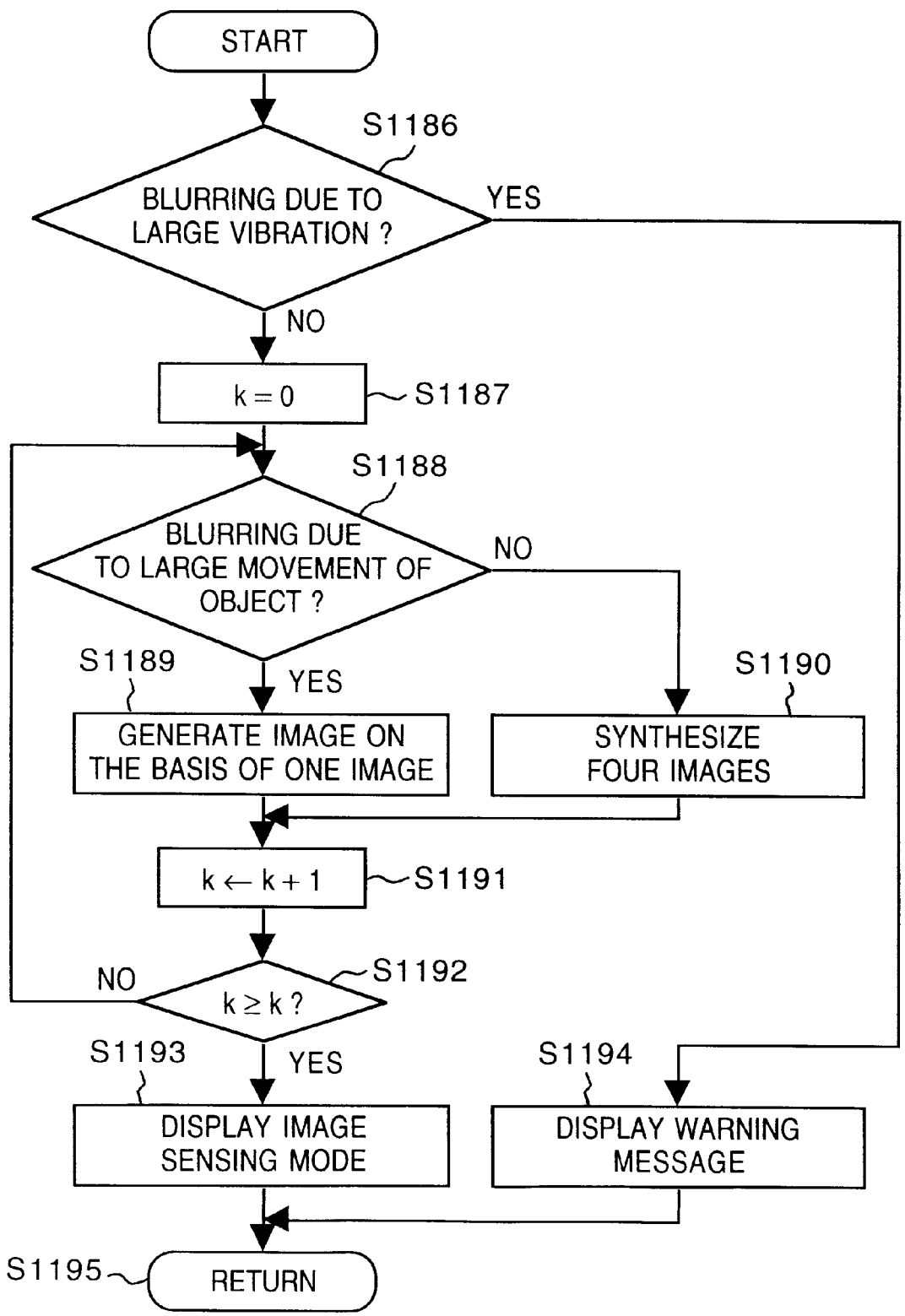
FIG. 48 is a flowchart of image synthesis processing according to the eleventh embodiment.

FIG. 48 is a flowchart of the image synthesis processing explained with reference to FIGS. 45 and 9A to 10E. This processing is a subroutine corresponding to the process in step S128 in FIG. 40.

First in step S1186, whether or not there is blurring due to vibration between the plurality of images sensed in pixel shifting operation is determined. More specifically, the status of the vibration flag FLHD which is set either in step S173 or S174 in FIG. 46 is checked. If the status of the vibration flag FLHD is 1, which shows that the blurring is large, then the process moves to step S1194 where a warning message is displayed. Thereafter, the process returns to the main processing in step S1195.

If it is determined in step S1186 that the vibration flag FLHD is 0, namely, if it is determined that blurring due to vibration is small, then the process proceeds to step S1187.

In step S1187, in order to determine blurring due to movement of the object for each small area AR(k) divided as shown in FIG. 43, an independent variable k is reset to 0.

In step S1188, blurring due to movement of the object in each divided area AR(k) is evaluated. More specifically, the status of the movement flag FLOB(k) set in either step S1179 or step S1180 in FIG. 47 is checked. If the movement flag FLOB(k) is 1, which indicates that blurring is large, then the process proceeds to step S1189, where an image in the corresponding divided area AR(k) is reproduced by using one of the plurality of images using the equations (37) to (40).

Whereas, if it is determined in step S1188 that the movement flag FLOB(k) is 0, which shows that the blurring is small, then the process proceeds to step S1190, and image synthesis using the four images is performed using the equations (7) to (10).

After the process in step S1189 or S1190 is performed, the process proceeds to step S1191, where the independent variable k is increased by 1.

In step S1192, whether or not the independent variable k reaches the number of division K of the divided areas AR(k) is determined. If k is less than K, then the process returns to step S1188 and determination of blurring due to movement of the object is repeatedly performed, and when k reaches K, the process proceeds to step S1193.

In step S1193, the contents of the image synthesis mode performed in either step S1189 or S1190 is displayed on the display DISP to notify the user of which image synthesis is performed. In step S1195, the process returns to the main processing shown in FIG. 40.

In the aforesaid processing, when the vibration is large, even though a plurality of images have been obtained by performing pixel shifting operation, image synthesis of the obtained images is not performed. Further, when the blurring due to movement of an object is large in a particular area, synthesis of a plurality of images is not performed for reproducing an image in the area, whereas, an area where blurring did not occur is reproduced by synthesizing the plurality of images for increasing resolution. Furthermore, if neither blurring due to vibration nor blurring due to movement of an object occurs in the entire image, then the entire image is reproduced by synthesizing the plurality of images in order to increase the resolution.

According to the eleventh embodiment as described above, (1) Blurring due to movement of an object is extracted on the basis of correlation between a plurality of images obtained while performing pixel shifting operation, and method for reproducing each of a plurality of divided areas of a final image is changed in accordance with the degree of blurring. Accordingly, it is possible to prevent an unnatural image, caused by movement of the object, from being generated, as well as it is possible to obtain an image of high resolution as a result of pixel shifting operation.

(2) Only the area or areas where blurring due to movement of an object are reproduced using one of a plurality of images, instead of synthesizing the plurality of images. Accordingly, although the resolution in the aforesaid area or areas of an image is not increased, an image portion in the area or areas is expressed as if it is stationary. At the same time, it is possible to reproduce the other area or areas in high resolution.

(3) The type of image synthesis of a plurality of images which are obtained by performing pixel shifting operation is displayed on display means to notify the user, the user is able to check the resolution of the obtained image as well as how the moving object is reproduced. Accordingly, it is possible for the user to designate to resense an image, for example, if an undesired image is obtained.

(4) Since the camera has an optical image stabilization means, it is possible to reduce deterioration of an image due to vibration when performing pixel shifting operation.

Twelfth Embodiment

In the eleventh embodiment, the area where blurring due to movement of an object occurred is reproduced using one of a plurality of images instead of synthesizing the plurality of images, thereby expressing the area as if an object in the area is not moving. In the twelfth embodiment, process to connect between the plurality of images is performed in the area where blurring due to movement of the object, thereby expressing the movement of the object.

Figure 49:
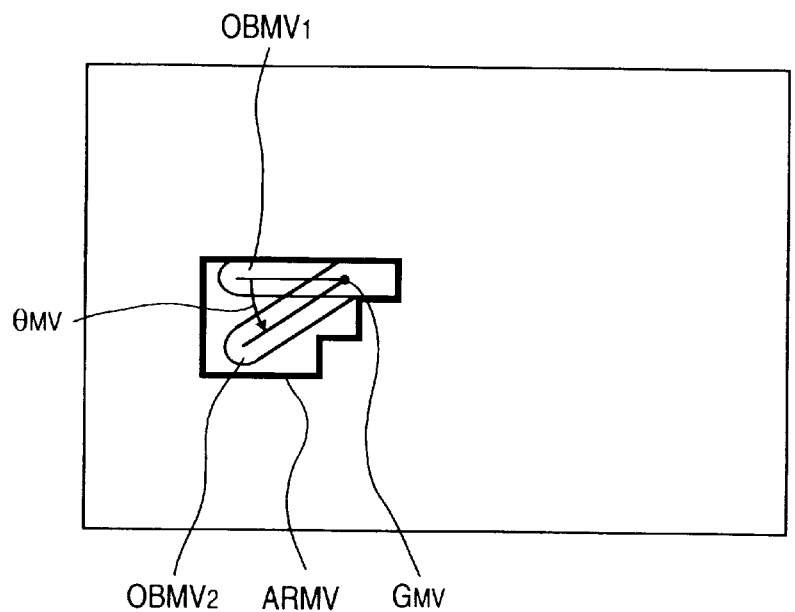
FIG. 49 is a view for explaining image synthesis method according to a twelfth embodiment.
Figure 50:
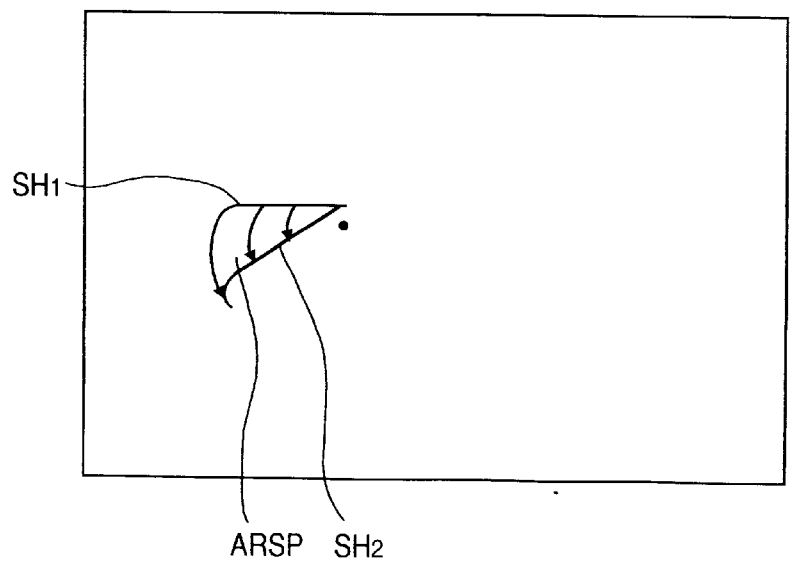
FIG. 50 is a view for explaining image synthesis method according to the twelfth embodiment.
Figure 51:
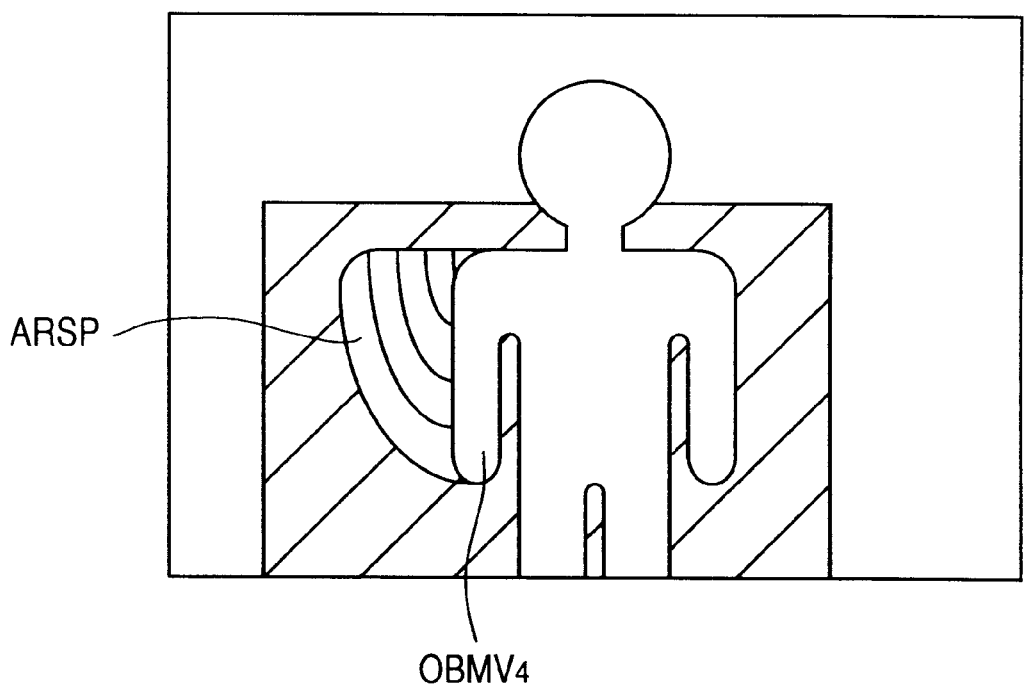
FIG. 51 is a view for explaining image synthesis method according to the twelfth embodiment.
Figure 52:
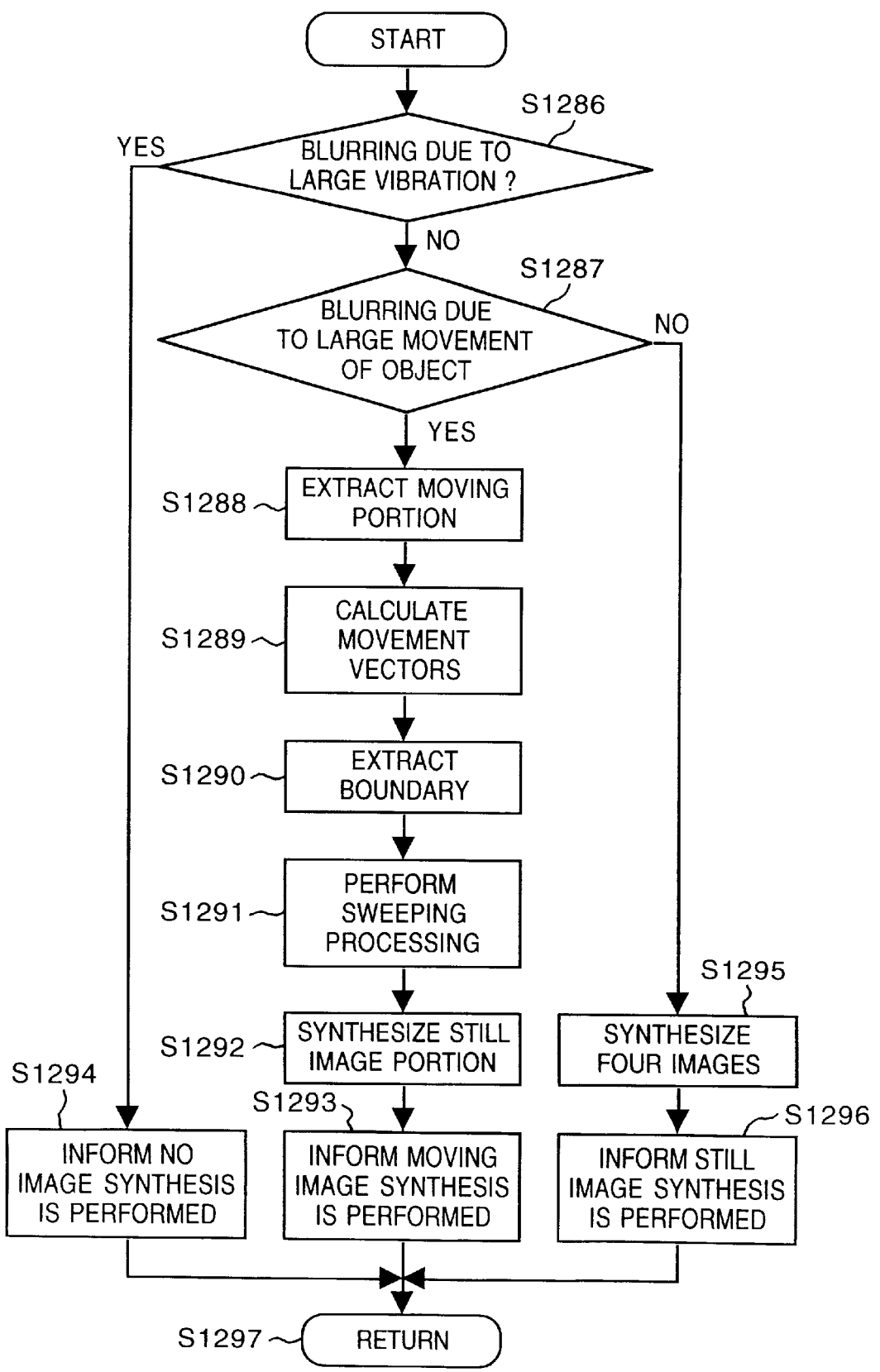
FIG. 52 is a flowchart of control processing in the camera main body according to the twelfth embodiment of the present invention.

FIGS. 49 to 51 are views for explaining image synthesis method according to the twelfth embodiment, and FIG. 52 is a flowchart of control processing performed by the microcomputer CCPU of the camera main body CMR. Below, the twelfth embodiment will be explained with reference to FIGS. 49 to 52.

As explained with reference to FIG. 41, when the object whose part is moving is sensed while performing pixel shifting operation, images each of which can be basically classified into two different types of areas are obtained: the area of one type shows the moving portion of the object and large shift is observed in the area between the plurality of images; and the area of the other shows a still image and slight shift due to pixel shifting operation is observed in this area. Correlation between a first image and a second image is calculated, and an area where blurring due to movement of the object is determined and extracted. The determined area is shown as an area ARMV surrounded by a bold line in FIG. 49.

Next, correlation between images within the area ARMV is calculated again, and an area corresponding to the moving portion of the object is extracted. As a result, it is determined that the moving portion in the first image is in the area $OBMV_1$, and the moving portion of the second image is the area $OBMV_2$.

Thereafter, movement vectors between these areas $OBMV_1$ and $OBMV_2$ of the first and second images are determined. When calculating correlation between the two images at this time, the shifted amounts between the two images not only in the linear directions but also in the rotational direction are taken into consideration to calculate correlation. Accordingly, movement between the first and second images, including angular component, is determined. Referring to FIG. 49, it is determined that the moving portion in the images is rotating by an angle $\theta_{MV}$ about a point $G_{MV}$.

FIG. 50 is a view for explaining sweeping processing between the moving portions of the two images on the basis of the movement vectors. Referring to FIG. 49, a reference line of the first moving area $OBMV_1$ at the start points of the movement vectors is extracted. The extracted reference line is shown as a line $SH_1$ (first reference line) in FIG. 50. Next, a reference line of the second moving area $OBMV_2$ at the start points of the movement vectors is extracted, and this reference line is expressed by a line $SH_2$ (second reference line) in FIG. 50. Then the first reference line $SH_1$ is swept toward the second reference line $SH_2$ in accordance with the movement vectors while generating image signals between the first and second reference line lines $SH_1$ and $SH_2$. When pixels between the first and second reference line lines $SH_1$ and $SH_2$ are filled, then the sweeping processing is finished.

The aforesaid sweeping processing is also performed between the second and third images, and between the third and fourth images. Further, an image of the moving portion in the fourth image ($MVOB_4$) is used for reproducing the final image. Meanwhile, images in areas where blurring due to movement of the object is not detected are reproduced by performing a normal image synthesis suitable for the performed pixel shifting operation.

FIG. 51 shows an example of the final image obtained by performing the aforesaid image synthesis processing. The area where blurring due to movement of an object is determined is expressed by a swept area ARSP and the moving portion $OBMV_4$ of the fourth image. In this manner, while expressing the movement of the object, the arm of the person is expressed as a clear image. Further, by using sweeping expression, it is possible to prevent the background image from being seen through the object.

FIG. 52 is a flowchart of control processing performed by the microcomputer CCPU of the camera main body CMR according to the twelfth embodiment of the present invention. Control processing of the camera main body CMR, processing for determining blurring due to vibration, processing for determining blurring due to movement of an object, and control processing of the lens LNS are the same as those explained in the eleventh and first embodiments with reference to FIGS. 40, 46, 47, and 7. A process in the twelfth embodiment which is different from the eleventh embodiment is the process in step S124 in FIG. 40 for synthesizing images. The processing performed in step S124, according to the twelfth embodiment, is shown in FIG. 52.

Referring to FIG. 52, first in step S1286, whether or not there is blurring due to vibration between the plurality of images sensed in pixel shifting operation is determined. More specifically, similarly to the eleventh embodiment, the status of the vibration flag FLHD which is set either in step S173 or S174 in FIG. 46 is checked. If the status of the vibration flag FLHD is 1, which shows that the blurring is large, then the process moves to step S1294 where a warning message indicative of image synthesis not being performed is displayed. Thereafter, the process returns to the main processing in step S1297.

If it is determined in step S1286 that the vibration flag FLHD is 0, namely, if it is determined that blurring due to vibration is small, then the process proceeds to step S1287.

In step S1287, where or not blurring due to movement of the object occurred is determined. More specifically, the statuses of the movement flags FLOB(k) set in either step S1179 or step S1180 in FIG. 47 for respective divided areas AR(k) are checked, thereby determining whether or not there is any area where blurring due to movement of the object occurred. If it is determined that there is no area where blurring due to movement of the object occurred, then the process goes to step S1295, where the four images obtained in pixel shifting operation are synthesized using the equations (7) to (10), thereby obtaining an image expressed in high resolution.

Thereafter, in step S1296, a message indicating that an image expressed in high resolution is obtained, or, "still image synthesis" is performed, is displayed on the display DISP. Then, the process proceeds to step S1297 where the process returns to the main processing.

Whereas, if it is determined in step S1287 that at least one divided area AR(k) where blurring due to movement of the object occurred, then the process proceeds to step S1288.

In step S1288, the moving portion of the object is extracted as described with reference to FIG. 49.

Thereafter in step S1289, movement vectors of the moving portion are calculated.

In step S1290, a reference line of the moving portion is extracted as described with reference to FIG. 50.

In step S1291, sweeping processing is performed on the moving portion in the area where blurring occurs on the basis the movement vectors. Further, at the end position of the sweeping, the moving portion of the fourth image is displayed.

Regarding the area where no blurring is detected, image synthesis using the equations (7) to (10) is performed in step S1292.

In step S1293, a message indicating that sweeping processing is performed on the area where blurring due to movement of the object occurred, or, "moving image synthesis" is performed, is displayed on the display DISP. Then, in step S1297, the process returns to the main processing.

According to the aforesaid image synthesis method, an area where large blurring due to movement of an object occurred is extracted, and the area is applied with sweeping processing. Accordingly, it is possible to express motion of a moving portion of the object while reproducing an area where no blurring due to movement of object did not occur in high resolution by synthesizing a plurality of images.

According to the twelfth embodiment as described above, in addition to the advantages (1), (3) and (4) of the eleventh embodiment, (5) Since motion of a moving portion of a plurality of images, obtained while performing pixel shifting operation, is reproduced by performing sweeping processing as well as the moving portion is displayed as a clear image using the last image of the plurality of images, it is possible to naturally express a moving object, such as a moving person and a moving car, as well as a non-moving portion of the plurality of images is reproduced as a high-precision image by synthesizing the plurality of images.

Thirteenth Embodiment

In the twelfth embodiment, the gap between moving portions of an object in the plurality of images is filled by performing sweeping processing, further, the moving portion itself is displayed as a clear image using an image among the plurality of images which is sensed last. Accordingly, while the clear image of the moving portion is displayed, motion of the moving portion is expressed. In the thirteenth embodiment as described below, the moving portion is completely expressed by sweep lines, which are generated while performing sweeping processing. This method is suitable for synthesizing images obtained by so-called follow shot.

Figure 53:
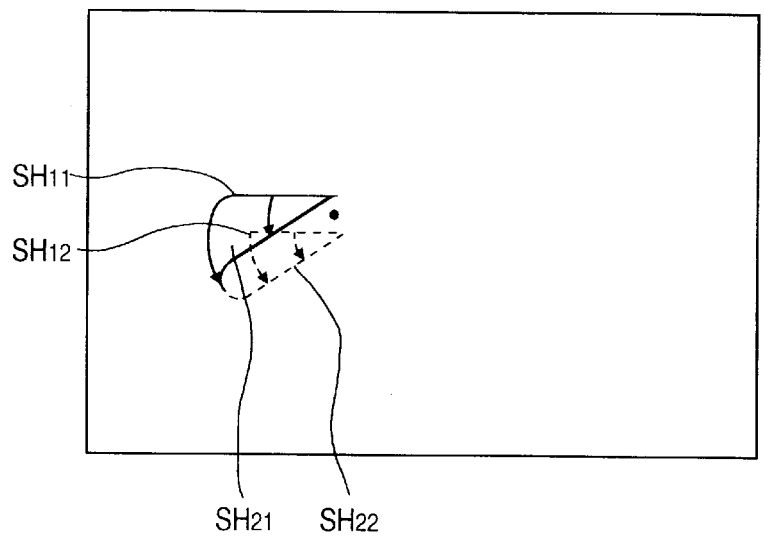
FIG. 53 is a view for explaining image synthesis method according to a thirteenth embodiment.
Figure 54:
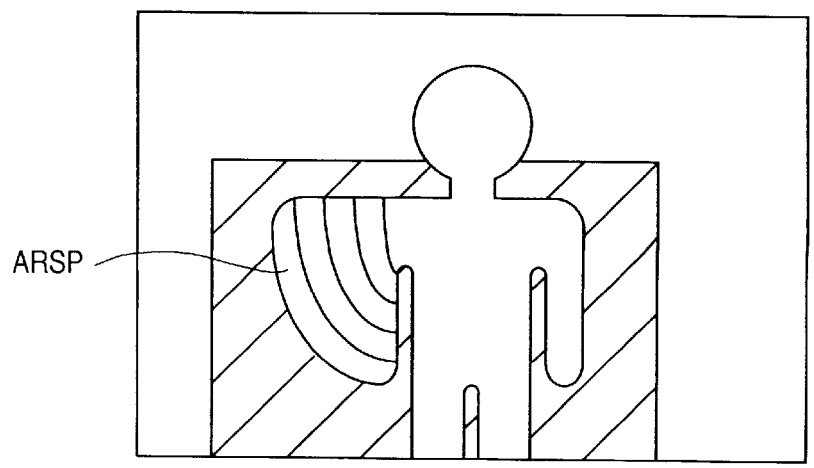
FIG. 54 is a view for explaining image synthesis method according to the thirteenth embodiment.
Figure 55:
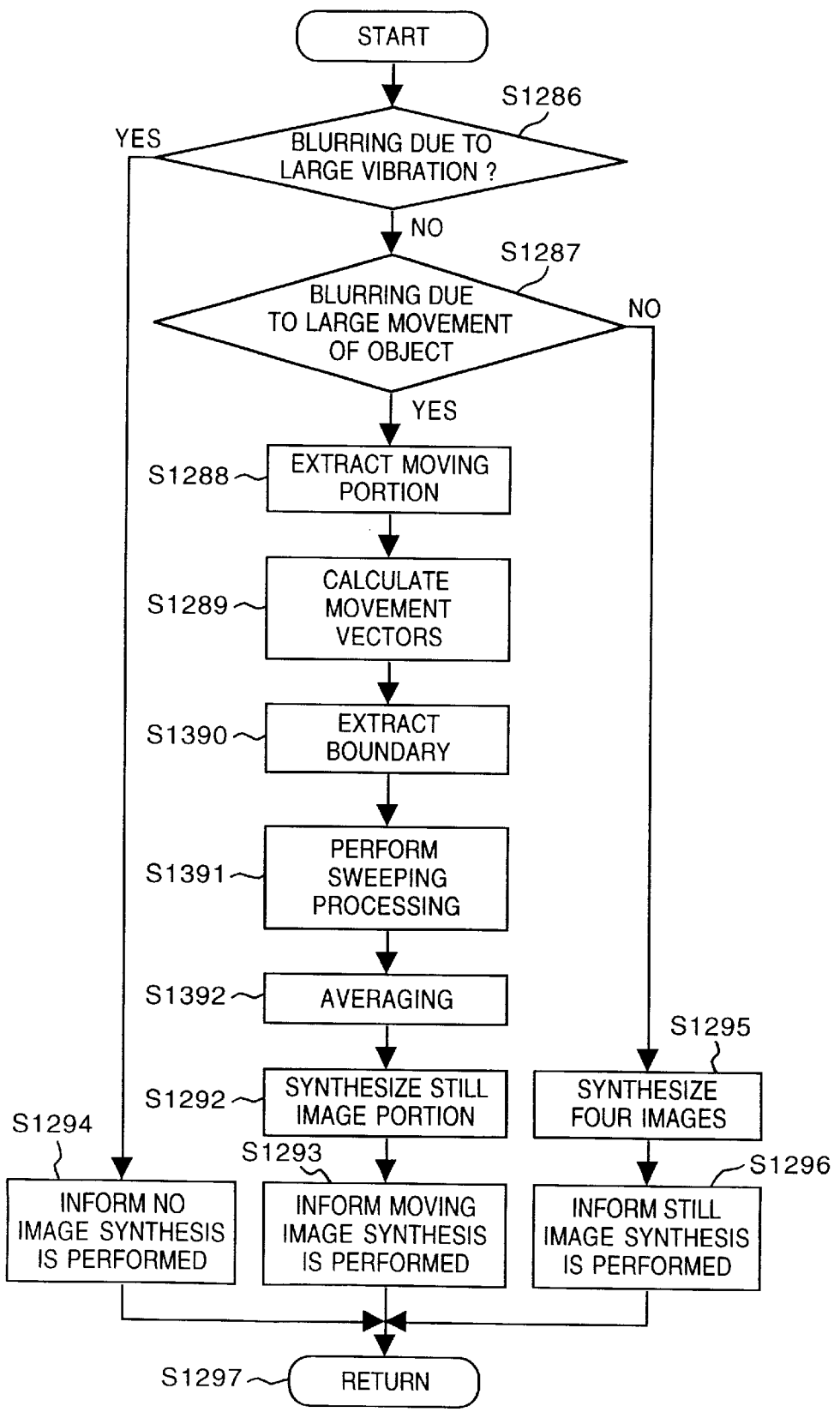
FIG. 55 is a flowchart of control processing in the camera main body according to the thirteenth embodiment of the present invention.

FIGS. 53 to 54 are views for explaining image synthesis method according to the thirteenth embodiment, and FIG. 55 is a flowchart of control processing performed by the microcomputer CCPU of the camera main body CMR. Below, the thirteenth embodiment will be explained with reference to FIGS. 53 to 55.

FIG. 53 corresponds to FIG. 50 explained in the twelfth embodiment, and shows a result of reference line extraction of a moving portion of the object which is extracted as described with reference to FIG. 49. In the twelfth embodiment, the reference line of the moving portion only at start points of movement vectors is extracted; whereas, in the thirteenth embodiment, reference lines of the moving portion both at start points of the movement vectors and the side of destination points of the movement vectors are extracted. More specifically, referring to FIG. 53, when performing sweeping processing on first and second images, four reference lines, namely, a reference line $SH_{11}$ of the moving portion in the first image at start points of the movement vectors, a reference line $SH_{12}$ of the moving portion in the first image at destination points of the movement vectors, a reference line $SH_{21}$ of the moving portion in the second image at start points of the movement vectors, and a reference line $SH_{22}$ of the moving portion in the second image at destination points of the movement vectors, are extracted.

Thereafter, the gap between the reference lines $SH_{11}$ and $SH_{21}$ is filled by performing sweeping processing as shown by solid arrows in FIG. 53, thus an image in the area between the reference lines $SH_{11}$ and $SH_{21}$ is generated. Likewise, the gap between the reference lines $SH_{12}$ and $SH_{22}$ is filled by performing sweeping processing as shown by broken arrows, thus an image in the area between the reference lines $SH_{12}$ and $SH_{22}$ is generated. The aforesaid sweeping processing is performed on the second and third images, and the third and fourth images. Thereafter, the image of the area between the reference lines $SH_{11}$ and $SH_{11}$ and the image of the area between the reference lines $SH_{12}$ and $SH_{22}$ are combined by averaging signal values of the images. Accordingly, the moving portion of the object is expressed as if it is continuously moving in the direction of movement vector throughout the area where blurring due to movement of the object occurred. As for the area where blurring due to movement of the object did not occur, similarly to the twelfth embodiment, a normal image synthesis suitable for the performed pixel shifting operation is performed to generate a high-resolution image.

FIG. 54 shows a final image obtained by performing image synthesis operation according to the thirteenth embodiment. The area where blurring due to movement of the object occurred is expressed by a swept area ARSP. In this area, the moving portion of the object is expressed as if it is continuously moving, which further enhances movement of the object comparing to the twelfth embodiment. In addition, by using sweeping expression, it is possible to prevent the background image from being seen through the object.

FIG. 55 is a flowchart of control processing performed by the microcomputer CCPU of the camera main body CMR according to the thirteenth embodiment of the present invention. The control processing of the thirteenth embodiment is almost the same as that shown in FIG. 52 explained in the twelfth embodiment except processes in step S1390 to S1392, therefore, these processes are only explained below.

The process in step S1290 for extracting reference lines and the process in step S1291 for performing sweeping processing in the image synthesis processing shown in FIG. 52 explained in the twelfth embodiment are replaced by a process in step S1390 for extracting reference lines and a process in step S1391 for performing sweeping processing according to the thirteenth embodiment in the image synthesis processing shown in FIG. 55, further, a process in step S1392 for averaging signal values of images is added. Details follow.

In the process in step S1390 for extracting reference lines, reference lines of the moving portion at both the start and destination points of the movement vectors are extracted.

In step S1391, the sweeping processing is performed on the areas between the reference lines at the start points of the movement vectors and between the reference lines at the destination points of the movement vectors.

Then, in step S1392, the two image portions, obtained by performing the sweeping processing, between the two sets of reference lines are combined by averaging signal values of the two image portions.

Note, the processes in steps S1390 to S1392 are performed on every pair of successive images.

According to the aforesaid image synthesis method, an area where large blurring due to movement of an object occurred is extracted, and the area is applied with sweeping processing. Accordingly, it is possible to express motion of a moving portion of the object while reproducing an area where no blurring due to movement of object did not occur in high resolution by synthesizing a plurality of images.

According to the thirteenth embodiment as described above, in addition to the advantages (1), (3) and (4) of the eleventh embodiment, (6) Since motion of a moving portion in a plurality of images, obtained while performing pixel shifting operation, is reproduced by performing sweeping processing, it is possible to naturally express a moving object, such as a moving person and a moving car, as well as a non-moving portion of the plurality of images is reproduced as a high-precision image by synthesizing the plurality of images. Especially, the image synthesis method of the thirteenth embodiment is suitable when the plurality of images are obtained in so-called follow shot, a method for sensing a moving object by following it while letting the background flow.

Fourteenth Embodiment

In the eleventh to thirteenth embodiments, the camera automatically selects image synthesis method in accordance with the states of blurring in images due to vibration and movement of an object. In the fourteenth embodiment, after the camera senses a plurality of images by performing pixel shifting operation, the user selects a desired image synthesis method.

In the fourteenth embodiment, a predetermined program is selected using an image synthesis mode selection switch SWCMP and executed in response to an operation of an image synthesis start switch SWST, where both the switches are shown in FIG. 1.

The image synthesis mode selection switch SWCMP switches between a plurality of positions connected to the microcomputer CCPU, e.g., four positions, and the user sets the switch SWCMP to one of the positions so as to select a desired image synthesis mode.

The image synthesis start switch SWST is a pushbotton switch which is also connected to the microcomputer CCPU, and when the switch SWST is pressed by the user, image synthesis conforming to the image synthesis mode selected by the image synthesis selection switch SWCMP starts.

Figure 56:
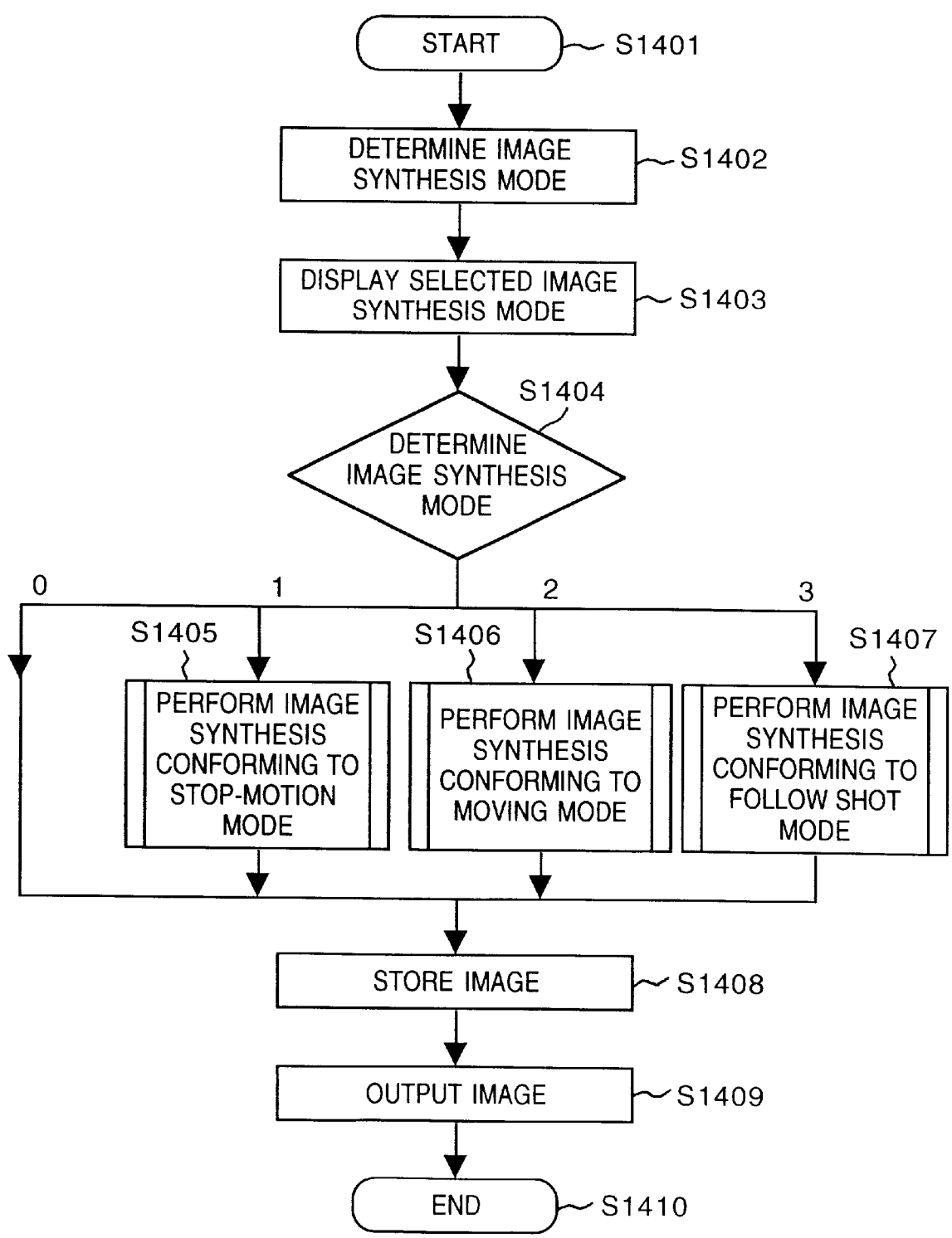
FIG. 56 is a flowchart of control processing in the camera main body according to a fourteenth embodiment of the present invention.

FIG. 56 is a flowchart of control processing performed by the microcomputer CCPU of the camera main body CMR according to the fourteenth embodiment of the present invention. The processing according to the fourteenth embodiment is explained below with reference to FIG. 56.

After images of an object is sensed while performing pixel shifting operation, as explained in the aforesaid embodiments, the image synthesis start switch SWST is turned on. In turn, in step S1401, the image synthesis starts.

In step S1402, the status of the image synthesis mode selection switch SWCMP is determined, thereby the selected image synthesis mode is recognized.

Thereafter, in step S1403, the selected image synthesis mode is displayed on the display DISP.

In step S1404, the image synthesis processing corresponding to the selected image synthesis mode is determined. If it is determined in step S1404 that a mode which does not perform image synthesis of the plurality of images (indicated by the number "0") is selected, then the image synthesis is not performed, and the process proceeds to step S1408 where the respective images or one of the images is stored without being processed in the memory MEM.

If it is determined in step S1404 that "stop-motion mode" (indicated by the number "1") is selected, then the process proceeds to step S1405 where the processing explained in the eleventh embodiment with reference to FIGS. 47 and 48 is performed, thereby an image as shown in FIG. 45 is reproduced. Thereafter, in step S1408, the synthesized image is stored in the memory MEM.

If it is determined in step S1404 that "moving mode" (indicated by the number "2") is selected, then the process proceeds to step S1406 where the processing explained in the twelfth embodiment with reference to FIG. 52 is performed, thereby an image as shown in FIG. 51 is reproduced. Thereafter, in step S1408, the synthesized image is stored in the memory MEM.

If it is determined in step S1404 that "follow shot mode" (indicated by the number "3") is selected, then the process proceeds to step S1407 where the processing explained in the thirteenth embodiment with reference to FIG. 55 is performed, thereby an image as shown in FIG. 54 is reproduced. Thereafter, in step S1408, the synthesized image is stored in the memory MEM.

As described above, image synthesis corresponding to the selected image synthesis mode is performed, and the obtained image is stored. Thereafter, the obtained image signals are transmitted to an external computer or a printer via the connector CNC in step S1409. In step S1410, the image synthesis and output processes are completed.

According to the fourteenth embodiment as described above, (7) After a plurality of images are obtained while performing pixel shifting operation, a synthesized image is obtained by performing one of different image synthesis methods in response to an image synthesis instruction operation which is performed independently of the image sensing processing. Accordingly, image synthesis mode is selected after the plurality of images are obtained; therefore, it is unnecessary to select image synthesis mode to be used when taking a photograph. Thus, possibility to lose a shutter change is reduced, and a desired image synthesis method can be selected after finishing image sensing operation.

(8) By repeating the image synthesis operation by using different image synthesis modes, it is possible to obtain differently expressed images using the same set of images. Thus, it is possible to save memory area for storing images as well as the sensed images can be used for generating images of different expressions.

Modifications

The above eleventh to fourteenth embodiments can be applied to an image sensing apparatus which senses a plurality of images in a predetermined period and synthesizes the sensed images for purposes other than pixel shifting operation. For example, by applying the eleventh to fourteenth embodiments to an image sensing apparatus which senses a plurality of images while changing luminous exposure and synthesizes the plurality of images in order to widen the dynamic range of a synthesized image, it is possible to obtain an image of a wide dynamic range without being affected by vibration.

Further, in a case where an interline scanning type CCD, which has been developed for sensing a moving image, is used in the image sensing apparatus, a frame image of high resolution is obtained by combining two field images sensed at different times. When the eleventh to fourteenth embodiments are applied to such the image sensing apparatus, it is possible to prevent blurring due to movement of the object from occurring in the two field images, therefore, it is possible to obtain a high-quality image.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:

image sensing means for converting an optical image into electric signals and outputting the electric signals as image signals;

shifting means for shifting an image formation position of the optical image formed on said image sensing means to a plurality of different positions;

first vibration detection means for detecting vibration of the image sensing apparatus and outputting vibration information;

optical system state detection means for detecting a state of at least one of a zooming optical system and a focusing optical system, control means for controlling said shifting means on the basis of the vibration information outputted by said first vibration detection means, said control means comprises:

pixel shifting control data generation means for generating pixel shifting control data for controlling said shifting means in pixel shifting operation;

vibration compensation data generation means for generating vibration compensation data for compensating the vibration on the basis of the vibration information outputted by said first vibration detection means;

control data synthesis means for synthesizing the pixel shifting control data and the vibration compensation data to generate a control signal for controlling said shifting means;

data correction means for correcting at least one of the pixel shifting control data and the vibration compensation data in accordance with the state detected by said optical state detection means;

image signal synthesis means for synthesizing image signals of a plurality of images outputted by said image sensing means to generate a single image; and storage means for storing first correction data for correcting the pixel shifting control data and second correction data for correcting the vibration compensation data, wherein said image sensing means converts the optical image into electric signals at each of the plurality of different image formation positions shifted by said shifting means and said data correction means reads at least one of the first and second correction data, corresponding to the state detected by said optical state detection means, stored in said storage means, and calculates the pixel shifting control data or the vibration compensation data on the basis of at least one of the read first and second data.

2. The image sensing apparatus according to claim 1, wherein said shifting means is a movable optical means.

3. The image sensing apparatus according to claim 1, wherein said shifting means is a plane parallel plate.

4. The image sensing apparatus according to claim 1, wherein said shifting means is a variable apical angle prism.

5. The image sensing apparatus according to claim 1, wherein said control means comprises change-over means for changing between a plurality of pixel shifting modes, and pixel shifting control data generation means for generating pixel shifting control data for controlling said shifting means in pixel shifting operation, wherein said change-over means changes the pixel shifting modes on the basis of the vibration information outputted by said first vibration detection means.

6. The image sensing apparatus according to claim 5, wherein the pixel shifting modes indicate number of the image formation positions to be shifted in pixel shifting operation, and said change-over means selects a first number of image formation positions when a degree of vibration indicated by the vibration information is equal or less than a first predetermined value; and selects a second number of image formation positions which is smaller than the first number when the degree of vibration is larger than the first predetermined value.

7. The image sensing apparatus according to claim 6, wherein said change-over means selects a third number of image formation positions which is smaller than the second number when the degree of vibration is larger than the second predetermined value which is larger than the first predetermined value.

8. The image sensing apparatus according to claim 5, further comprising optical system state detection means for detecting a state of at least one of a zooming optical system and a focusing optical system, wherein said control means further comprises data correction means for correcting the pixel shifting control data in accordance with the state detected by said optical state detection means.

9. The image sensing apparatus according to claim 8 further comprising storage means for storing correction data for correcting the pixel shifting control data, wherein said data correction means reads the correction data, corresponding to the state detected by said optical state detection means, stored in said storage means, and corrects the pixel shifting control data on the basis of the read correction data.

10. The image sensing apparatus according to claim 1, wherein said control means comprises change-over means for changing between a plurality of pixel shifting modes, and pixel shifting control data generation means for generating pixel shifting control data for controlling said shifting means in pixel shifting operation, wherein said change-over means changes between the pixel shifting modes in accordance with a user designation.

11. The image sensing apparatus according to claim 10 further comprising optical system state detection means for detecting a state of at least one of a zooming optical system and a focusing optical system, wherein said control means further comprises data correction means for correcting the pixel shifting control data in accordance with the state detected by said optical state detection means.

12. The image sensing apparatus according to claim 11 further comprising storage means for storing correction data for correcting the pixel shifting control data, wherein said data correction means reads the correction data, corresponding to the state detected by said optical state detection means, stored in said storage means, and corrects the pixel shifting control data on the basis of the read correction data.

13. The image sensing apparatus according to claim 1 further comprising second vibration detection means for detecting blurring in an image on the basis of the image signals outputted by said image sensing means and outputting blurring information, wherein said control means controls said shifting means on the basis of the vibration information outputted by said first vibration detection means and the blurring information outputted by said second vibration detection means.

14. The image sensing apparatus according to claim 13, wherein said first vibration detection means is a vibration-type gyro and said second vibration detection means is movement vector detection means.

15. The image sensing apparatus according to claim 1 further comprising photometry means and luminous exposure adjustment means for determining a luminous exposure on the basis of a result of the photometry performed by said photometry means and controlling said image sensing means to use the determined luminous exposure.

16. The image sensing apparatus according to claim 15, wherein, when the image formation position is shifted by said shifting means, said luminous exposure adjustment means determines a different luminous exposure and controls said image sensing means to use the different luminous exposure.

17. The image sensing apparatus according to claim 16, wherein said photometry means performs photometry on each of a plurality of divided areas of an image sensed by said image sensing means.

18. The image sensing apparatus according to claim 17, further comprising main object determination means for determining a divided area which includes a main object among the plurality of divided areas, wherein said luminous exposure adjustment means controls said image sensing means to use a first luminous exposure which is suitable for the divided area including the main object, which is determined by said main object determination means, and to use at least one of second and third luminous exposures where the second luminous exposure is larger than the first luminous exposure and the third exposure is smaller than the first luminous exposure.

19. The image sensing apparatus according to claim 18, wherein said control means comprises change-over means for changing between a plurality of pixel shifting modes, and pixel shifting control data generation means for generating pixel shifting control data for controlling said shifting means in pixel shifting operation, wherein said change-over means changes the pixel shifting modes on the basis of the vibration information outputted by said first vibration detection means, and said luminous exposure adjustment means determines the luminous exposure to be used in said image sensing device on the basis of the pixel shifting mode selected by said change-over means.

20. The image sensing apparatus according to claim 19, wherein the pixel shifting modes indicate number of the image formation positions to be shifted in pixel shifting operation, and said change-over means selects a first number of image formation positions when a degree of vibration indicated by the vibration information is equal or less than a first predetermined value; selects a second number of image formation positions which is smaller than the first number when the degree of vibration is larger than the first predetermined value and equal or less than a second predetermined value which is larger than the first predetermined value; and selects a third number of image formation positions which is smaller than the second number when the degree of vibration is larger than the second predetermined value.

21. The image sensing apparatus according to claim 18, wherein said control means comprises change-over means for changing between a plurality of pixel shifting modes, and pixel shifting control data generation means for generating pixel shifting control data for controlling said shifting means in pixel shifting operation, wherein said change-over means changes between the pixel shifting modes in accordance with a user designation and said luminous exposure adjustment means determines the luminous exposure to be used in said image sensing device on the basis of the pixel shifting mode selected by said change-over means.

22. The image sensing apparatus according to claim 15, wherein said luminous exposure adjustment means adjusts the luminous exposure by changing exposure time.

23. The image sensing apparatus according to claim 15, wherein said luminous exposure adjustment means adjusts the luminous exposure by changing aperture of an iris diaphragm.

24. The image sensing apparatus according to claim 15, wherein said luminous exposure adjustment means adjusts the luminous exposure using an electrochromic element.

25. The image sensing apparatus according to claim 1 further comprising blurring detection means for detecting relative blurring amount between two images out of a plurality of images obtained at the plurality of image formation positions shifted by said shifting means by comparing image signals of the two images, and outputting the blurring amount.

26. The image sensing apparatus according to claim 25 wherein said blurring detection means detects the relative blurring amount by comparing the image signals of the two images which are obtained in series out of the plurality of images obtained at the plurality of image formation positions.

27. The image sensing apparatus according to claim 25, wherein said blurring detection means detects the relative blurring amount by comparing the image signals of the two images which are obtained at the same image formation position in series out of the plurality of images obtained at the plurality of image formation positions.

28. The image sensing apparatus according to claim 25 further comprising disabling means for disabling the image signal synthesis means in a case where the blurring amount detected by said blurring detection means is greater than a predetermined value.

29. The image sensing apparatus according to claim 28 further comprising notification means for notifying a user of image synthesis being disabled in a case where said disabling means disabled said image signal synthesis means.

30. The image sensing apparatus according to claim 28, wherein said image signal synthesis means has a plurality of image synthesis modes, and selects one of the plurality of image synthesis modes in accordance with the blurring amount.

31. The image sensing apparatus according to claim 30, wherein the image synthesis modes indicate numbers of images to be synthesized out of the plurality of images sensed by said image sensing means, and said image signal synthesis means selects a first number of images when the blurring amount is equal or less than a first predetermined value; and selects a second number of images which is smaller than the first number when the blurring amount is larger than the first predetermined value.

32. The image sensing apparatus according to claim 31, wherein said image signal synthesis means selects a third number of images which is smaller than the second number when the blurring amount is larger than the second predetermined value which is larger than the first predetermined value.

33. The image sensing apparatus according to claim 31 further comprising notification means for notifying a user of the image sensing mode selected by said image signal synthesis means.

34. The image sensing apparatus according to claim 25, wherein said image signal synthesis means synthesizes the image signals of the plurality of images on the basis of the blurring amount detected by said blurring detection means so that blurring is compensated.

35. The image sensing apparatus according to claim 34, wherein said image signal synthesis means synthesizes the plurality of images after changing relative positions between the plurality of images on the basis of the blurring amounts between respective pairs of the plurality of images.

36. An image sensing apparatus comprising:
an image sensing device for converting an optical image into electronic signals and outputting the electric signals as image signals;
a shifting unit for shifting an image formation position of the optical image formed on said image sensing device to a plurality of different positions;
an optical system state detection unit for detecting a state of a focusing optical system;
a control unit for controlling said shifting unit on the basis of the state of the focusing optical system detected by said optical system state detection unit; and
an image signal synthesis unit for synthesizing image signals of a plurality of images outputted by said image sensing device to generate a single image;
wherein said image sensing device converts the optical image into electric signals at each of the plurality of different image formation positions shifted by said shifting unit.

37. The apparatus according to claim 36, wherein said focusing optical system is a rear focusing system.

38. The apparatus according to claim 36, wherein said control unit controls a shift amount of an image formation position by said shifting unit.

39. The apparatus according to claim 36, wherein said shifting unit moves in a substantially vertical direction with respect to an optical axis.

40. The apparatus according to claim 36, wherein said shifting unit is a plane parallel plate.

41. The apparatus according to claim 36, wherein said shifting unit is a variable apical angle prism.

42. An image sensing method comprising:
an optical system state detection step of detecting a state of a focusing optical system;
an image sensing step of, while shifting an image formation position of an optical image on an image sensing device to a plurality of different positions by a shifting unit on the basis of the state of the focusing optical system detected in said optical system state detection step, converting the optical image into electronic signals and outputting the electric signals as image signals at each image formation position; and
an image signal synthesis step of synthesizing image signals of a plurality of images outputted by said image sensing device to generate a single image.

43. The method according to claim 42, wherein said focusing optical system is a rear focusing system.

44. The method according to claim 42, wherein a shift amount of the shifting unit is controlled upon shifting the image formation position.

45. The method according to claim 42, wherein the shifting unit moves in a substantially vertical direction with respect to an optical axis.

46. The method according to claim 42, wherein the shifting unit is a plane parallel plate.

47. The method according to claim 42, wherein the shifting unit is a variable apical angle prism.

* * * * *

UNITED STATES PATENT AND TRADEMARK OFFICE
CERTIFICATE OF CORRECTION

PATENT NO.     : 6,429,895 B1
DATED          : August 6, 2002
INVENTOR(S)    : Ichiro Onuki It is certified that error appears in the above-identified patent and that said Letters Patent is hereby corrected as shown below:

Title page,
Item [56], References Cited, please add -- FOREIGN PATENT DOCUMENTS
| | | |
|---|---|---|
| 6027278 | 7/83 | Japan |
| 6091774 | 10/83 | Japan |
| 61236282 | 4/85 | Japan |
| 1319370 | 6/88 | Japan |
| 07264488 | 5/95 | Japan |
| 257078 | 2/90 | Japan |
| 08172568 | 7/96 | Japan |
| 110787 | 7/87 | Japan -- |

Column 29,
Line 1, please delete "a" & "b" and insert therefor -- $\underline{a}$ -- & -- $\underline{b}$ --
Line 2, please delete "c" and insert therefor -- $\underline{c}$ --
Line 3, please delete "d" and insert therefor -- $\underline{d}$ --
Line 4, please delete "e" & "f" and insert therefor -- $\underline{e}$ -- & -- $\underline{f}$ --
Line 7, please delete "g" & "h" and insert therefor -- $\underline{g}$ -- & -- $\underline{h}$ --
Line 12, please delete "i" & "j" and insert therefor -- $\underline{i}$ -- & -- $\underline{j}$ --
Lines 19-20, please delete "i" & "j" and insert therefor -- $\underline{i}$ -- & -- $\underline{j}$ --
Lines 31, 35 and 61, please delete "f" and insert therefor -- $\underline{f}$ --
Lines 34, 49 and 64, please delete "j" and insert therefor -- $\underline{j}$ --
Line 46, please delete "e" and insert therefor -- $\underline{e}$ --

Column 30,
Line 8, please delete "e" and insert therefor -- $\underline{e}$ --
Line 11, please delete "i" and insert therefor -- $\underline{i}$ --

UNITED STATES PATENT AND TRADEMARK OFFICE
CERTIFICATE OF CORRECTION

PATENT NO. : 6,429,895 B1
DATED : August 6, 2002
INVENTOR(S) : Ichiro Onuki

It is certified that error appears in the above-identified patent and that said Letters Patent is hereby corrected as shown below:

Column 63,
Line 64, please delete "sensing" and insert therefor -- synthesis --

Signed and Sealed this

Eighth Day of April, 2003

JAMES E. ROGAN
*Director of the United States Patent and Trademark Office*